US009734580B2

(12) United States Patent
Kinoshita

(10) Patent No.: US 9,734,580 B2
(45) Date of Patent: Aug. 15, 2017

(54) IMAGE PROCESSING APPARATUS, IMAGE PROCESSING METHOD, AND PROGRAM

(71) Applicant: Sony Corporation, Tokyo (JP)

(72) Inventor: Masaya Kinoshita, Kanagawa (JP)

(73) Assignee: Sony Corporation (JP)

( * ) Notice: Subject to any disclaimer, the term of this patent is extended or adjusted under 35 U.S.C. 154(b) by 42 days.

(21) Appl. No.: 14/361,451

(22) PCT Filed: Oct. 16, 2012

(86) PCT No.: PCT/JP2012/076676
§ 371 (c)(1),
(2) Date: May 29, 2014

(87) PCT Pub. No.: WO2013/084593
PCT Pub. Date: Jun. 13, 2013

(65) Prior Publication Data
US 2014/0334681 A1    Nov. 13, 2014

(30) Foreign Application Priority Data
Dec. 6, 2011    (JP) .................... 2011-266408

(51) Int. Cl.
*G06K 9/00* (2006.01)
*G06T 7/00* (2017.01)
*H04N 5/232* (2006.01)
(52) U.S. Cl.
CPC .......... *G06T 7/004* (2013.01); *G06K 9/00228* (2013.01); *H04N 5/23219* (2013.01)

(58) Field of Classification Search
CPC .......... G06K 9/00228; G06K 9/00711; G06K 9/6215; G06T 7/004; H04N 5/23219
See application file for complete search history.

(56) References Cited

U.S. PATENT DOCUMENTS 8,212,896 B2     7/2012   Kodama
8,330,849 B2    12/2012   Ishii
8,497,929 B2     7/2013   Ishii
(Continued)

FOREIGN PATENT DOCUMENTS

JP    2010-056692 A    3/2010
JP    2010-102041 A    5/2010
(Continued)

OTHER PUBLICATIONS

International Search Report from International Publication PCT/JP2012/076676 dated Nov. 27, 2012.
(Continued)

*Primary Examiner* — Jonathan S Lee
(74) *Attorney, Agent, or Firm* — Lerner, David, Littenberg, Krumholz & Mentlik, LLP

(57) ABSTRACT

Provided is a an image processing apparatus including a candidate detection unit configured to detect each of candidate images serving as candidates for a main subject for a plurality of frames of image data, and a main subject determination unit configured to obtain a degree of stable presence of the candidate images detected by the candidate detection unit within the image data spanning the plurality of frames and to determine a main subject among the candidate images using the degree of stable presence.

16 Claims, 23 Drawing Sheets

(56) References Cited

U.S. PATENT DOCUMENTS

| | | | |
|---|---|---|---|
| 8,594,435 B2 | 11/2013 | Kinoshita et al. | |
| 9,591,364 B2* | 3/2017 | Kinoshita | H04N 5/23216 |
| 2007/0195171 A1* | 8/2007 | Xiao | G06K 9/00228 |
| | | | 348/207.99 |
| 2008/0199056 A1* | 8/2008 | Tokuse | G06K 9/00295 |
| | | | 382/118 |
| 2009/0103778 A1 | 4/2009 | Yoshizumi et al. | |
| 2009/0268074 A1* | 10/2009 | Sugino | H04N 5/23293 |
| | | | 348/333.02 |
| 2010/0020244 A1* | 1/2010 | Mitsuya | H04N 5/23248 |
| | | | 348/699 |
| 2010/0074557 A1* | 3/2010 | Oku | G06K 9/3233 |
| | | | 382/291 |
| 2010/0097515 A1 | 4/2010 | Ishii | |
| 2010/0149369 A1* | 6/2010 | Yasuda | H04N 5/23219 |
| | | | 348/222.1 |
| 2010/0150450 A1* | 6/2010 | Tsuji | H04N 5/232 |
| | | | 382/195 |
| 2012/0057786 A1* | 3/2012 | Yano | H04N 5/232 |
| | | | 382/170 |
| 2012/0206619 A1* | 8/2012 | Nitta | H04N 5/23219 |
| | | | 348/222.1 |
| 2012/0242838 A1 | 9/2012 | Kodama | |
| 2013/0300908 A1 | 11/2013 | Ishii | |
| 2015/0016683 A1* | 1/2015 | Kinoshita | H04N 5/23219 |
| | | | 382/103 |
| 2015/0070526 A1* | 3/2015 | Kinoshita | H04N 5/23219 |
| | | | 348/222.1 |

FOREIGN PATENT DOCUMENTS

| | | |
|---|---|---|
| JP | 2010141849 A | 6/2010 |
| JP | 2011013216 A | 1/2011 |
| JP | 2011-146826 A | 7/2011 |
| JP | 2011-146827 A | 7/2011 |
| JP | 2011-160379 A | 8/2011 |
| JP | 2011-166305 A | 8/2011 |

OTHER PUBLICATIONS

Extended European Search Report for Application No. 12856531.4 Dated Feb. 1, 2016.

Chinese Office Action for Application No. 201280059289.3 dated Dec. 1, 2016.

Japanese Office Action for Application No. 2016152471, dated Jun. 6, 2017.

* cited by examiner

FIG. 7
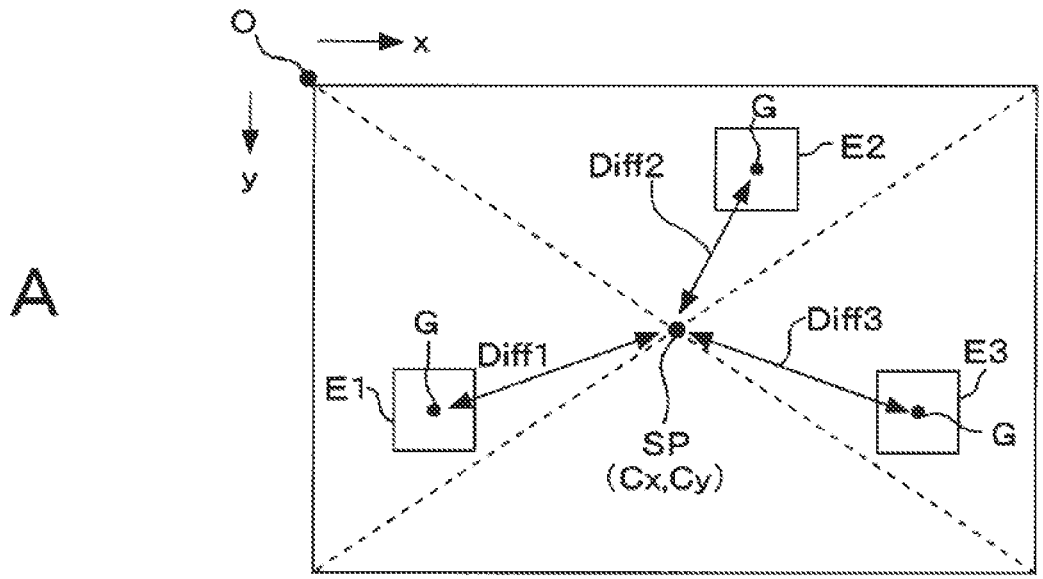
A
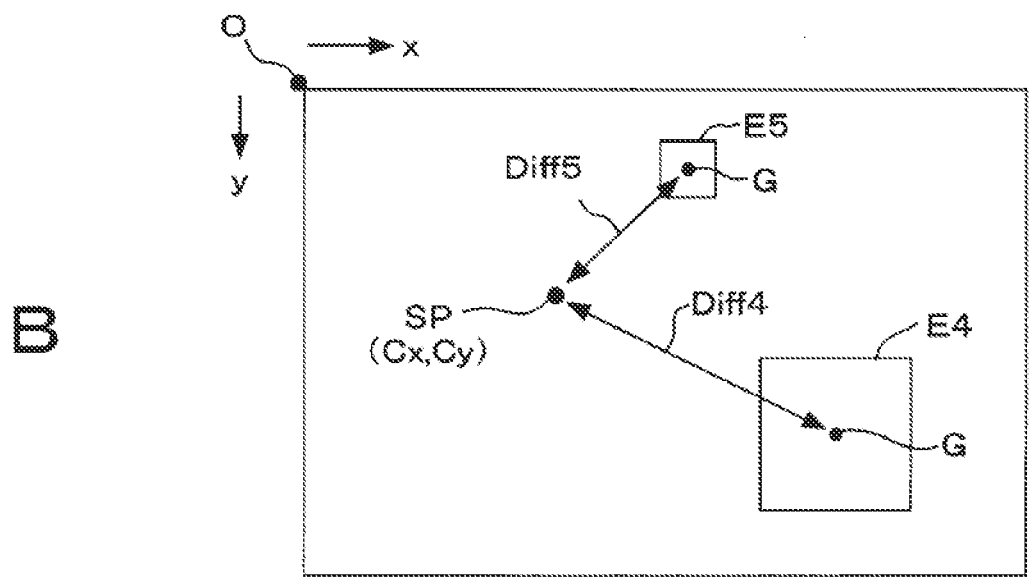
B

FIG. 15
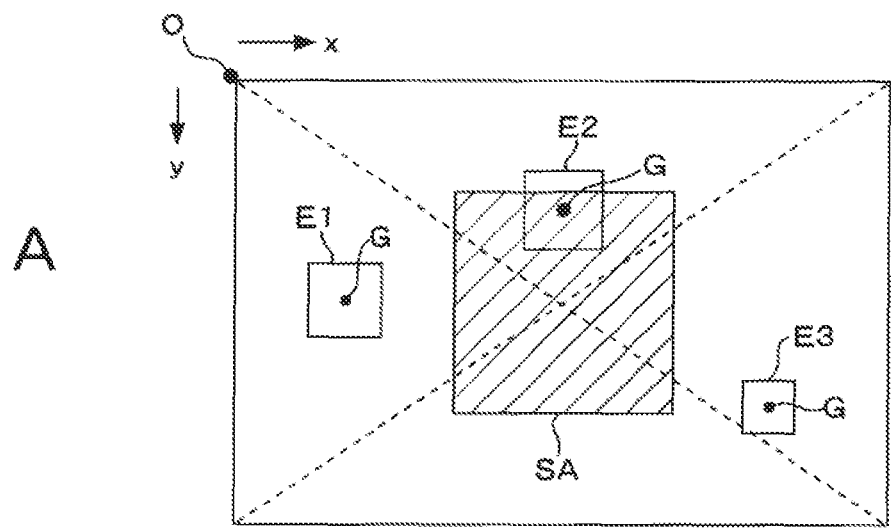
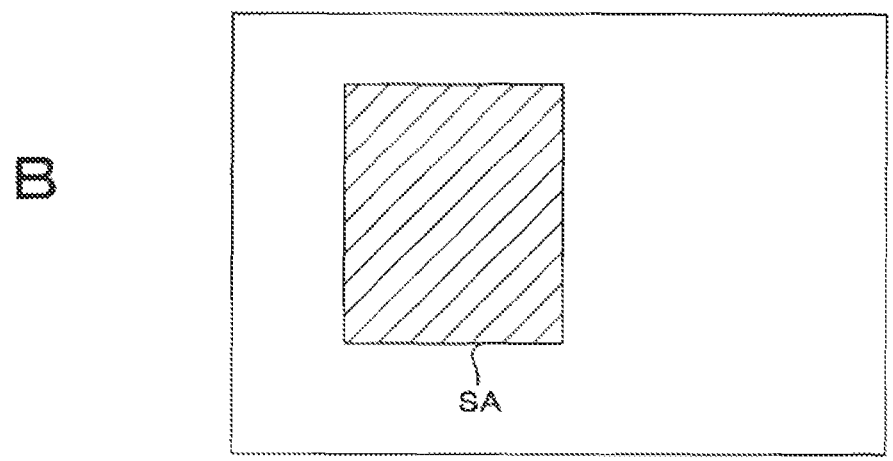
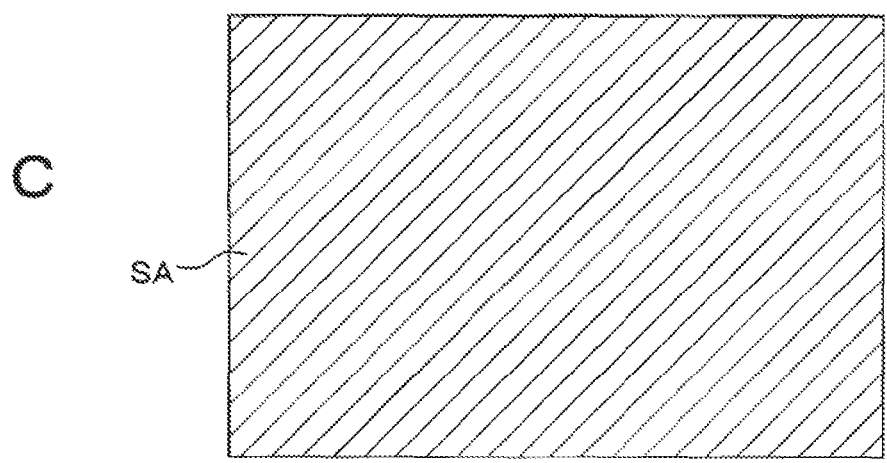

FIG. 21
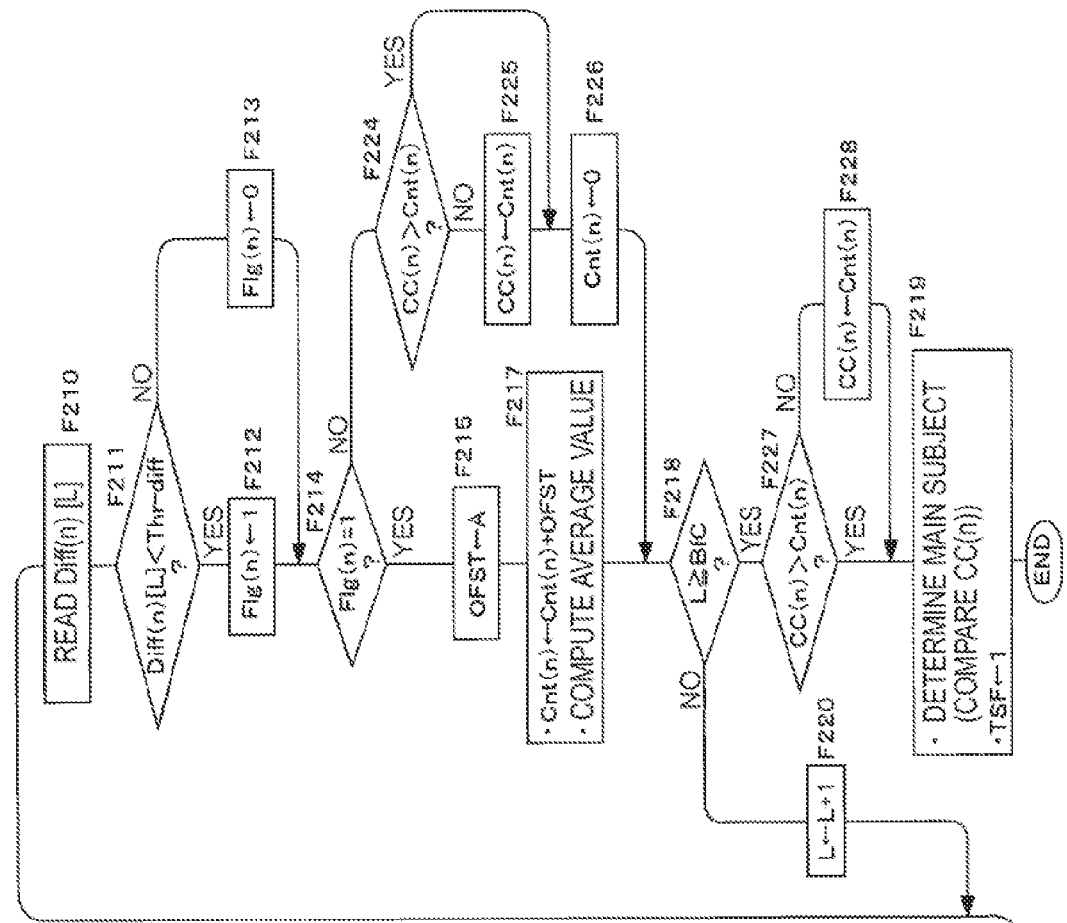
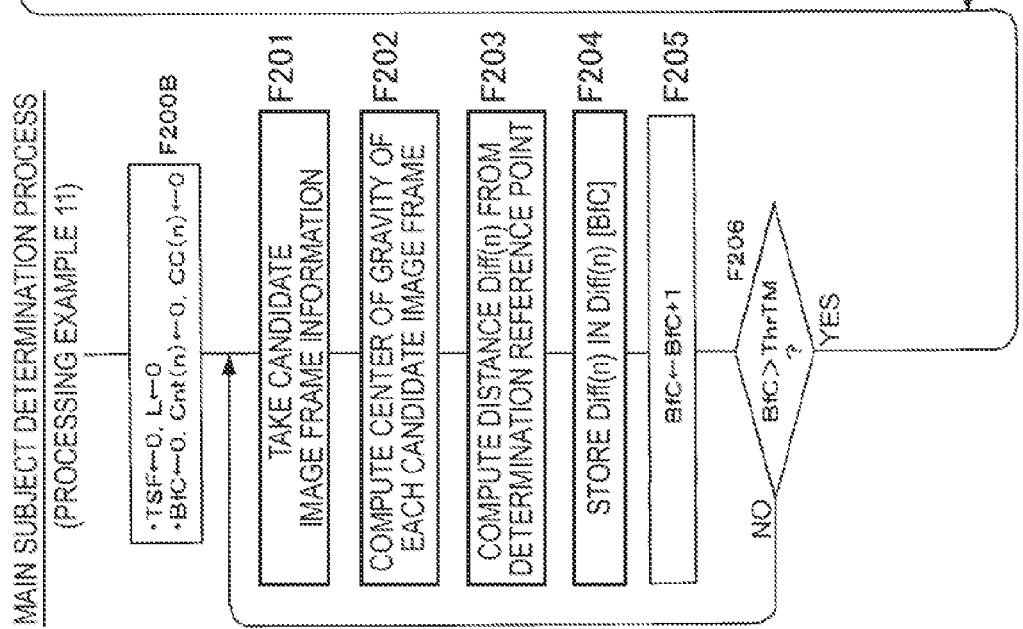

MAIN SUBJECT DETERMINATION PROCESS (PROCESSING EXAMPLE 12)

IMAGE PROCESSING APPARATUS, IMAGE PROCESSING METHOD, AND PROGRAM

CROSS-REFERENCE TO RELATED APPLICATION

The present application is a national phase entry under 35 U.S.C. §371 of International Application No. PCT/JP2012/076676 filed Oct. 16, 2012, published on Jun. 13, 2013 as WO 2013/084593 A1, which claims priority from Japanese Patent Application No. JP 2011-266408, filed in the Japanese Patent Office on Dec. 6, 2011.

TECHNICAL FIELD

The present disclosure relates to an image processing apparatus and an image processing method for determining a main subject in an image and a program for executing a process of determining a main subject in an image.

BACKGROUND ART

Recent digital still cameras and digital video cameras normally have a facial detection function, and have a function of optimally matching various parameters (focus, brightness and the like) of the camera according to facial position and area.

On the other hand, Patent Literature 1 discloses a technique in which a user designates and selects a "main subject" that is a target subject to be tracked in a captured image.

In addition, if the techniques disclosed in Patent Literatures 2, 3, and 4 described above are used, for example, subject tracking that encompasses a frame of the whole body of an arbitrary subject can be realized.

In addition, there are also functions of controlling an optical system and the like such as autofocus and automatic exposure such that a desired area in a captured image is detected and traced so as to optimize the area.

As described above, technologies of tracking an image designated by a user as a main subject, for example, an image area such as a face in a captured image, focusing on the face area, and the like are known.

CITATION LIST

Patent Literature

Patent Literature 1: JP 2011-166305A
Patent Literature 2: JP 2011-146826A
Patent Literature 3: JP 2011-146827A
Patent Literature 4: JP 2011-160379A

SUMMARY OF INVENTION

Technical Problem

However, in a captured image, a desired area that is subject to tracking or focusing, i.e., a "main subject," is decided by a photographer by directly selecting one candidate from "a plurality of candidate areas" obtained from various detectors using any method at present.

In a state of holding a camera, for example, a main subject is chosen through an action of selecting an arbitrary face from a plurality of faces projected on a through image displayed on a screen (a monitoring image of a subject displayed at times other than at a time of operating a shutter) on a touch panel. Alternatively, a subject present in a predetermined area is set to be a main subject at a time designated by a user (half-pressing of a shutter or the like).

However, when a user interface is considered in actual use examples, there are cases in which the action of "selecting a main subject by a photographer" itself is difficult.

For example, when a user wants to use a function of maintaining focus on a subject that is moving around, it is difficult for the user to select the subject using his or her finger holding a camera while targeting the subject.

For example, there are cases in which designation is difficult due to a speed of a reaction of a user to changes (movements) of a subject. For example, there is a case in which it is difficult to precisely designate a subject that is moving around on a screen of a through image.

In addition, in a situation in which a user holds a camera in his or her hand in the first place and turns the camera toward the subject to choose the subject, it is difficult for the user to perform the action of selecting a main subject using his or her finger on a screen.

In addition, there is a case in which it is difficult for a use to select a subject in resolution of a display screen in which a touch panel is arranged.

In addition, there is also a case in which it is difficult to properly designate a desired subject depending on a size of the subject on a display screen in which a touch panel is arranged and a size (thickness) of a user's finger.

In addition, there is also a case in which it is difficult for a user to properly designate a subject due to a time lag of a camera system, for example, a time lag between actual scenery and a through image of a captured image.

Furthermore, when such a designation operation is to be performed during imaging and recording of a dynamic image, image shaking caused by an action of selecting a main subject may be recorded as it is, or an action of re-selection may be required at the time of frame-out or tracking loss (failure) caused by temporary shielding, or the like.

As described above, hand-held type cameras have a problem in that the action of selecting a main subject itself is difficult in many use examples that require the function, which is stressful for photographers.

Therefore, the present disclosure aims to realize a technology of determining a target subject desired by a user such as a photographer and setting the subject as a main subject without an action of the user intentionally selecting the subject.

Solution to Problem

According to the present disclosure, there is provided an image processing apparatus including a candidate detection unit configured to detect each of candidate images serving as candidates for a main subject for a plurality of frames of image data, and a main subject determination unit configured to obtain a degree of stable presence of the candidate images detected by the candidate detection unit within the image data spanning the plurality of frames and to determine a main subject among the candidate images using the degree of stable presence.

According to the present disclosure, there is provided an image processing method including detecting each of candidate images serving as candidates for a main subject for a plurality of frames of image data, obtaining a degree of stable presence of the detected candidate images within the image data spanning the plurality of frames, and determining a main subject among the candidate images using the degree of stable presence.

According to the present disclosure, there is provided a program for causing an arithmetic processing apparatus to execute a positional state determination process of determining a positional state of each of candidate images detected as candidates for a main subject for a plurality of frames of image data within a field of view, a stable presence degree computation process of obtaining a degree of stable presence of each of the candidate images within the image data spanning the plurality of frames from the positional state of each of the candidate images of each frame determined in the positional state determination process, and a main subject determination process of determining a main subject among the candidate images using the degree of stable presence obtained in the stable presence degree computation process.

According to the technologies of the present disclosure, a degree of stable presence of an extracted candidate image in a plurality of frames is obtained. The degree of stable presence is a value indicating a frequency (temporal accuracy of presence) with which a certain image is in a predetermined positional state within a field of view. A subject that is highly likely to be regarded as a target of a photographer holding a camera has a high degree of stable presence. In other words, a subject that a photographer mainly targets is caused to be included in a point or an area that the photographer regards to be a center as a position in a captured image, and as the photographer further targets the subject, the subject is naturally included in the captured image for a long period of time. Thus, a subject that is present in a captured image in a predetermined positional state with a high frequency in terms of time (a subject having a high degree of stable presence) can be presumed as a main subject that the photographer targets.

Advantageous Effects of Invention

According to the present disclosure, since a main subject is automatically determined in a captured image, it is not necessary for a user such as a photographer to perform an action of selecting a main subject. Thus, operability and convenience for the user can be improved. For example, improvement of operability and reduction of user stress when capturing is performed by holding an imaging apparatus mounted with an image processing apparatus of the present disclosure in a hand, and further enhancement of a product added value of realization of various functions according to automatic determination of a main subject can be realized.

BRIEF DESCRIPTION OF DRAWINGS

FIG. 7 is an illustrative diagram of distances between candidate image frames and determination reference points according to the embodiment.

FIG. 15 is an illustrative diagram of candidate image frames and determination reference points according to the embodiment.

FIG. 21 is a flowchart of Processing Example 11 according to the embodiment.

DESCRIPTION OF EMBODIMENTS

Figure 1:
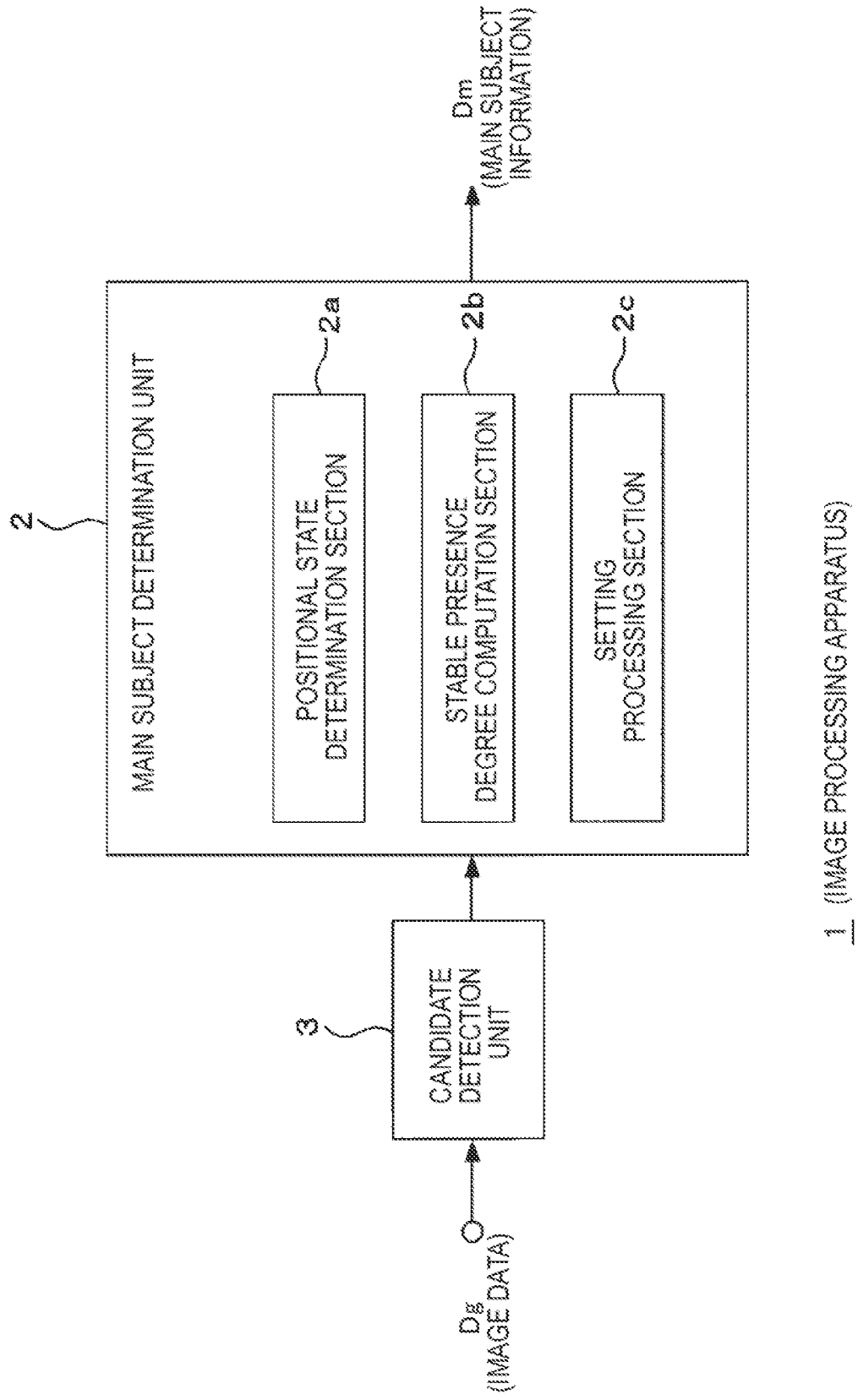
FIG. 1 is a block diagram of a configuration example of an image processing apparatus of an embodiment of the present disclosure.

Hereinafter, the embodiment will be described in the following order.
<1. Configuration of an image processing apparatus>
<2. Configuration of an imaging apparatus>
<3. Overview of a main subject decision process>
 [3-1: Processing Type I]
 [3-2: Processing Type II]
 [3-3: Opportunity and objective of main subject determination, etc.]
<4. Specific processing examples>
 [4-1: Processing Example 1 (Type I; determination reference point; first-arrival determination; cumulative presence)]
 [4-2: Processing Example 2 (Type I; determination reference point; first-arrival determination; continuous presence)]
 [4-3: Processing Example 3 (Type I; determination reference point; first-arrival determination; cumulative presence; expanded example)]
 [4-4: Processing Example 4 (Type I; determination reference point; first-arrival determination; cumulative presence; conditional determination)]
 [4-5: Processing Example 5 (Type I; determination reference point; fixed-time determination; cumulative presence)]
 [4-6: Processing Example 6 (Type I; determination reference point; fixed-time determination; continuous presence)]

[4-7: Processing Example 7 (Type I; determination reference area; first-arrival determination; cumulative or continuous presence)]
[4-8: Processing Example 8 (Type I; determination reference area; fixed-time determination; cumulative or continuous presence)]
[4-9: Processing Example 9 (Type II; determination reference point; average presence)]
[4-10: Processing Example 10 (Type II; determination reference point; cumulative presence)]
[4-11: Processing Example 11 (Type II; determination reference point; continuous presence)]
[4-12: Processing Example 12 (Type II; determination reference area; average presence)]
<5. Application to a program and a computer apparatus>
<6. Modification example>

It should be noted that meanings of terms in use are as follows.

A "field of view" means a space expressed in a captured image. It primarily has a meaning of a two-dimensional space as a screen plane in a captured image, and on top of that, further has a meaning of a three-dimensional space that also includes a relative distance of a subject with respect to a position of a camera at the time of imaging. Note that, with regard to a captured image, when a relative distance of a subject with respect to a position of a camera at the time of imaging is described, the term "a subject distance" is used.

A "field of view" in the embodiment is used as a term primarily having a meaning of a two-dimensional space (an x-y coordinate space in a captured image) on a screen plane, and the technology of the present disclosure applies the "field of view" as a two-dimensional space on a screen plane, but when a "subject distance" is particularly considered in addition to a screen plane, the "field of view" is assumed to mean a three-dimensional space (an x-y-z coordinate space).

Furthermore, as will be described later as a modification example, the so-called "field of view" can also be considered as a one-dimensional space in which only a position in a horizontal direction (x coordinate) of a screen plane, a position in a horizontal direction (y coordinate) of the screen plane, or a subject distance (z coordinate) is taken into account.

A "positional state" is assumed to be a collective term referring to a state of an absolute or relative position in a field of view of a candidate image in captured image data.

Specific examples of the "positional state" include:
a relative distance to a determination reference point described in the embodiment;
a relative positional relationship and a relative distance to a determination reference area described in the embodiment;
a position of a candidate image in a two-dimensional plane of a captured image;
a subject distance;
a relative positional relationship between a subject distance and a determination reference point or a determination reference area; and the like.

A "degree of stable presence" is assumed to be a value indicating a frequency with which a certain subject in a field of view is in a predetermined positional state. For example, the value is an index value with which it can be determined whether or not a subject is in a predetermined state within an image with a high temporal frequency. To describe based on the embodiment that will be described later, it is a value indicating a cumulative time or a duration for which a candidate image is present in a predetermined positional state as a positional state within a field of view, an average presence, or the like, and an image having, for example, a long cumulative time or duration calculated as the "degree of stable presence" can be estimated to be a subject that a photographer is primarily targeting.

<1. Configuration of an Image Processing Apparatus>

FIG. 1 shows a configuration example of an image processing apparatus according to the embodiment.

The image processing apparatus 1 has a main subject determination unit 2 and a candidate detection unit 3.

The candidate detection unit 3 detects candidate images each serving as candidates for a main subject from a plurality of frames of input image data Dg and outputs candidate image information to the main subject determination unit 2.

In other words, face image detection, human body detection, and the like are performed for each frame (or each intermittent frame) of the image data Dg continuously input on a time axis, and images serving as candidates for the main subject are extracted.

Note that face detection, human body detection, and the like can be performed using techniques of pattern matching and the like in image analysis performed with respect to captured image data, but if only a dictionary used in pattern matching is replaced, other detectors can also be realized in principle. For example, extraction of candidate images of a main subject for dog face detection (of a certain breed), cat face detection, and the like is possible.

In addition, for example, detecting a moving body and setting the moving body to be a candidate image using a technique of moving body detection based on a frame difference can also be considered, and a technique of extracting an area of interest that is called saliency (Saliency) may be used.

In addition, the candidate detection unit 3 outputs information indicating the extracted candidate images, for example, position information in two-dimensional directions (x and y coordinate values) within a screen of the candidate image, a subject distance, an image size (the number of pixels), and the like as candidate image information.

The main subject determination unit 2 obtains the degree of stable presence in image data for over a plurality of frames with respect to the candidate images indicated by the candidate image information supplied from the candidate detection unit 3, and then determines a main subject among the candidate images using the obtained degree of stable presence. Then, main subject information Dm is output.

To attain this end, the main subject determination unit 2 is provided with a positional state determination section 2a, a stable presence degree computation section 2b, and a setting processing section 2c as arithmetic processing functions realized by, for example, software programs.

The positional state determination section 2a determines a positional state of a candidate image indicated by candidate image information within a field of view.

The stable presence degree computation section 2b obtains a degree of stable presence of each candidate image in image data over a plurality of frames based on the positional state of the candidate image in each frame determined by the positional state determination section 2a.

The setting processing section 2c performs a process of determining a main subject among the candidate images using the degree of stable presence obtained by the stable presence degree computation section 2b, and then setting a certain candidate image to be a main subject. Information indicating an image set as the main subject is output as the main subject information Dm to be transferred to other application software, a processing circuit unit, or the like.

Note that the candidate detection unit 3 can be realized by a video processing DSP (Digital Signal Processor) or a CPU (Central Processing Unit) as an image analysis device.

In addition, the main subject determination unit 2 can be realized by a CPU or a DSP as an arithmetic processing device.

In addition, a configuration in which a CPU or the like constituting the main subject determination unit 2 executes an operation as the candidate detection unit 3 is also assumed. In other words, there are cases in which the candidate detection unit 3 that performs image analysis is configured as one functional block in the arithmetic processing device serving as the main subject determination unit 2.

The flow of a process performed by the image processing apparatus 1 is as shown in FIG. 2A.

As Step F1000, inputting of the image data Dg is started. The image data Dg is input by a reception unit or the like that receives image data transmitted from an imaging apparatus unit or another imaging apparatus not shown in the drawing. Alternatively, there are cases in which dynamic image data that has been captured by an imaging apparatus and stored in a recording medium is reproduced and then input.

When the image processing apparatus 1 executes determination of a main subject, the process proceeds to Step F1002 from Step F1001.

In Step F1002, the candidate detection unit 3 performs image analysis, frame difference detection, interest area detection, and the like targeting each frame of the sequentially input image data Dg, and then starts a process of performing detection of a predetermined candidate image.

The candidate detection unit 3 may perform candidate image extraction targeting all input frames, or may perform candidate image extraction targeting intermittent frames such as every two frames, every three frames, or the like. In other words, the candidate detection unit 3 may perform the candidate image extraction process with respect to a plurality of frames at least in a time series manner for a period in which the main subject determination is performed. Which image will be set to be a candidate image may vary depending on a setting, but for example, a face image, a human body image, a dog image, a cat image, and the like are considered.

Then, the candidate detection unit 3 outputs the candidate image information indicating the detected candidate image of each frame to the main subject determination unit 2.

In Step F1003, the main subject determination unit 2 performs a main subject determination process.

The main subject determination process is performed as shown in FIG. 2B.

In Step F1, the positional state determination section 2a takes sequentially input candidate image information to determine a positional state of each candidate image. One or a plurality of candidate images may be present in one frame, or no candidate image may be present in a frame. When a plurality of candidate images are present in a certain frame, a positional state of each of the candidate images is determined.

In Step F2, the stable presence degree computation section 2b computes a degree of stable presence of the candidate images in image data over a plurality of frames based on the positional state of each of the candidate images in each frame that has been determined in the positional state determination process. For example, a degree of stable presence is computed as a value indicating a frequency with which a positional state is a state of being close to the image center or the like.

In Step F3, the setting processing section 2c determines a main subject among candidate images using the degree of stable presence of each candidate image. For example, a candidate image having the highest degree of stable presence as the value indicating the frequency with which a positional state is a state of being close to the image center (or a candidate image that has reached a predetermined value most quickly in terms of time) is determined as a main subject.

In Step F1003 of FIG. 2A, the main subject determination unit 2 performs Steps F1 to F3 of FIG. 2B as described above, thereby setting, for example, one candidate image as a main subject.

Then, in Step F1004 of FIG. 2A, the main subject determination unit 2 transfers the main subject information Dm to an application program, or the like.

The application program or the like performs a process according to specification of an image set as a main subject. The process is, for example, focus control, a tracking process, an image effect process, or the like.

In the main subject determination process performed by the image processing apparatus 1, the degree of stable presence in a plurality of frames among the extracted candidate images is obtained. In other words, an index value for determining whether a subject is present in an image being stably positioned with a high temporal frequency is obtained.

For example, a subject having a high reliability that is regarded as being aimed at as a target by a photographer who is holding a camera has a high degree of stable presence. In other words, a subject that a photographer primarily aims at is set to be included in, as a position within a captured image, a point or an area that the photographer regards as a center, and as the photographer further aims at the subject, the subject is naturally included in the captured image for a long period of time. Thus, a subject that is stably positioned and present in a captured image with a high temporal frequency (a subject having a high degree of stable presence) can be estimated as a main subject that a photographer is aiming at.

Determination of a main subject is performed with such a degree of stable presence. Accordingly, a main subject is automatically determined without a particular operation designated by a user such as a photographer, and thus user operability of the various electronic devices that perform operations according to a setting of the main subject is further enhanced.

<2. Configuration of an Imaging Apparatus>

Hereinafter, a main subject determination operation will be described in detail exemplifying an imaging apparatus 10 in which the image processing apparatus is embedded described above.

Figure 3:
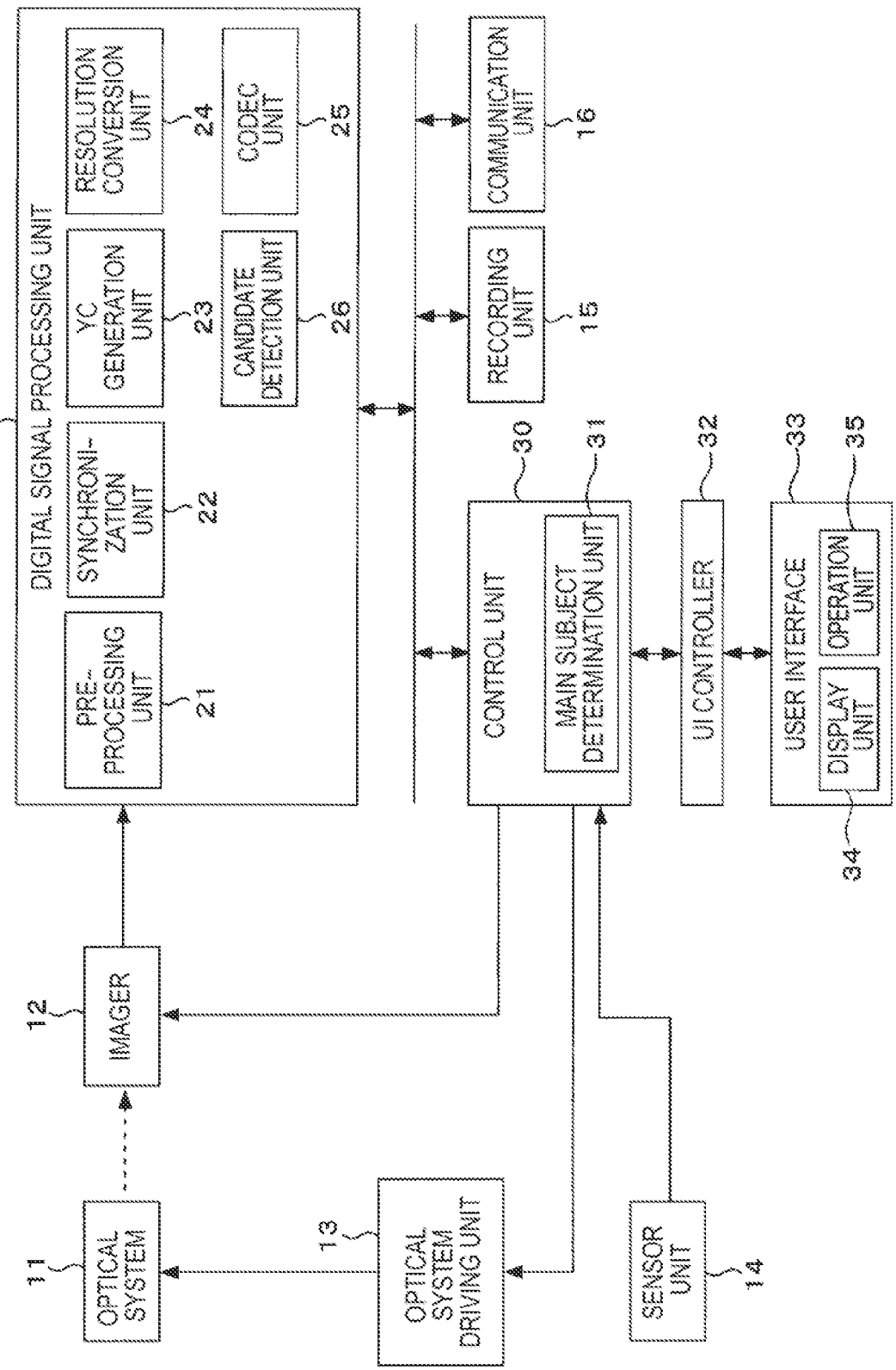
FIG. 3 is a block diagram of an imaging apparatus according to the embodiment.

FIG. 3 shows a configuration example of the imaging apparatus 10 according to the embodiment. The imaging apparatus 3 is assumed to be a so-called digital still camera or digital video camera as a device that performs capturing and recording of still images and dynamic images, and to include the image processing apparatus described in the claims.

In addition, a configuration that corresponds to the main subject determination unit 2 of the image processing apparatus described above is implemented by software in a control unit 30 of the imaging apparatus 10. The control unit 30 performs an operation as the image processing method mentioned in the claim by executing a process based on the program mentioned in the claim.

As illustrated in FIG. 1, the imaging apparatus 10 includes an optical system 11, an imager 12, an optical system driving unit 13, a sensor unit 14, a recording unit 15, a communication unit 16, a digital signal processing unit 20, the control unit 30, a user interface controller (hereinafter referred to as a "UI controller") 32, and a user interface 33.

The optical system 11 has lenses such as a cover lens, a zoom lens, and a focus lens and a throttle mechanism. By this optical system 11, light from an subject is collected in the imager 12.

The imager 12, for example, has a CCD (Charge Coupled Device) type or CMOS (Complementary Metal Oxide Semiconductor) type imaging sensor.

The imager 12, for example, performs a CDS (Correlated Double Sampling) process, an AGC (Automatic Gain Control) process and the like for an electrical signal obtained through photoelectric conversion in the imaging sensor, and further performs an A-D (Analog-Digital) conversion process. Then, the imager 12 outputs an imaging signal as digital data to the digital signal processing unit 20 of a rear stage.

The optical system driving unit 13 drives the focus lens of the optical system 11 and performs a focus operation under the control of the control unit 30. Furthermore, the optical system driving unit 13 drives the throttle mechanism of the optical system 11 and performs exposure adjustment under the control of the control unit 30. Moreover, the optical system driving unit 13 drives the zoom lens of the optical system 11 and performs a zoom operation under the control of the control unit 30.

The digital signal processing unit 20, for example, is configured as an image processor by a DSP and the like. The digital signal processing unit 20 performs various types of signal processes for a digital signal (captured image signal) from the imager 12.

For example, the digital signal processing unit 20 includes a pre-processing unit 21, a synchronization unit 22, a YC generation unit 23, a resolution conversion unit 24, a codec unit 25, and a candidate detection unit 26.

The pre-processing unit 51 performs a clamping process of clamping a black level of R, G, and B to a predetermined level, or a correction process among color channels of R, G, and B with respect to the captured image signal from the imager 12.

The synchronization unit 22 performs a demosaicing process such that image data for each pixel has color components of all of R, G, and B.

The YC generation unit 23 generates (separates) a luminance (Y) signal and a color (C) signal from the image data of R, G, and B.

The resolution conversion unit 24 performs a resolution conversion process on the image data on which various types of signal processes have been performed.

The codec unit 25, for example, performs a coding process for recording or communication with respect to the image data for which the resolution conversion has been performed.

The candidate detection unit 26 corresponds to the candidate detection unit 3 described in FIG. 1, and performs an image analysis process targeting, for example, a captured image signal (luminance signal or color signal) obtained in the YC generation unit 23 in units of frames and then extracts candidate images. As an example, a face image, for example, is detected, and an area in which the face image is present is extracted as a candidate image frame. With regard to the extracted candidate image, position information of the candidate image frame (x and y coordinate values on a screen, information of a subject distance, and the like) or size information (for example, the width, height, and number of pixels of the candidate image frame, and the like) are transferred to a main subject determination unit 31 of the control unit 30 as candidate image information. Note that, here, since the candidate image information is information indicating a frame of an image area serving as a candidate image, the term of candidate image information is also referred to as "candidate image frame information."

In addition, as the candidate image frame information, attribute information of candidate images (types of a face, a human body, a dog, a cat, and the like, individual (entity) identification information, and further image data itself may also be included.

It is considered that the candidate detection unit 26 may extract a specific image that is a target of a candidate using the pattern matching technique as described above, or detect a moving body using, for example, a moving body detection technique based on a frame difference and then set the moving body as a candidate image. Techniques of extracting and choosing a candidate image are not limited to the above, and various ones are considered.

In addition, the candidate detection unit 26 may perform a smoothing process, an outlier (outlier) removal process, or the like for the image to generate candidate image frame information.

The control unit 30 is configured by a micro-computer (arithmetic processing device) that has a CPU, a ROM (Read Only Memory), a RAM (Random Access Memory), a flash memory, and the like.

By executing a program stored in the ROM, the flash memory, and the like, the CPU comprehensively controls the entire imaging apparatus 10.

The RAM serving as a work area when the CPU performs various kinds of data processes is used for temporarily storing data, programs, and the like.

The ROM and the flash memory (non-volatile memory) are used for storing an OS (Operating System) necessary for control of each unit by the CPU, content files such as image files, application programs for various operations, firmware, and the like. For example, programs for executing a main subject determination process that will be described later in the present example, and further application programs that use main subject determination results, and the like are stored therein.

The control unit 30 described above controls operations of necessary units relating to instruction of various signal processes in the digital signal processing unit 20, imaging operations and recording operations according to a user operation, a reproducing operation of recorded image files, camera operations such as zooming, focusing, and exposure adjustment, user interface operations, and the like.

Furthermore, in the case of the present embodiment, the control unit 2 functions as the main subject determination 31 and executes the main subject determination process that will be described later.

The main subject determination unit 31 executes processes as the positional state determination section $2a$, the stable presence degree computation section $2b$, and the setting processing section $2c$ described above functioning in correspondence with the main subject determination unit 2 of FIG. 1.

The user interface 33 executes display output and audio output to a user, and receives input of a user operation. For this reason, the user interface has a display device, an operation device, a speaker device, a microphone device, and the like. Herein, a display unit 34 and an operation unit 35 are shown.

The display unit 34 is a display unit that performs various types of display for a user (a photographer and the like), and for example, is formed using a display device, such as an LCD (Liquid Crystal Display) or an organic EL (Electro-Luminescence) display, which is formed on a housing of the imaging apparatus 10. In addition, the display unit may be formed using the LCD or the organic EL display in a so-called view finder form.

This display unit 6 includes the display device and a display driver that allows the display device to perform display. The display driver allows various types of display to be performed on the display device based on the instruction of the control unit 30. For example, the display driver reproduces and displays a still image or a dynamic image captured and recorded in a recording medium, or displays a through image (subject monitoring image) as a dynamic image based on captured image data of each frame, which is captured during release (a shutter operation) standby, on a screen of the display device. Furthermore, the display driver allows various operation menus, icons, messages and the like, that is, a GUI (Graphical User Interface), to be displayed on the screen. In the case of the present embodiment, for example, display that helps the user to ascertain a determination result obtained from main subject determination on the through image or reproduced image is also performed.

The operation unit 35 has an input function of receiving a user operation, and sends a signal corresponding to the input operation to the control unit 30.

The operation unit 35, for example, is realized by various operators provided on the housing of the imaging apparatus 10, a touch panel formed on the display unit 34, and the like.

As the operator of the housing, a reproduction menu start button, a decision button, an arrow key, a cancellation button, a zoom key, a slide key, a shutter button (a release button) and the like are provided.

Furthermore, by a touch panel operation using the icons and menus the touch panel and displayed on the display unit 34, various operations may be possible.

An operation of the display unit 34 of the user interface 33 and the like is controlled by the UI controller 32 according to instructions of the control unit 30. In addition, information of operations by the operation unit 35 is transmitted to the control unit 30 by the UI controller 32.

The recording unit 15, for example, includes a non-volatile memory, and serves as a storage area for storing image files (content files) such as still image data or dynamic image data, attribute information of the image files, thumbnail images and the like.

The image files, for example, are stored in the form of a JPEG (Joint Photographic Experts Group), a TIFF (Tagged Image File Format), a GIF (Graphics Interchange Format) and the like.

The actual form of the recording unit 15 can be variously considered. For example, the recording unit 15 may be a flash memory that is embedded in the imaging apparatus 10, or may have a form based on a memory card (for example, a portable flash memory) attachable to and detachable from the imaging apparatus 10 and a card recording and reproduction unit that performs recording and reproduction access to the memory card. Furthermore, the recording unit may be realized in the form of an HDD (Hard Disk Drive) and the like that is embedded in the imaging apparatus 10.

Furthermore, in the present example, a program for performing the main subject determination process that will be described later may be stored in the recording unit 15.

The communication unit 16 performs data communication or network communication with an external device in a wired or wireless manner.

For example, the communication unit performs communication of the captured image data (still image files or dynamic image files) with an external display apparatus, a recording apparatus, a reproduction apparatus and the like.

Furthermore, as a network communication unit, the communication unit, for example, may perform communication through various networks, such as the Internet, a home network, or a LAN (Local Area Network), or perform various types of data transmission and reception with a server, a terminal and the like on the network.

The sensor unit 14 collectively indicates various sensors. For example, a gyro sensor for detecting camera shake, an acceleration sensor for detecting an attitude of the imaging apparatus 10, and the like are provided. Furthermore, an angular velocity sensor that detects an attitude and a movement of the imaging apparatus 10, an illuminance sensor that detects external illuminance to adjust exposure or the like, and further a distance measuring sensor that measures a subject distance may be provided.

The various sensors of the sensor unit 14 transmit information detected by each of the sensors to the control unit 30. The control unit 30 can perform various control using the information detected by the sensor unit 14.

<3. Overview of a Main Subject Decision Process>

The main subject determination process executed by the control unit 30 (main subject determination unit 31) in the imaging apparatus 10 having the above configuration will be described hereinafter.

Although various examples of the main subject determination process will be described hereinbelow as specific Processing Examples 1 to 12, the main subject determination process is a process in which a degree of stable presence within image data over a plurality of frames is obtained for candidate images indicated by candidate image information, and using the degree of stable presence, a main subject among the candidate images is determined. As such a main subject determination process, Processing Type I and Processing Type II are exemplified below. However, the main subject determination process of the present disclosure is not limited to the two types, and Processing Examples 1 to 12 described below can be understood as being broadly divided into Type I and Type II.

Processing Type I is a form of a process of executing determination while taking in the candidate image information during a period in which main subject determination is performed.

On the other hand, Processing Type II takes (performs buffering on) the candidate image information during a certain period. It is a form of a process in which main subject determination is performed using the taken candidate image information after the period passes.

<3-1: Processing Type I>

Figure 4:
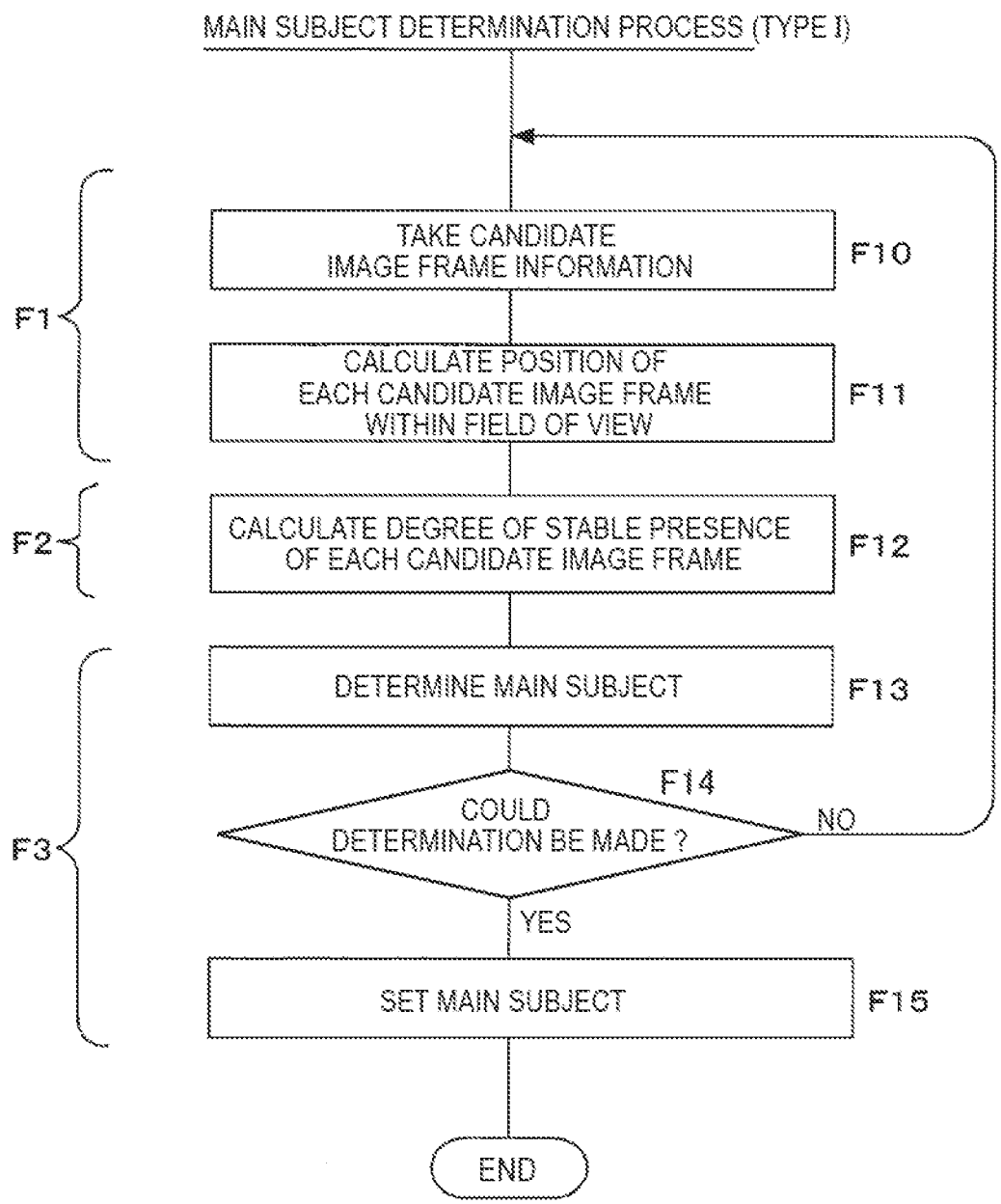
FIG. 4 is a flowchart of Type I of the main subject determination process according to the embodiment.

A flow of a process of Processing Type I is shown in FIG. 4. Note that FIG. 4 also shows the correspondence relationship of processes of Steps F10 to F15 corresponding to Steps F1 (taking-in and positional state determination), F2 (computation of a degree of stable presence), and F3 (setting of a main subject) of FIG. 2B described above.

Hereinafter, a process performed by the main subject determination unit 31 of the control unit 30 will be described.

In Step F10, the control unit 30 takes candidate image frame information of any one frame from the candidate detection unit 26.

In Step F11, the control unit 30 determines a positional state with regard to one or each of a plurality of candidate image frames indicated by the taken candidate image frame information by calculating a position within a field of view.

In this case, as a positional state, a distance of a candidate image from a determination reference point set within the field of view is determined. Alternatively, as a positional state, the positional relationship of the candidate image with a determination reference area set within the field of view is determined.

In Step F12, the control unit 30 calculates a degree of stable presence with regard to each candidate image frame. In this case, the control unit 30 computes a cumulative time information indicating that the positional state satisfies a predetermined condition as the degree of stable presence. Alternatively, the control unit 30 computes duration information indicating that the positional state continuously satisfies the predetermined condition as the degree of stable presence.

Note that, in the computation of the degree of stable presence, position information of the candidate image within the field of view or size information of the candidate image may be used as a condition for the computation.

In Step F13, the control unit 30 determines a main subject using the degree of stable presence.

Here, the determination of Step F13 is a process of determining, as a main subject, a candidate image of which the degree of stable presence has reached a predetermined value most quickly from the start of main subject determination. Alternatively, it is a process of determining a candidate image having the highest value of the degree of stable presence in a period of main subject determination as a main subject.

In addition, in the determination of the main subject, position information of the candidate image within the field of view or size information of the candidate image may also be used in addition to the value of the degree of stable presence.

At the time when a candidate image of which the value of the degree of stable presence has reached the predetermined value is not yet present, or when a predetermined period of main subject determination has not yet passed and a candidate image having the highest value of the degree of stable presence during the period has not been chosen, a main subject is not determined in the process of Step F13. In this case, the control unit 30 returns to Step F10 from F14, and repeats each process. In other words, the same processes are performed by taking in candidate image frame information of frames to be processed next from the candidate detection unit 26.

When a candidate image of which the value of the degree of stable presence has reached the predetermined value at a certain point of time is found, or when the predetermined period of main subject determination has passed and a candidate image having the highest value of the degree of stable presence during the period has been chosen, the control unit 30 proceeds to Step F15 from F14. Then, the candidate image determined in Step F13 is set to be a main subject.

<3-2: Processing Type II>

Figure 5:
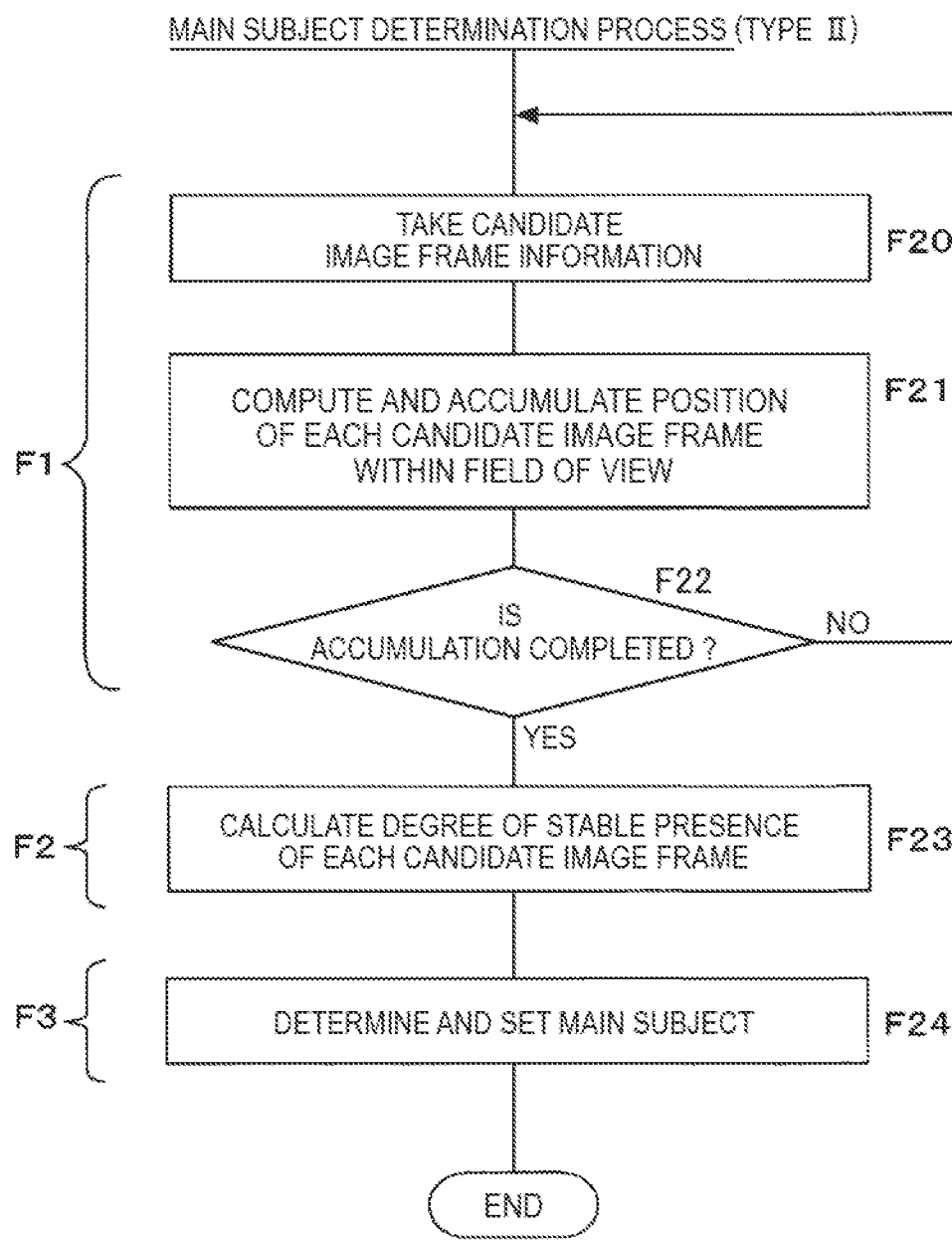
FIG. 5 is a flowchart of Type II of the main subject determination process according to the embodiment.

Next, a flow of a process of Processing Type II is shown in FIG. 5. FIG. 5 also shows the correspondence relationship of processes of Steps F20 to F24 corresponding to Steps F1 (taking-in and positional state determination), F2 (computation of a degree of stable presence), and F3 (setting of a main subject) of FIG. 2B described above.

Hereinafter, a process performed by the main subject determination unit 31 of the control unit 30 will be described.

In Step F20, the control unit 30 takes candidate image frame information of any one frame from the candidate detection unit 26.

In Step F21, the control unit 30 determines a positional state with regard to one or a plurality of candidate image frames indicated by the taken candidate image frame information by calculating a position within a field of view.

In this case, as a positional state, a distance of a candidate image from a determination reference point set within the field of view is determined. Alternatively, as a positional state, the positional relationship of the candidate image with a determination reference area set within the field of view is determined.

Then, the control unit 30 causes information of the computed positional state (distance or positional relationship) to be accumulated (buffered) in an internal RAM, or the like.

In Step F22, the control unit 30 determines whether or not accumulation of information of the positional state has been completed in a predetermined period (a length of time or the number of frames as a predetermined period of main subject determination), and when the accumulation has not been completed, the control unit returns to Step F20.

In other words, it is determined whether or not the predetermined period has passed or the processes of Steps F20 and F21 have been performed for a predetermined number of frames.

The control unit 30 proceeds to Step F23 at the time when the accumulation has been completed.

In Step F23, the control unit 30 calculates a degree of stable presence using, for example, information of the positional state of the predetermined period for which buffering is performed for each candidate image frame.

In this case, the control unit 30 computes cumulative time information indicating that the positional state satisfies a predetermined condition or duration information indicating that the positional state continuously satisfies the predetermined condition as the degree of stable presence.

Note that, in the computation of the degree of stable presence, position information of a candidate image within a field of view or size information of the candidate image may be used as a condition for the computation.

In Step F24, the control unit 30 determines a main subject using the degree of stable presence.

For example, a candidate image having the highest value of the degree of stable presence during a period of main subject determination in which buffering is performed is determined as a main subject, and then the candidate image is set as a main subject.

Note that, in the determination of the main subject, position information of the candidate image within the field of view or size information of the candidate image may also be used in addition to the value of the degree of stable presence.

Note that an example in which, for example, Step F21 is performed after completion of the accumulation is determined in Step F22 can also be considered as Processing Type II of FIG. 5. In other words, it is a technique in which the candidate image frame information is gradually accumulated for a predetermined period, and after the period passes, information of a positional state with regard to each piece of the candidate image frame information is obtained.

<3-3: Opportunity and Objective of Main Subject Determination, Etc.>

In the present embodiment, main subject determination is performed according to Processing Type I or II described above; however, an opportunity, an objective, and the like for performing main subject determination in the imaging apparatus 10 will be described.

First, an example of using a main subject determination result will be described.

Main subject determination is executed when, for example, a user (photographer) aims at a shutter timing (release timing), but the control unit 30 can perform the following process after a main subject is automatically determined.

Tracking Process

A main subject set in each captured frame is tracked. For example, a main subject is specified on a through image display for the user, and provided for adjusting an angle of view performed by the user (for example, for decision of a subject in a state in which a camera is held with a hand).

Note that, as presentation of a main subject, highlight display of the frame of the main subject on the through image display by the display unit 34 is considered. In addition, the highlight display or the like may be performed for a given period immediately after the determination, or may be performed as long as the main subject is present within the through image.

Focusing

Auto focus is controlled for a main subject. In addition, in accordance with the tracking process, focus is adjusted tracking the main subject even when the main subject moves around.

Exposure Adjustment

Automatic exposure adjustment is performed based on brightness (luminance) of a main subject.

Directivity Adjustment

When sound collection is performed by a microphone together with capturing (for example, dynamic image capturing), directivity adjustment is performed according to a direction of a main subject within a field of view.

In addition, a main subject can also be used in various signal processes performed with respect to a captured image signal.

Image Effect Process

Image processes including image quality adjustment, noise reduction, skin color adjustment, and the like are performed only on the area of a main subject in each capture frame.

Alternatively, adding an image effect, for example, a mosaicing process, an airbrushing process, a paint-out process, or the like in an area other than the area of the main subject is also considered.

Image Editing Process

An editing process such as framing, cropping, or the like is performed for a captured image or a recorded image.

For example, a process of cropping, enlarging, or the like of a partial area within a frame in which a main subject is included can be performed.

In addition, cutting of image peripheral portions of captured image data or the like can be performed so that a main subject is disposed at the center of the image, and composition adjustment can be performed.

These are merely examples, and various processes of application programs or automatic adjustment functions included in the imaging apparatus to use a set main subject are considered in addition to them.

Next, at what point of time the main subject determination process should be executed is also variously considered.

For example, whenever the imaging apparatus 10 is turned on to perform imaging (a period in which the display unit 34 displays a through image), the main subject determination process may be performed.

In addition, when a main subject is determined and then the tracking process is performed, the main subject determination process may be performed again at the time when the tracking is lost.

In addition, the main subject determination process may be set to start through a user operation.

In addition, the process may be executed whenever a user selects a determination execution mode, or tracking is lost.

In addition, automatically activating the main subject determination process regardless of a user operation may also be considered.

The following effects are achieved by performing the main subject determination process.

As previously described, it is naturally difficult to perform an operation of designating a main subject when a photographer aims at the subject holding the imaging apparatus 10. In addition, the action of designating subjects many times is bothersome. If main subject determination is set to be automatically performed, such troubles are overcome, and the effect of reduced stress on the user is obtained.

In addition, the imaging apparatus 10 that is carried and used by a user, such as a digital still camera, a camera included in a mobile telephone, or the like used by general users, has the display unit 34 of a small size, and thus it is difficult for the user to perform an accurate operation of designating a main subject on a screen. The problem of erroneous designation is resolved by performing automatic determination as described in the present embodiment.

In addition, if the imaging apparatus 10 is set to automatically perform main subject determination, the main subject determination is performed by a user merely holding the imaging apparatus 10 and aiming at a subject, and thus effects of enhancement of a feeling of intelligence that the user senses from the apparatus and enhancement of added value are obtained.

In addition, since the user can use the imaging apparatus 10 with a feeling of being able to image a main figure only by naturally holding the apparatus, imaging opportunities and use cases associated therewith can increase, and accordingly, a user-friendly camera can be provided to the user.

Based on the above points, as a hand-held camera, the imaging apparatus 10 of the present embodiment that automatically performs main subject determination is particularly preferred.

<4. Specific Processing Examples>

[4-1: Processing Example 1 (Type I; Determination Reference Point; First-arrival Determination; Cumulative Presence)]

Hereinafter, Processing Example 1 to Processing Example 12 will be described in order as specific examples of the main subject determination process executed by the control unit 30.

Processing Example 1 is a specific example of Processing Type I described above.

In addition, as a positional state of a candidate image frame, a distance to a set determination reference point is obtained.

In addition, as a degree of stable presence with regard to each candidate image frame, cumulative time information indicating that the positional state (distance to the determination reference point) satisfies the condition of being in the range of a predetermined threshold value is computed.

In addition, a candidate image of which a degree of stable presence has reached a predetermined value most quickly from the start of main subject determination is determined to be a main subject.

Prior to detailed description of a process, a candidate image frame, a distance to a determination reference point, and a degree of stable presence will be described using FIGS. 6, 7, and 8.

Figure 6:
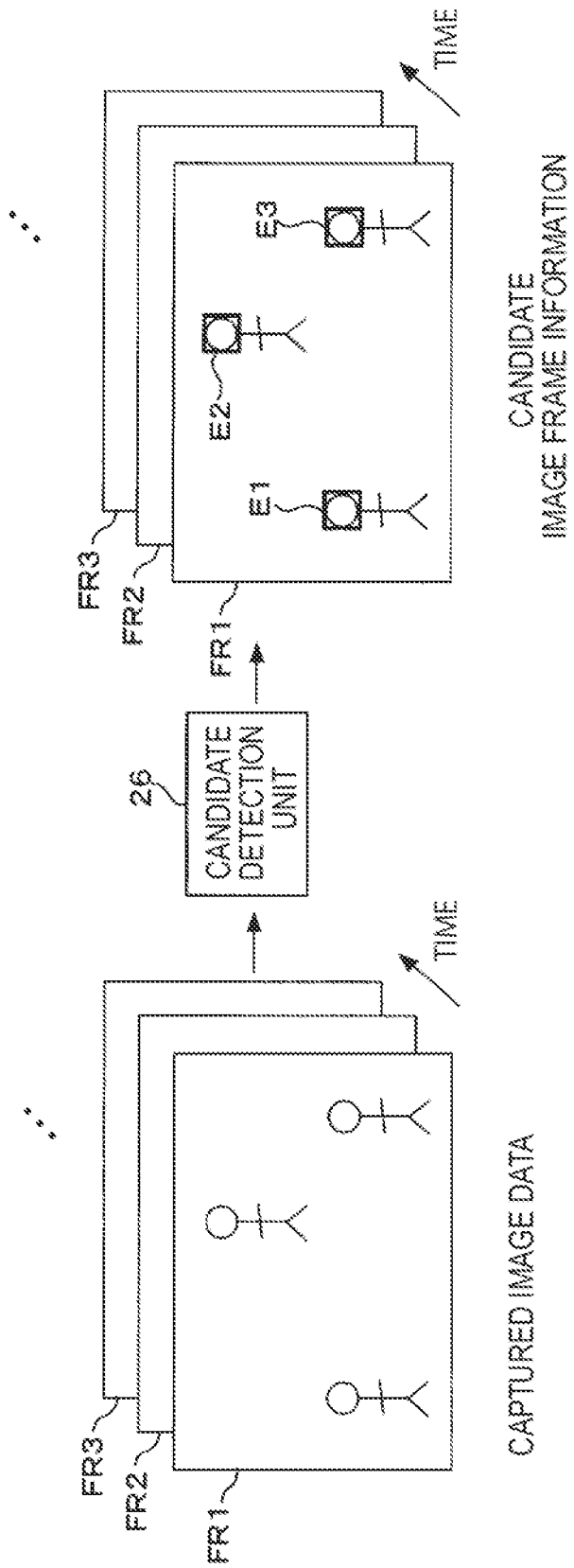
FIG. 6 is an illustrative diagram of candidate image frames and determination reference points according to the embodiment.

FIG. 6 schematically shows a candidate image frame extraction operation performed in the candidate detection unit 26.

The drawing shows each of frames FR1, FR2, FR3, . . . of a captured image signal input to the digital signal processing unit 20 through an operation of the optical system 11 and the imager 12 of the imaging apparatus 10. The candidate detection unit 26 performs detection of candidate images for each of the continuous frames sequentially input as above (or for each of intermittent frames).

For example, when there are three persons in the frame FR1 as shown in the drawing, each of the face image portions of the persons is extracted as a candidate image, and then candidate image frame information of candidate image frames E1, E2, and E3 thereof are output. For example, the candidate image frame information of the candidate image frame E1 includes, for example, position information (x and y position information and subject distance information), within the image of the candidate image frame E1, and size information (the width and height of the frame and the number of pixels) and attribute information of the frame, and the like.

The candidate detection unit 26 also generates such candidate image frame information with regard to the candidate image frames E2 and E3, and then transfers the information to the control unit 30 (main subject determination unit 31).

In the same manner, the candidate detection unit 26 extracts candidate images of the following frames FR2, FR3, . . . , generates candidate image frame information for each of candidate image frames of the images, and then transfers the information to the control unit 30.

The control unit 30 computes a distance to the determination reference point as a positional state of each of the candidate image frames each time the control unit takes the candidate image frame information of each frame.

FIG. 7A shows an example of the determination reference point SP. This is an example in which the center of an image is set to be the determination reference point SP. x and y coordinate values of the determination reference point SP are set to (Cx, Cy).

When the candidate image frame information of each of the candidate image frames E1, E2, and E3 is taken at the time of the frame FR1, for example, the control unit 30 computes the distances Diff1, Diff2, and Diff3 from each of the centers of gravity G of the candidate image frames E1, E2, and E3 shown in the drawing to the determination reference point SP.

Note that setting the determination reference point SP at the screen center is an example.

The determination reference point SP may be set at a position, for example, on a slightly upper-left side of the center as shown in FIG. 7B. This is because there are many cases to be considered in which a main subject is better to be disposed at a position that is not the center when, for example, composition of a still image is considered.

In any event, the distances between each of candidate image frames (for example, E4 and E5) and the determination reference point SP (for example, Diff4 and Diff5) are computed as shown in FIG. 7B.

The determination reference point SP may be set at, for example, such fixed positions as shown in FIGS. 7A and 7B, or may be arbitrarily designated by a user through a touch operation on a display screen or the like. In addition, several candidate points for a determination reference point may be presented on the screen of the display unit 34 to a user so that the user can select one. Furthermore, the control unit 30 is considered to determine an optimum position in consideration of composition and the like according to the content of an image, an image analysis result, and the like for automatic setting.

In other words, the following conditions are considered with regard to the determination reference point SP;
being set at a pre-decided fixed position such as the position of the center of an image, a position deviated from the center, or the like;
being arbitrarily designated by a user;
being set such that several candidate points are presented to a user so that the user can select one;
being flexibly set in an automatic manner by the control unit 30 determining an optimum position according to the content of an image; and the like.

The distance Diff(n) as a positional state of a candidate image frame E(n) is obtained at a time point of each frame.

Figure 8:
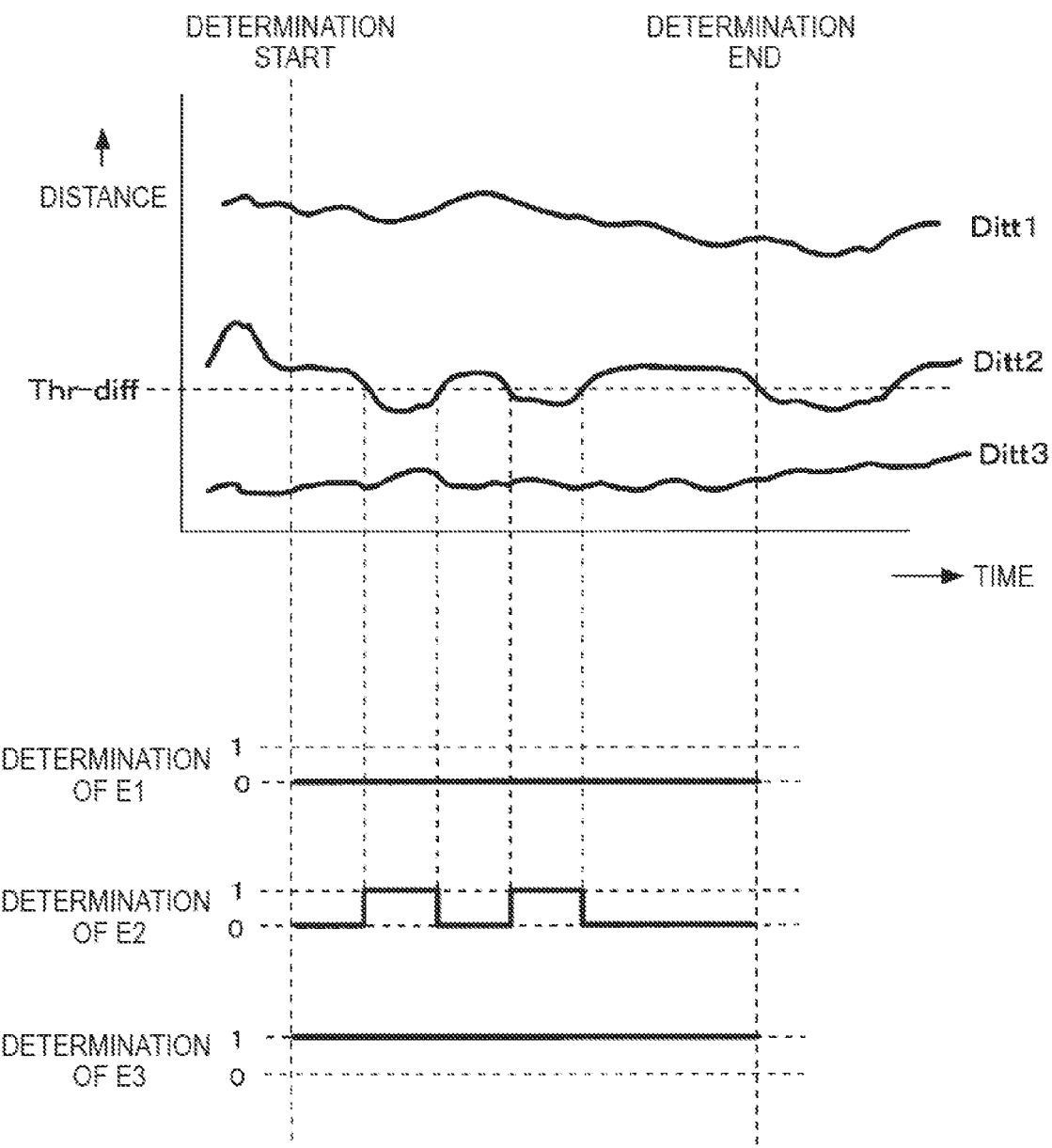
FIG. 8 is a graph of determination of stable presence based on a positional state according to the embodiment.

FIG. 8 shows the state of changes of the computed distances Diff1, Diff2, and Diff3 on the assumption that the candidate image frames E1, E2, and E3 are continuously present in frames (FR1, FR2, . . . ) for a certain period of time.

For example, a case in which a photographer is capturing three subjects for a given period of time using the imaging apparatus 10 is assumed. Because each of the three persons moves independently, the photographer moves a subject distance of the imaging apparatus 10, camera shaking or the like occurs, and each of the computed distances Diff1, Diff2, and Diff3 changes on a time axis.

In Processing Example 1, a degree of stable presence is set to be a cumulative time during which a subject is close to the determination reference point SP. For this reason, a distance threshold value Trs-diff is used in determining whether a subject is "close or not close."

In the lower part of FIG. 8, determination results of whether or not a distance is within the distance threshold value Trs-diff at each time point of the distance Diff1, Diff2, and Diff3 are shown. If a distance Diff(n) is equal to or shorter than the distance threshold value Trs-diff, being close="1" is set.

The result obtained by cumulatively adding the determination result "1" at each time point is the degree of stable presence of Processing Example 1.

A period from determination start to determination end varies depending on processing examples. In Processing Example 1, the cumulative addition value of the determination result "1" that is equal to or less than the distance threshold value Trs-diff serves as a cumulative time indicating the level of stable presence up until the time point, and a time point at which a candidate image of which the cumulative time has reached a predetermined value is found is the time point of determination end.

In the example of FIG. 8, the candidate image frame E3, for example, is determined to continuously have "1 (=close to the determination referent point SP)," and at the time point at which the cumulative addition value reaches a certain predetermined value, determination ends, and the candidate image frame E3 is determined to be a main subject.

Note that, in Processing Example 1, continuity does not matter. For example, the distance Diff3 of the candidate image frame E2 in FIG. 8 is determined to have "1" or "0" depending on time points, but since it is entirely dependent on a cumulative time, when there are many cases of "1" and its cumulative time has reached a predetermined value more quickly than any other candidate image frame, the candidate image frame E2 can be determined to be a main subject.

The main subject determination process of the control unit 30 as Processing Example 1 will be described in FIG. 9.

When the main subject determination process is started, the control unit 30 first sets a variable TSF=0 and a count value Cnt(n)=0 in Step F100.

The variable TSF is a flag indicating whether or not a main subject has been set. TSF="0" indicates the state in which a main subject has not been determined.

In addition, the count value Cnt(n) is a value of a counter that adds values of comparison determination results of the distances Diff and the distance threshold value Trs-diff described above.

Note that "n" indicates natural numbers of 1, 2, 3 ... and the count value Cnt (n) is set to be a count value corresponding to each detected candidate image frame E (n) like the candidate image frames E1, E2, and E3. When the three candidate image frames E1, E2, and E3 are detected, Cnt1, Cnt2, and Cnt3 are used as count values. For the sake of description of the flowchart, it is advised that a process with regard to the count value Cnt(n) be understood as, for example, a process targeting each of Cnt1, Cnt2, and Cnt3.

In addition, in the same manner, the distance Diff(n) collectively indicates the distances Diff1, Diff2, and Diff3 from the determination reference point SP to each of the three candidate image frames E1, E2, and E3, and a process with regard to the distance Diff(n) is used to mean, for example, a process with regard to each of the distances Diff1, Diff2, and Diff3.

In addition, a candidate image frame E(n) indicates each of the candidate image frames E1, E2, E3 . . . , but it is preferably distinguished for each subject over a plurality of frames. In an example in which the candidate detection unit 26 extracts a face, when a person A, a person B, and a person C are subjects, for example, the face image portion of the person A is set to be the candidate image frame E1, the face image portion of the person B to be the candidate image frame E2, and the face image portion of the person C to be the candidate image frame E3 common in each of the frames. If only a person D is interposed as a subject in a certain middle frame, the face image portion of the person D is set to be a candidate image frame E4. Thus, it is better for the candidate detection unit 26 to not only merely detect a "face" but also determine an entity (individual).

In Step F101, the control unit 30 takes candidate image frame information of a certain frame from the candidate detection unit 26. For example, with regard to each candidate image frame E(n), information including an x value and a y value of two-dimensional (x-y) coordinate values of image data as position information, and a width w and a height h of the candidate image frame as size information are acquired.

Note that the candidate image frame information may also include a subject distance (a relative distance of a subject to a camera position indicated by a value of a z axis direction orthogonal to the two-dimensional (x-y) coordinate plane; z value), the number of pixels, and the like.

In Step F102, the control unit 30 computes the coordinates of the center of gravity G with regard to each candidate image frame E(n).

For example, for the candidate image frame information, the coordinate values of an upper-left vertex of a square-shaped candidate image frame are given as x and y coordinate values of the candidate image frame. The x and y coordinate values are set to (E(n)_x, E(n)_y). In addition, as shown in FIG. 7, the x and y coordinates have the upper-left portion of the screen plane as the origin O (where the x and y coordinate values are (0, 0)).

In addition, the width w of the candidate image frame E(n) is set to E(n)_w and the height h thereof is set to E(n)_h.

Then, if the coordinate values of the center of gravity G of the candidate image frame E(n) are set to (E(n)_cx, E(n)_cy), the coordinate values of the center of gravity G are obtained as follows.

$$E(n)\_cx=E(n)\_cx+E(n)\_w/2$$

$$E(n)\_cy=E(n)\_cy+E(n)\_h/2$$

In Step F103, the control unit 30 computes the distance Diff(n) from the center of gravity G of each candidate image frame E(n) to the determination reference point SP. With coordinate values (Cx, Cy) of the determination reference point SP, the distance is obtained as follows.

$$\text{Diff}(n)=\sqrt{\{(E(n)\_cx-Cx)^2+(E(n)\_cy-Cy)^2\}}$$

In Step F104, the control unit 30 checks the variable TSF. If the variable TSF=0, the process proceeds to Step F105.

Note that, when the main subject determination process is started and then continues at all times, the process of Step F104 is excluded at the time when no determination is necessary (when the variable TSF=1). Step F104 may be set to be unnecessary when the main subject determination process of FIG. 9 is set to be executed through a user operation or automatic activation determination when necessary, or the like. The same applies to Processing Example 2 and succeeding examples that will be described later.

In Steps F105, F106, and F107, the control unit 30 checks whether or not each candidate image frame E(n) satisfies predetermined conditions with regard to the distance Diff(n).

In other words, whether or not the distance Diff(n) to the determination reference point SP is close to the determination reference point SP is determined using the distance threshold value Trs-diff.

To this end, the control unit 30 compares the distance Diff(n) from each candidate image frame E(n) to the determination reference point SP to the distance threshold value Trs-diff in Step F105, and if Diff(n)<Trs-diff is satisfied, a flag Flg(n)=1 (close) is set in Step F106. In addition, if Diff(n)<Trs-diff is not satisfied, the flag Flg(n)=0 (not close) is set in Step F107.

Next, in Steps F108 and F109, the control unit 30 computes the degree of stable presence of each candidate image frame E(n). In this case, in Step F108, whether or not the flag Flg(n)=1 is satisfied is checked for each candidate image frame E(n), and if Flg(n)=1 is satisfied, the count value Cnt(n) increases (1 is added) in Step F109. When the flag Flg(n)=0, the count value Cnt(n) does not change.

The count value Cnt(n) serves as the value of the degree of stable presence as the cumulative addition value described above. In other words, it is the value indicating the frequency of the candidate image frame E(n) in the state of being "close" to the determination reference point SP.

Next, in Steps F111, F112, and F113, the control unit 30 determines a main subject using the degree of stable presence of each candidate image frame E(n).

The control unit 30 checks in Step F111 whether or not the count value Cnt(n) of each candidate image frame E(n) has reached a count threshold value CTthr.

If Cnt(n)≥CTthr is not satisfied, in other words, if any count value Cnt(n) of each candidate image frame E(n) has not reached the count threshold value CTthr, the variable TSF=0 is set without change in Step F113, and then the process returns to Step F101 without setting to determination end in Step F114. In this case, the processes of Step F101 and the succeeding steps are executed based on candidate image frame information input for the next frame in the same manner as described above.

Note that, if the variable TSF=0 is satisfied in Step F114, determination of a main subject has not yet been completed and the determination process continues, and if the variable TSF=1 is satisfied, main subject determination is assumed to be completed.

When the variable TSF=1 is detected in Step F104 described above, determination end is set without change.

Although detailed description will be omitted, selection of a main subject may be designed to be performed in parallel with automatic main subject determination of the present example through, for example, a touch operation for the main subject performed by a user on the screen of the display unit 34, an operation of half-pressing a shutter button after adjusting a subject in a predetermined position on the screen, or the like. When a user performs such a designation process during execution of the process of FIG. 9, it is preferable to prioritize the user operation. Thus, when main subject setting is performed through such a manual operation, the variable TSF=1 is set. In this case, the process of FIG. 9 may be set to stop (stop halfway) based on the determination of Step F104 and f114.

Since the main subject determination based on the degree of stable presence is made for over a certain time length, if the process with regard to the candidate image frame information is not performed for a certain period of time (a number of frames), the process returns to Step F101 and succeeding processes are repeated without the determination ending in Step F114 described above.

Here, for example, a certain candidate image frame E3 shown in FIG. 8 may be discontinuous, but a situation in which the frame is present in a position close to the determination reference point SP in a plurality of frames on a captured image with a high frequency is assumed. Thus, many opportunities in which the count value Cnt1 if the candidate image frame E3 increases in Step F109 are created as time goes by, and a count value Cnt3 is obtained more quickly than count values Cnt1 and Cnt2.

Then, the count value Cnt3 reaches the count threshold value CTthr for the first at a certain time point.

In such a case, the control unit 30 causes the process to proceed from Step F111 to F112.

In Step F112, the control unit 30 determines the candidate image frame E(n) of which the count value Cnt(n) has reached the count threshold value CTthr to be a main subject, and performs main subject setting. Then, variable TSF=1 is set.

In this case, the determination end is set in Step F114. In other words, the main subject determination process of FIG. 9 is completed with, for example, the candidate image frame E3 set to be a main subject.

Note that Processing Example 1 continues until variable TSF=1 is set, but in a real case, it is proper to set a predetermined time limit. In other words, when it is difficult to determine a main subject even after a predetermined time elapses from the process start time of FIG. 9, it is regarded that no main subject is present, and then the process is set to end.

According to Processing Example 1 described above, as a user holds the imaging apparatus 10 (tracks a subject) so that the subject that the user wants to primarily capture is as close to the determination reference point SP such as the center of an image, or the like as possible, the subject is automatically determined as a main subject.

Particularly, in Processing Example 1, the degree of stable presence is determined based on a cumulative time of the state of being "close" to the determination reference point SP. In the case of a subject moving around or a subject making quick movements such as an animal, there are cases in which a photographer has difficulty in continuously capturing a subject of interest at the center of an image for a certain period of time (for example, even for about several seconds). In addition, there are also cases in which it is difficult to keep a desired subject at the center of an image due to serious camera shaking or the like depending on a photographer's skills. Even in such cases, main subject determination can be made relatively quickly using a cumulative time.

Therefore, the cumulative time is useful for a target subject that moves quickly or for a relatively inexperienced user.

In addition, since the main subject determination process does not have to be performed for a fixed period of time and the process ends at the time when a main subject is determined, it is advantageous in that a main subject determination is quickly established depending on subjects and photographer's skills.

[4-2: Processing Example 2 (Type I; Determination Reference Point; First-arrival Determination; Continuous Presence)]

Next, Processing Example 2 is also a specific example of Processing Type I described above.

In addition, as a positional state of a candidate image frame, a distance to a set determination reference point is obtained.

In addition, as a degree of stable presence with regard to each candidate image frame, duration information that the positional state (distance to the determination reference point) satisfies the condition of being in the range of a predetermined threshold value is computed.

In addition, a candidate image of which a degree of stable presence has reached a predetermined value most quickly from the start of main subject determination is determined to be a main subject.

A difference from Processing Example 1 is that the degree of stable presence is set to be duration of the state of being close to the determination reference point SP. A candidate image frame that is thoroughly continuously close to the determination reference point SP for over a predetermined period of time (predetermined number of frames) is determined to be a main subject.

Figure 10:
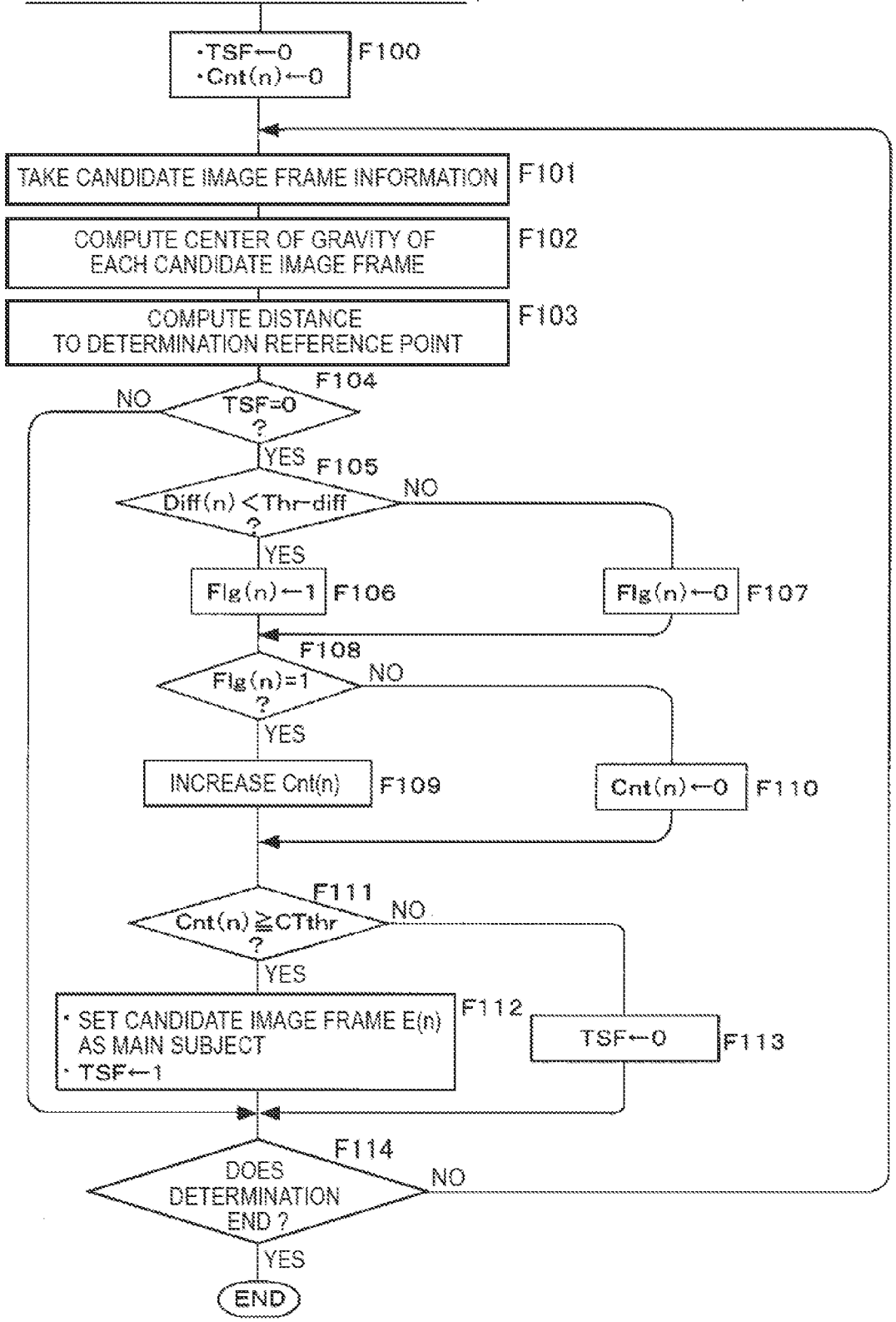
FIG. 10 is a flowchart of Processing Example 2 according to the embodiment.

FIG. 10 shows Processing Example 2. Overlapping description will be avoided by giving the same step numbers to the same processes as in FIG. 10.

Note that, for each flowchart of Processing Example 3 to Processing Example 12 that will be described later, the processes that have been described will be given the same step numbers and description thereof will be omitted.

Figure 9:
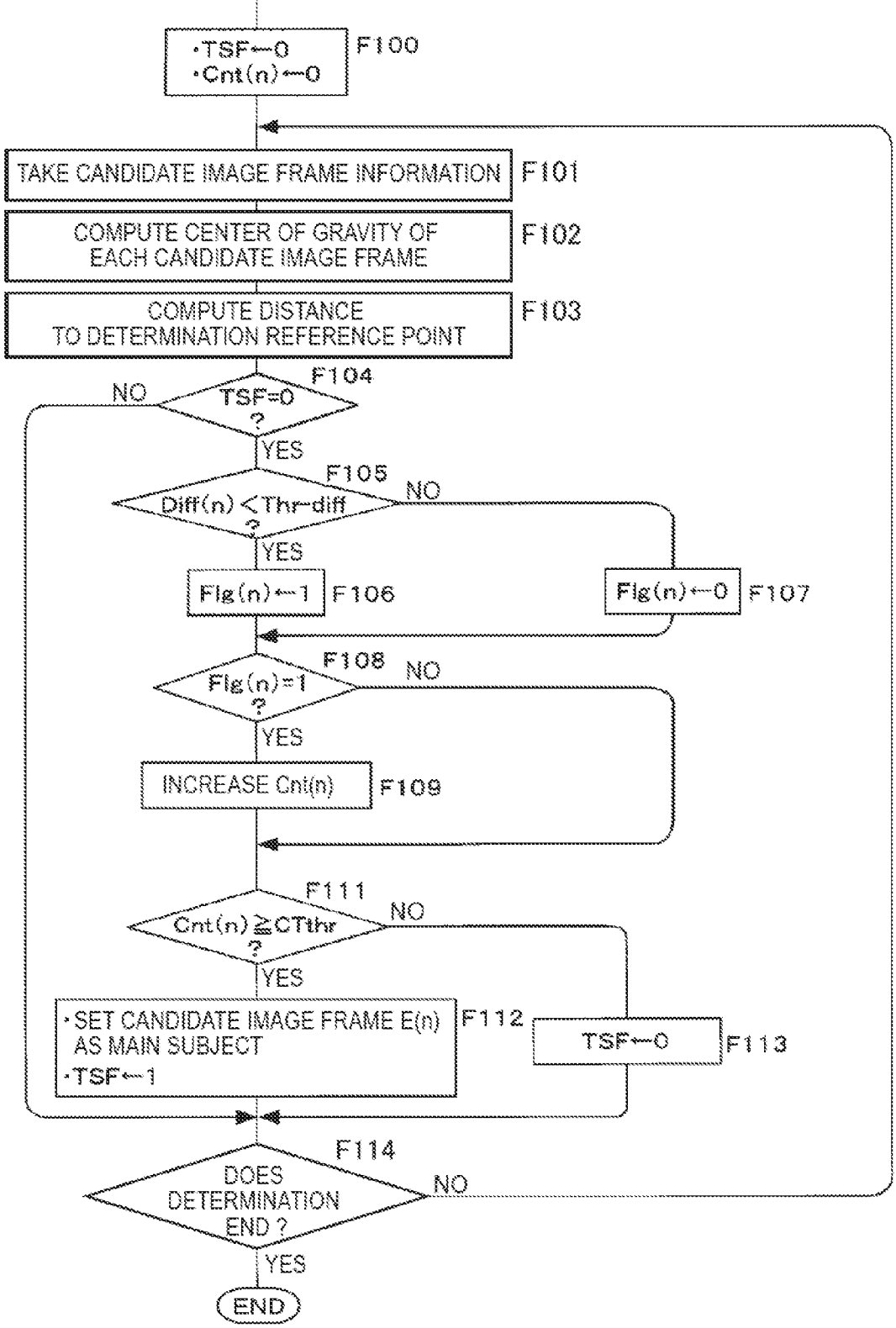
FIG. 9 is a flowchart of Processing Example 1 according to the embodiment.

FIG. 10 is of an example in which Step F110 is added to the process of FIG. 9.

In Steps F108, F109, and F110, the control unit 30 computes the degree of stable presence of each candidate image frame E(n). In this case, whether or not the flag Flg(n)=1 is checked for each candidate image frame E(n) in Step F108, and if flag Flg(n)=1 is satisfied, the count value Cnt(n) increases (1 is added) in Step F109. When the flag Flg(n)=0, the process proceeds to Step F110 and the count value Cnt(n) is cleared.

As in Processing Example 1, the count value Cnt(n) serves as the value of the degree of stable presence. In other words, the count value is added according to detection of the state of the candidate image frame E(n) being "close" to the determination reference point SP. However, in Processing Example 2, the count value Cnt(n) is cleared in Step F110.

This means that, once a frame is apart from the determination reference point SP, the value of the degree of stable presence returns to zero.

For example, if a certain candidate image frame is in a state of being apart in a certain frame even if the candidate image frame has been close to the determination reference point SP, the corresponding count value Cnt(n) is reset.

Thus, with regard to each of candidate image frames E(n), the value of the degree of stable presence (count value Cnt(n)) increases as long as subjects of the frames are captured in the state of being continuously close to the determination reference point SP (in the range of the distance threshold value Trs-diff). In other words, in Processing Example 2, the count value Cnt(n) indicates "duration" of the state of being close to the determination reference point SP.

In addition, a case in which the count value Cnt(n) reaches the count threshold value CTthr in Step F111 is a case in which a certain candidate image frame continuously satisfies the condition of continuously being close to the determination reference point SP for the number of frames (time) corresponding to the count threshold value CTthr.

In such a case, the control unit 30 causes the process to proceed from Step F111 to F112, then the control unit 30 determines a candidate image frame E(n) of which the count value Cnt(n) has reached the count threshold value CTthr as a main subject, and then performs main subject setting. In addition, the variable TSF=1 is set.

Other processes are the same as those in FIG. 9.

Note that, when it is difficult to determine a main subject even after a predetermined time limit elapses from the time point of the process start also in Processing Example 2, the process may be set to end without finding a main subject.

According to Processing Example 2 described above, by holding the imaging apparatus 10 (tracking a subject) so that the subject that a user wants to primarily capture is in the state of being as close to the determination reference point SP such as the center of an image as possible, the subject is automatically determined as a main subject.

Particularly, in Processing Example 2, whether or not a frame is stably present is evaluated based on duration. In this case, when a subject that moves little is targeted, the target subject can be continuously captured at the center of an image or the like with ease, and thus there is a high possibility of being able to accurately set a main subject desired by the user. In addition, depending on photographers' skills, a subject desired to be primarily captured can be continuously kept at the center of an image or the like (a position close to the determination reference point SP), and thus there is a high possibility of being able to accurately determine a subject desired by a photographer as a main subject. In other words, it is possible to further raise a possibility of being able to determine a subject desired by a user as a main subject depending on a photographer having an advanced level of photographing skill or subjects.

In addition, since the main subject determination process does not have to be performed for a fixed time, and ends at the time when a main subject is determined, main subject determination is swiftly made depending on subjects or photographers' skills.

[4-3: Processing Example 3 (Type I; Determination Reference Point; First-arrival Determination; Cumulative Presence; Expanded Example)]

Processing Example 3 is also a specific example of Processing Type 1 described above, but Processing Example 3 is an example obtained by developing Processing Example 1 described above.

As a positional state of a candidate image frame, a distance to a set determination reference point is obtained.

As a degree of stable presence with regard to each candidate image frame, cumulative time information that the positional state (distance to the determination reference point) satisfies the condition of being in the range of a predetermined threshold value is computed.

A candidate image of which a degree of stable presence has reached a predetermined value most quickly from the start of main subject determination is determined to be a main subject.

The above is the same as in Processing Example 1, but in Processing Example 3, the computation of a degree of stable presence can be weighted. In addition, a process of dealing with a case in which the degrees of stable presence of a plurality of candidate image frames simultaneously reach a predetermined value, in other words, a case in which a plurality of candidate image frames are determined as main subjects, is added.

Figure 11:
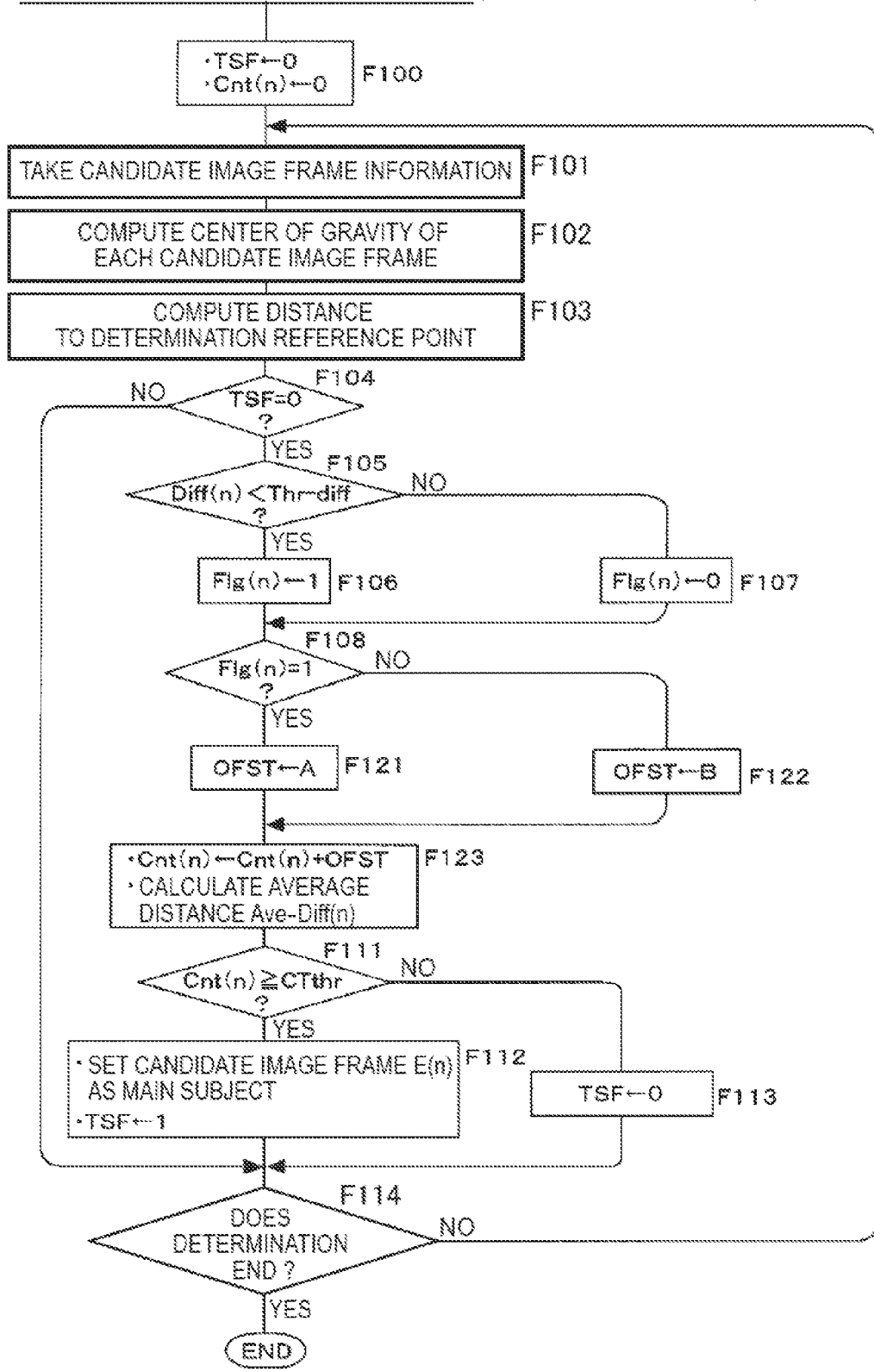
FIG. 11 is a flowchart of Processing Example 3 according to the embodiment.

FIG. 11 shows Processing Example 3. Steps F100 to F107 are the same as those of FIG. 9.

In Step F108, F121, F122, and F123, the control unit 30 computes the degree of stable presence of each candidate image frame E(n).

In this case, in Step F108, it is checked whether or not the flag Flg(n)=1 for each candidate image frame E(n).

If the flag Flg(n)=1 is satisfied, the control unit 30 proceeds to Step F121, and substitutes a count variable OFST with a variable set value A. The variable set value A is a value set based on A>0.

If the flag Flg(n)=0 is satisfied, the control unit 30 proceeds to Step F122, and substitutes a count variable OFST with a variable set value B. The variable set value B is a value set based on A≤0.

Then, in any case, the control unit 30 performs the following arithmetic operation for a count value Cnt(n) serving as the value of the degree of stable presence in Step F123.

$$Cnt(n) = Cnt(n) + OFST$$

In addition, the average distance Ave-Diff(n) of each candidate image frame E(n) is computed.

Since the variable set value A>0, if the flag Flg(n)=1 is satisfied in Step F108, the value of the degree of stable presence (count value Cnt(n)) increases.

In addition, a case in which the count value Cnt(n) reaches the count threshold value CTthr in Step F111 is a case in which a certain candidate image frame satisfies the condition of being, albeit discontinuous, close to the determination reference point SP in a plurality of frames with a high frequency.

In such a case, the control unit 30 proceeds to Step F111 to F112, and the control unit 30 determines the candidate image frame E(n) of which the count value Cnt(n) has reached the count threshold value CTthr as a main subject, and then performs main subject setting. Then, the variable TSF=1 is set.

The processes of Steps F113 and F114 are the same as those in FIG. 9.

In addition, when it is difficult to determine a main subject even after a predetermined time limit elapses from the time point of the process start in Processing Example 3, the process may be set to end without finding a main subject.

Meanings of the processes of Steps F108, F121, F122, and F123 described above are as follows.

The variable set values A and B may be set to be fixed by the control unit 30, or may be set based on a user instruction, an application program, or the like. Alternatively, the values may be changed according to progress of the number of frames or an elapsed time during a period in which main subject determination is performed. In other words, values of the variable set values A and B can be set based on an external factor of the main subject determination process.

Hereinbelow, various setting examples of the variable set values A and B will be described as (ex1) to (ex7).

(Ex1): In the Case of Fixed Setting of the Variable Set Values A=1 and B=0

In such a setting, the process of FIG. 11 is the same as that of FIG. 9. In other words, if the flag Flg(n)=1 is satisfied in Step F108, the count value Cnt(n) increases, and if the flag Flg(n)=0 is satisfied, the count value Cnt(n) does not increase, but is kept.

(Ex2): In the Case of Fixed Setting of the Variable Set Values A=2 (or 3 or Higher) and B=0

For example, (ex1) described above is generally applied, but the value of the variable set value A is raised according to a user instruction or an instruction of an application program. In this case, it is possible to shorten a time taken for the count value Cnt(n) to reach the count threshold value CTthr. Thus, this setting is preferred for a case in which main subject determination is desired to end more quickly than normal, a case in which a response speed in main subject determination is desired to increase in order to target a subject that moves quickly, and the like.

(Ex3): In the Case of Fixed Setting of the Variable Set Values A=1 and B=−1

This is an example in which, increasing is generally performed, but if the flag Flg(n)=0 is satisfied, the count value Cnt(n) decreases.

In other words, this setting is a process of reducing the degree of stable presence when a certain candidate image frame is apart from the determination reference point SP (when the flag Flg(n)=0).

This setting is based on the notion that importance is placed on a subject that is kept in the state of being as close to the determination reference point SP as possible, and thus is a notion close to that of Processing Example 2 described above, but determination is made thoroughly based on a cumulative time, and not limited to duration. In other words, the notion of the degree of stable presence of Processing Example 1 approximates the notion of Processing Example 2.

(Ex4): In the Case of Fixed Setting of the Variable Set Values A=1 and B=−2 (or −3 or Lower)

Although similar to (ex3) described above, this setting is an example in which, when a certain candidate image frame is apart from the determination reference point SP and the flag Flg(n)=0 is set, the level to which the degree of stable presence is hindered is raised. In other words, the setting enhances the importance of being close to the determination reference point SP in main subject determination.

(Ex5): In the Case of Fixed Setting of the Variable Set Values A=2 (or 3 or Higher) and B=−2 (or −3 or Lower)

This is a processing example to which a combination of the notions of (ex2) and (ex4) described above is applied. This setting enhances the importance of being close to the determination reference point SP in main subject determination and determination responsiveness.

(Ex6): Changing the Variable Set Value a During a Determination Period

For example, a determination period in which the process of FIG. 11 is executed is set as divided periods including a first period, a second period, . . . in units of a predetermined time from a starting point.

Then, the variable set value A is changed such that A=1 in the first period, A=2 in the second period, A=3 in a third period, and the like.

This increases the value of being close to the determination reference point SP as the process proceeds to the latter half.

When a photographer generally holds a camera targeting a subject, the photographer gradually adjusts the direction of the camera, rather than placing the subject that is desired to be a main object in a desired position such as the center of an image in the first place. When this practice is considered, a subject that has been kept in the photographer's mind as a "main subject" in the first place is gradually captured at the center of the image as time goes by.

Thus, increasing the importance of being close to the determination reference point SP during execution of the main subject determination process as time goes by raises a possibility of main subject determination agreeing with the photographer's thinking.

Note that setting of the divided periods and the values of A in each of the divided periods in (ex6) are variously considered. On the other hand, an example in which the variable set value A is changed to gradually decrease such that A=3 in the first period, A=2 in the second period, A=1 in the third period, and the like depending on a capturing situation or environment to increase the value of being close to the determination reference point SP in the initial stage of determination is also considered.

For example, there is a case in which main subject determination is performed at the timing at which a subject that was first standing still starts moving.

In addition, setting of divided periods and the way of changing the variable set value A may be selected by a user.

In addition, with regard to the variable set value B of (ex6), any of (ex1) to (ex5) described above or (ex7) that will be described next can be combined.

(Ex7): Changing the Variable Set Value B During a Determination Period

For example, the determination period in which the process of FIG. 11 is executed is set as divided periods including a first period, a second period, . . . in units of a predetermined time from a starting point.

Then, the variable set value A is changed such that B=1 in the first period, B=2 in the second period, B=3 in the third period, and the like.

The notion of this setting is the same as that of (ex6) described above due to the fact that the importance of being apart from the determination reference point SP (a degree of non-stable presence) is appreciated as the process proceeds to the latter part. In other words, this is a notion that there are many cases in which a subject that is not considered as a main subject by a photographer is apart from the determination reference point SP as determination proceeds to the latter part. This also increases the possibility of main subject determination agreeing with the photographer's thinking.

Note that setting of the divided periods and the values of B in each of the divided periods in (ex7) are variously considered. An example in which the variable set value B is changed to gradually decrease such that B=3 in the first period, B=2 in the second period, B=1 in the third period, and the like depending on a capturing situation or environment to increase the value of being close to the determination reference point SP in the initial stage of determination is also considered.

In addition, setting of divided periods and the way of changing the variable set value B may be selected by a user.

In addition, with regard to the variable set value A of (ex7), any of (ex1) to (ex6) described above can be combined.

The above are examples; however, main subject determination according to objectives and situations is possible based on settings of the variable set values A and B as described above.

Note that, in Processing Example 3, main subject determination is performed using a count value Cnt(n) as cumulative time information of being close to the determination reference point SP as in Processing Example 1, but a value to be added to or subtracted from the count value Cnt(n) is decided according to the variable set values A and B. For this reason, the count value Cnt(n) is not a cumulative "time" itself, but a time that does not satisfy a condition is subtracted from the count value Cnt(n), or a weight of satisfaction of a condition is changed according to divided periods.

As described above, there is a case in which the count value Cnt(n) does not indicate a cumulative time of a "time (the number of frames)" that satisfies the condition of being close to the determination reference point SP, but in each embodiment, a "cumulative time" is used as a concept that also includes a cumulative time (or the number of frames) to which subtraction or weighting is applied as above.

However, the notion of using the variable set value A can also be applied to Processing Example 2 described above.

In other words, when the flag Flg(n)=1 in FIG. 10 described above, the count value Cnt(n) increases in Step F109, but at this point, an arithmetic operation of Cnt(n) =Cnt(n)+the variable set value A may be performed. With the setting of the variable set value A, the process of the notions as described in (ex2) and (ex6) above can be realized.

Note that, in such a case, there is a case in which the count value Cnt(n) does not directly indicate "duration" of "times (the number of frames)" that satisfy the condition of being close to the determination reference point SP, but the "duration" is also used as a concept that includes a time (or the number of frames) obtained by subtraction and weighting as described above.

Next, Processing Example 3 of FIG. 11 describes a process of Step F112 when count values Cnt(n) of a plurality of candidate image frames E(n) reach the count threshold value CTthr at the same time in Step F111.

The case in which the count values Cnt(n) of the plurality of candidate image frames E(n) reach the count threshold value CTthr at the same time in Step F111 of a certain time point is also considered.

In this case, the plurality of candidate image frames E(n) may also be considered as all being determined to be main subjects, but here, an example in which only one candidate image frame is determined as a main subject will be described.

In the case in which the degrees of stable presence (count values Cnt(n)) of the plurality of candidate image frames E(n) reach the count threshold value CTthr at the same time, setting one candidate image frame as a main subject under following (Condition 1) to (Condition 3) is considered.

(Condition 1): Select a Candidate Image Frame having the Minimum Average Distance Ave-Diff(n).

A count value Cnt(n) is counted up or down according to determination results of "flag Flg(n)=1" and "flag Flg(n)=0" in Step F105 regarding whether or not a distance Diff(n) is equal to or less than a distance threshold value Trs-diff. Thus, the count value Cnt(n) does not indicate an absolute distance Diff(n).

Here, an average distance Ave-Diff(n) is attempted to obtain in Step F123, it is possible to determine which candidate image frame is in the "state of being closer to the determination reference point SP" among the plurality of candidate image frames E(n).

In Step F123, the average distance Ave-Diff(n) can be obtained as follows.

Ave-Diff($n$)=(Cumulative addition value of the distance Diff($n$))/(The number of additions of the distance Diff($n$))

When the degrees of stable presence (count values Cnt(n)) of the plurality of candidate image frames E(n) reach the count threshold value CTthr at the same time, a candidate image frame having the smallest average distance Ave-Diff (n) may be determined to be a main subject in Step F112.

Note that determination is made based on the average distance Ave-Diff(n); however, determination may of course be made based on the cumulative addition value of the distance Diff(n).

In addition, selecting one candidate image frame using an index of whether or not the candidate image frame is in the range of a predetermined distance on average, or in the range of a predetermined area on average, rather than using an average distance is also considered.

In addition, a subject distance may be used. For example, differences between a position (z value) of a subject distance of a candidate image frame E(n) in each frame and a position of the determination reference point SP in the z axis direction is obtained. Then, the average value thereof is computed. This is an example of selecting a candidate image frame having the minimum average value of the subject distance differences.

(Condition 2): Selecting a Candidate Image Frame having a Size Included in a Predetermined Range.

Each candidate image frame E(n) has a size differing according to the distance between the imaging apparatus 10 and a subject, or a size of a subject itself. Generally, a photographer appropriately adjusts a size of a subject that he or she mainly wants to capture in an image by adjusting zoom to a certain extent with respect to the subject or changing his or her standing position. Thus, in many cases, a subject that a photographer considers as a main subject is included in a certain range of an image. In addition, there are many cases in which a remote subject or a subject for which a photographer does not adjust zoom or focus appears to be quite small or excessively large.

Thus, with regard to the number of pixels PX of a candidate image frame, for example, a determination upper limit PXmax and a determination lower limit PXmim are set, and thereby the following size condition is set.

$PXmax \geq PX(n) \geq PXmim$

In the case in which the degrees of stable presence (count values Cnt(n)) of the plurality of candidate image frames E(n) reach the count threshold value CTthr at the same time, a candidate image frame that satisfies the size condition may be determined to be a main subject in Step F112.

Note that the size condition may be set such that PXmax≥PX(n) in terms of only the upper limit, or PX(n)≥PXmim in terms of only the lower limit.

In addition, a size may be determined using a width w and a height h of a candidate image frame E(n), rather than using the number of pixels PX.

(Condition 3): Selecting a Candidate Image Frame in the Range of a Predetermined Distance or in a Minimum Distance at a Certain Time Point.

A candidate image frame that is determined to be close to the determination reference point SP or a candidate image frame that is closest to the determination reference point SP at a certain time point is set as a main subject.

A certain time point means, for example, the last frame of a time point at which the process proceeds to Step F112, the first frame when the main subject determination process is started, a middle frame, or the like.

For example, since a photographer targets the subject that he or she considers as the main subject, a subject considered as a main subject is considered to be close to the determination reference point SP in many cases toward the last time point. This is the same notion as the weighting of the last half of (ex6) described above or the like.

Thus, when the degrees of stable presence (count values Cnt(n)) of the plurality of candidate image frames E(n) reach the count threshold value CTthr at the same time, a candidate image frame E(n) having the minimum distance Diff(n) in the last frame may be determined as a main subject in Step F112.

Note that a candidate image frame E(n) of a distance Diff(n) included in a predetermined range (in other words, equal to or less than a distance threshold value Trs-diff) in the last frame may be determined as a main subject. However, it is difficult to use this condition in selection among a plurality of candidate image frames in Processing Example 3 because determination is made when count values Cnt(n) reach the count threshold value CTthr at the same time and all of the plurality of candidate image frames E(n) satisfy this condition, but in the case in which the main subject determination process is inevitably executed for a fixed period of time as in Processing Example 5 to Processing Example 12 that will be described below, selecting under this condition is effective.

In addition, there are cases in which a candidate image frame included in a predetermined distance range or in a minimum distance in a first frame, a middle frame, or the like, rather than in the final frame, is appropriately selected according to an imaging situation, a subject or the like.

In addition, a subject distance may be used. It is an example of selecting a candidate image frame having a minimum difference value of a subject distance by obtaining the difference between a position (z value) of a subject distance of a candidate image frame E(n) at a specific time point, for example, in the last frame or the like, and a position of the determination reference point SP in the z axis direction.

Hereinabove, (Condition 1) to (Condition 3) are exemplified, but a combination of (Condition 1) to (Condition 3) may of course be used in selecting one candidate image frame as a main subject, rather than using one condition. In addition, other conditions can also be used in selection.

As described above, when the control unit 30 should determine the plurality of candidate image frames E(n) as main subjects based on the degrees of stable presence (count value Cnt(n)) in Step F112, one candidate image is selected using position information or size information of the candidate image frames in a field of view, and the selected candidate image is set as a main subject.

Accordingly, it is possible to set one optimum main subject.

Note that the technique of selecting one out of a plurality of candidate image frames as a main subject can also be applied to Processing Examples 1 and 2.

Hereinabove, in Processing Example 3 described in FIG. 11, the same effect as in Processing Example 1 is obtained and appropriate main subject determination according to various situations is possible based on settings of the variable set values A and B.

[4-4: Processing Example 4 (Type I; Determination Reference Point; First-arrival Determination; Cumulative Presence; Conditional Determination)]

Next, Processing Example 4 is also a specific example of Processing Type 1 described above, but Processing Example 4 is an example obtained by further developing Processing Example 3 described above.

As a positional state of a candidate image frame, a distance to a set determination reference point is obtained.

As a degree of stable presence with regard to each candidate image frame, cumulative time information that the positional state (distance to the determination reference point) satisfies the condition of being in the range of a predetermined threshold value is computed.

In addition, a candidate image of which a degree of stable presence has reached a predetermined value most quickly from the start of main subject determination is determined to be a main subject.

The above is the same as in Processing Example 1 and Processing Example 3, but Processing Example 4 is an example to which other conditions are added in addition to the condition of whether or not a distance Diff(n) is equal to or less than the distance threshold value Trs-diff in computation of a degree of stable presence.

Figure 12:
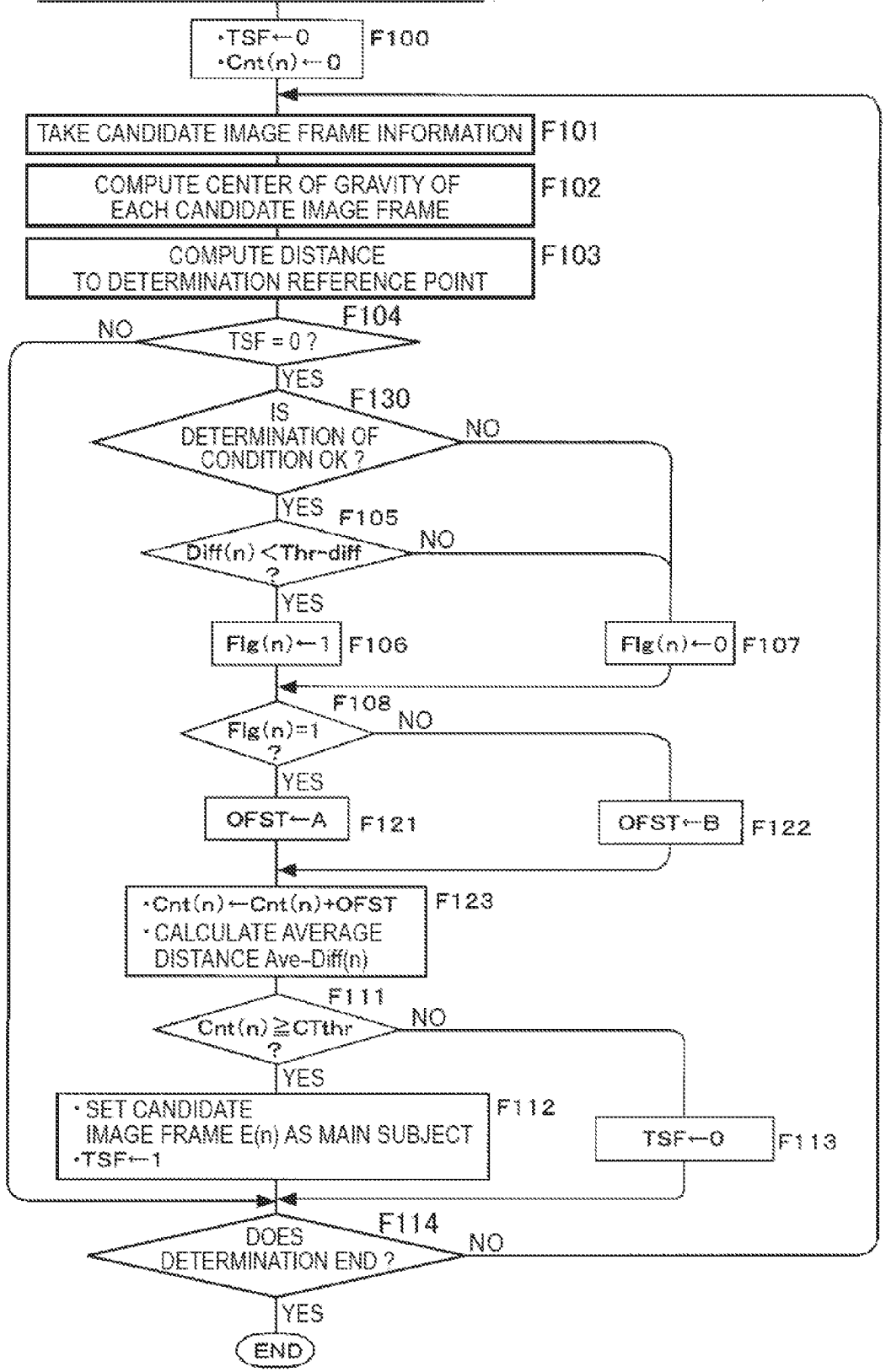
FIG. 12 is a flowchart of Processing Example 4 according to the embodiment.

FIG. 12 shows Processing Example 4. Steps F100 to F104, F105 to F108, F121 to F123, and F111 to F114 are the same as those of FIG. 11. FIG. 12 is a process in which Step F130 is added to the process of FIG. 11.

In Steps F130, F105, F106, and F107, a process of a flag Flg(n) is performed.

Here, in Step F130, the process is branched based on whether or not a certain condition is satisfied. Then, if the condition is satisfied, the process proceeds to Step F105 to determine whether or not a distance Diff(n) is equal to or less than the distance threshold value Trs-diff. Then, based on the determination result, the flag Flg(n) is set in either Step F106 or F107.

In addition, when the condition is determined not to be satisfied in Step F130, the process proceeds to Step F107, and the flag Flg(n)=0 is set.

In other words, for a candidate image frame E(n) that does not satisfy the condition in Step F130, the flag Flg(n)=0 is set regardless of the difference of Diff(n).

Processes after the process of the flag Flg(n) of Steps F106 and F107 are the same as in FIG. 11.

As the condition of Step F130, the following examples of (Condition 11) to (Condition 14) are considered.

(Condition 11): A Subject Distance is within a Predetermined Range.

The difference between a position (z value) of a candidate image frame E(n) as a subject distance and a position of the determination reference point SP in the z axis direction is obtained. That the subject distance difference value be within a predetermined range is set as a condition.
(Condition 12): A Size is within a Predetermined Range.

Each candidate image frame E(n) has a size differing according to the distance between the imaging apparatus 10 and a subject or a size of the subject itself. Based on the same notion as (Condition 2) described in Processing Example 3 above, since a photographer generally appropriately adjusts a size of a subject that he or she mainly wants to capture in an image by adjusting zoom to a certain extent with respect to the subject or changing his or her standing position, it is presumed that the photographer does not consider an image that is excessively small or excessively large as a main subject.

Thus, with regard to the number of pixels PX of a candidate image frame, for example, a determination upper limit PXmax and a determination lower limit PXmim are set, and thereby the following size condition is set.

$$PXmax \geq PX(n) \geq PXmim$$

Note that the size condition may be set such that PXmax≥PX(n) in terms of only the upper limit, or PX(n)≥PXmim in terms of only the lower limit.

In addition, a size may be determined using a width w and a height h of a candidate image frame E(n), rather than using the number of pixels PX.
(Condition 13): A Specific Type of Image For example, it is possible to set a condition in a candidate image extraction process by the candidate detection unit 26, but when the candidate detection unit 26 extracts a candidate image under a particularly extended condition, the condition for being a candidate image may be narrowed in Step F130.

For example, with a user's designation, an image of a face, a human body, a dog, a cat, or the like is set as a condition. When a dog image is set as a condition, if the type of a candidate image frame E(n) in Step F130 is a face image, a human body image, a cat image, or the like, the condition is determined not to be satisfied, and a count value Cnt(n) does not increase.
(Condition 14): A Specific State of an Image A condition that luminance information or color information of an extracted image itself be within a predetermined range, a predetermined color, or the like is added. In the case of luminance information, an image itself that is excessively dark or excessively bright is assumed not to satisfy the condition. In addition, if a user designates a certain color and a subject has the color, the subject can be determined to satisfy the condition.

Note that the control unit 30 may receive candidate image data itself, or luminance information or color information from the candidate detection unit 26 to determine a state of an image.

Hereinabove, (Condition 11) to (Condition 14) are exemplified, but a combination of (Condition 1) to (Condition 3) may of course be used in selecting one candidate image frame as a main subject, rather than using one condition. In addition to these conditions, other conditions can also be set.

The control unit 30 uses position information of a candidate image within a field of view, size information of a candidate image, and the like in the computation process of a degree of stable presence as described above.

Accordingly, Processing Example 4 described in FIG. 12 obtains the same effect as that of Processing Examples 1 and 3, and can perform more proper computation of a degree of stable presence with setting of a condition, and thereby a main subject that a photographer considers as a main subject can be automatically determined with higher accuracy.

Note that, in final main subject determination of Step F112, (Condition 11) to (Condition 14) described above may be determined. In other words, even when a count value Cnt(n) of a certain one candidate image frame E(n) reaches the count threshold value CTthr in Step F111, the candidate image frame is not set as a main subject naturally, and a process of not determining the candidate image frame as a main subject if the frame fails to satisfy the condition is also considered. In this manner, the control unit 30 may use position information of a candidate image within a field of view, size information of a candidate image, or the like in the main subject determination process of Step F112.

In addition, setting a condition in computation of a degree of stable presence as in Step F130 and setting a condition in main subject determination as in Step F112 described above can also be applied to Processing Example 2 in which a degree of stable presence is used as a duration.
[4-5: Processing Example 5 (Type I; Determination Reference Point; Fixed-time Determination; Cumulative Presence)]

Processing Example 5 is also a specific example of Processing Type I, but Processing Example 5 is an example of performing main subject determination for a fixed time, different from Processing Example 1 to Processing Example 4 described above.

In other words, this is a processing example in which the control unit 30 determines a candidate image having a highest value of a degree of stable presence in a fixed main subject determination period.

As a positional state of a candidate image frame, a distance to a set determination reference point is obtained.

As a degree of stable presence with regard to each candidate image frame, cumulative time information that the positional state (distance to the determination reference point) satisfies the condition of being in the range of a predetermined threshold value is computed.

For main subject determination, a candidate image having the highest value of the degree of stable presence in a fixed main subject determination period is chosen as described above.

Figure 13:
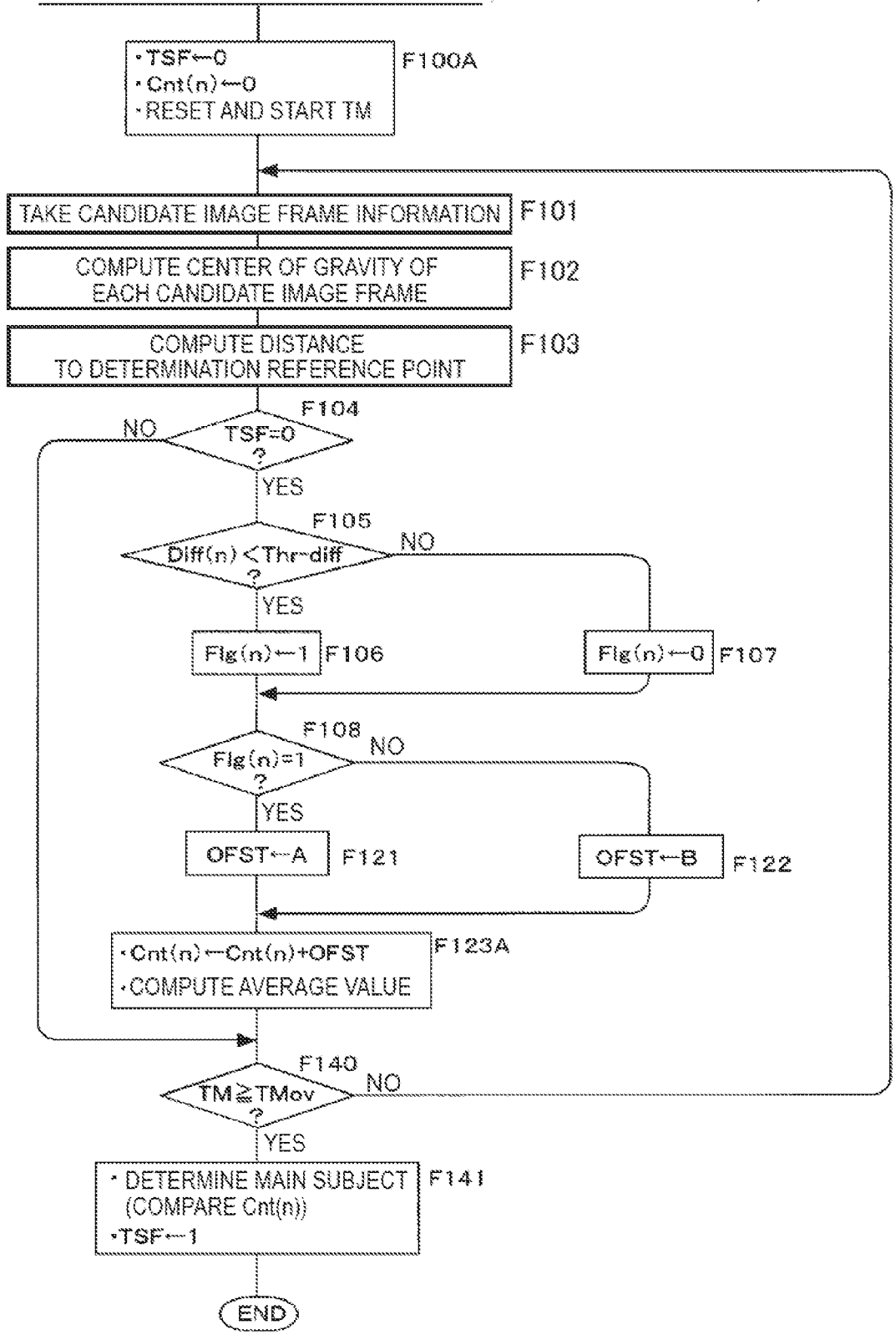
FIG. 13 is a flowchart of Processing Example 5 according to the embodiment.

FIG. 13 shows Processing Example 5.

When the main subject determination process is started, the control unit 30 first performs initial setting in Step F100A. As in Step F100 of Processing Example 1 to Processing Example 4, a variable TSF=0 and a count value Cnt(n)=0 are set. In addition, in this case, a timer TM is reset and starts to count a fixed main subject determination period.

Steps F101 to F108 and F121 and F122 are the same as those of FIG. 11.

Note that Step F123A is the same as Step F123 of FIG. 11 in that addition and subtraction of count values Cnt(n) are performed. In addition, in Step F123A, an average value is computed. In FIG. 11, the "average distance Ave-Diff(n)" is computed, but "computation of the average value" herein also refers to computation of a value indicating whether or not a candidate image frame is in the range of a predetermined distance on average, or computation of a value indicating whether or not a candidate image frame is in the range of a predetermined area on average, in addition to the average distance Ave-Diff(n).

As described above, such an average value can be used to finally select one candidate image frame E(n) among a plurality of candidate image frames E(n) when a result of a highest value of a degree of stable presence (count value Cnt(n)) is obtained.

In Step F140, the control unit 30 checks whether or not a count value of the timer TM has reached a predetermined time TMov. In other words, it is determined whether or not an elapsed time from the start of the main subject determination process reaches a predetermined time (a fixed main subject determination period).

If the elapsed time does not reach the predetermined time, the process returns to Step F101 and then continues.

When the count value of the timer TM has reached the predetermined time TMov, the control unit 30 proceeds to Step F141 to perform main subject determination.

In other words, the count value Cnt(n) of each candidate image frame E(n) at the time point is checked, and a candidate image frame E(n) having a maximum value is set as a main subject. In addition, a variable TSF=1 is set accordingly. Then, the process ends.

In other words, in Processing Example 5, the computation of the degree of stable presence (process of the count value Cnt(n)) continues for a fixed period of time. Then, a candidate image frame E(n) having a maximum count value Cnt(n) at a time point after the fixed period of time elapses is set as a main subject.

Note that, at the time point of Step F141, there is a case in which count values Cnt(n) of a plurality of candidate image frames E(n) have maximum values in the same number. In this case, one candidate image frame may be selected under (Condition 1), (Condition 2), (Condition 3), or the like described in Processing Example 3 above. When determination under (Condition 1) is made, the average value obtained in Step F123A can be used.

According to Processing Example 5 described above, by holding the imaging apparatus 10 so that the subject that a user wants to mainly capture is in the state of being as close to the determination reference point SP as possible (tracking a subject), such as at the center of an image, the subject is automatically determined as a main subject.

Particularly, in Processing Example 5, a degree of stable presence is determined based on a cumulative time of the state of being "close" to the determination reference point SP. In the case of a subject moving around or a subject moving quickly such as an animal, there are cases in which a photographer has difficulty in continuously capturing the subject of interest at the center of an image for a certain period of time (for example, as much as several seconds). In addition, there are also cases in which it is difficult to keep a subject at the center of an image due to serious camera shaking or the like depending on a photographer's skills. Even in such cases, main subject determination can be made relatively quickly using a cumulative time.

In other words, the cumulative time is useful for a target subject that moves quickly or for a relatively inexperienced user.

In addition, the main subject determination process is a process of selecting a subject having a highest degree of stable presence (count value Cnt(n)) in a fixed time. For this reason, even in a situation in which counting up of count values Cnt(n) does not sufficiently proceed, it is advantageous in that main subject determination is made in the fixed time. For example, even in the case of a subject that moves around so that it is hard to capture the subject close to the determination reference point SP, main subject determination is completed in a fixed time.

However, there is a case in which determination of "no main subject found" may be made when counting up does not sufficiently proceed for any candidate image frame E(n), rather than choosing a main subject by force. Thus, a condition of a lower limit for selecting a main subject may be set for a count value Cnt(n). In other words, in Step F141, a count value Cnt(n) can be considered as being selected as a maximum value is compared to a lower limit value Lth, and if Cnt(n)<Lth is satisfied, "no main subject found" is determined. Accordingly, it is possible to avoid deciding a main subject in a situation in which no main subject is originally present.

Note that the lower limit value Lth may have a substantially equal value to the count threshold value CTthr in Processing Example 1, or the like, or may have a lower value. In other words, by setting a value that is considered to be a minimum count value (degree of stable presence) for setting a main subject, it is possible to obtain an effect that main subject determination can be completed in a fixed time even when it is fairly difficult to capture, for example, a subject moving around to be close to the determination reference point SP as described above.

[4-6: Processing Example 6 (Type I; Determination Reference Point; Fixed-time Determination; Continuous Presence)]

Processing Example 6 is also a specific example of Processing Type I.

In Processing Example 6, as a positional state of a candidate image frame, a distance to a set determination reference point is obtained.

In addition, as a degree of stable presence for each candidate image frame, duration information that a positional state (distance to the determination reference point) continuously satisfies the condition of being in the range of a predetermined threshold value is computed.

In addition, in main subject determination, a candidate image having a highest value of the degree of stable presence in a fixed main subject determination period is determined as a main subject as in Processing Example 5.

A difference from Processing Example 5 is that the degree of stable presence is a duration of a state of being close to the determination reference point SP. In other words, a candidate image frame that has continuously been in the state of being close to the determination reference point SP for a longest time in a fixed main subject determination period is determined as a main subject.

Figure 14:
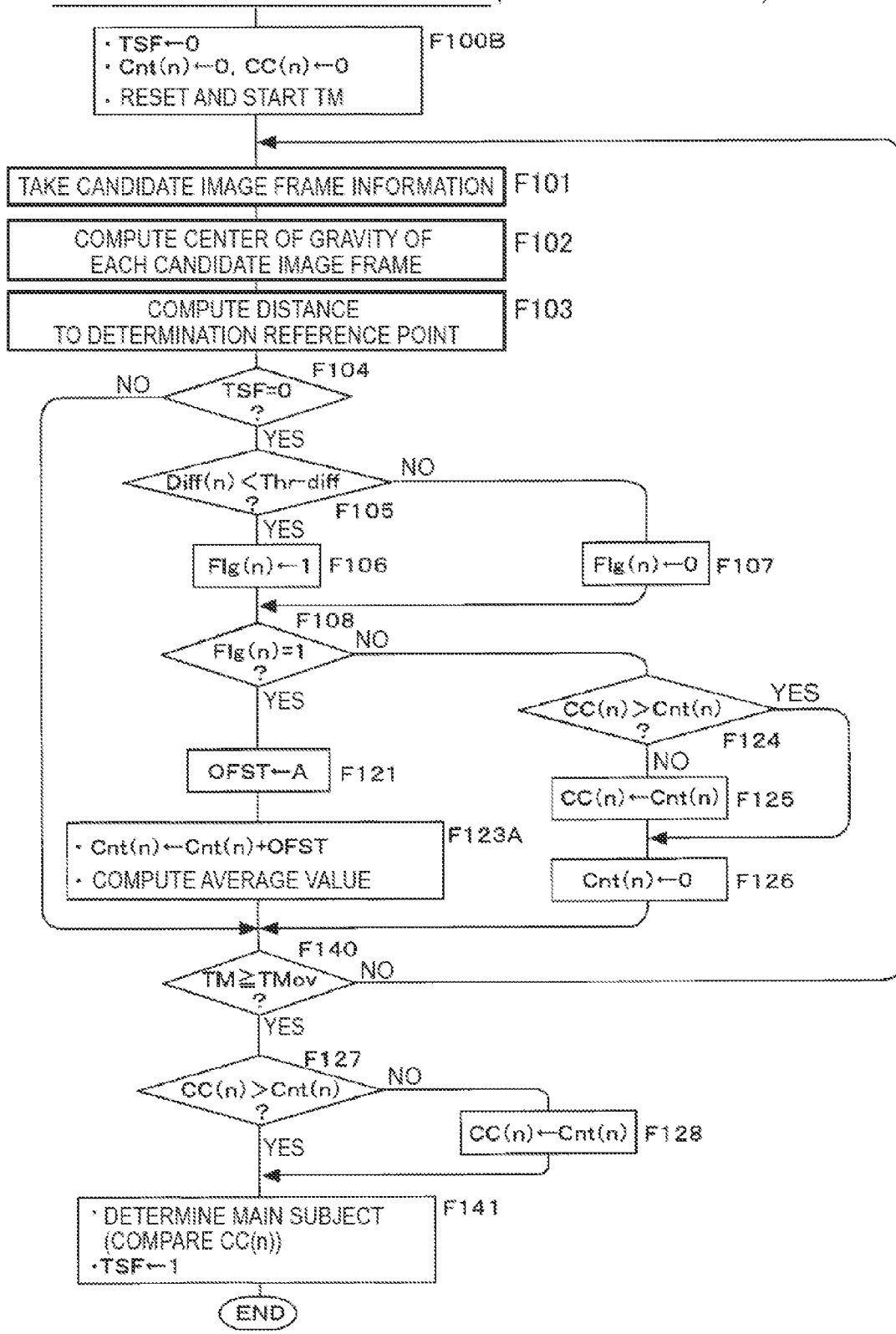
FIG. 14 is a flowchart of Processing Example 6 according to the embodiment.

FIG. 14 shows Processing Example 6.

When the main subject determination process is started, the control unit 30 first performs initial setting in Step F100B. In the same manner as in Step F100A of Processing Example 5, a variable TSF=0 and a count value Cnt(n)=0 are set. In addition, the timer TM is reset and starts to count a fixed main subject determination period. In addition, in this case, a duration holding variable CC(n) is initialized (=0).

Steps F101 to F107 are the same as those of FIG. 13.

In Steps F108, F121, F123A, and F124 to F126, a process of a count value Cnt(n) is performed as a process of computing the degree of stable presence.

The control unit 30 checks whether or not the flag Flg(n)=1 is satisfied for each candidate image frame E(n) in Step F108, and if the flag Flg(n)=1 is satisfied, a count variable OFST is substituted with the variable set value A (wherein A>0) in Step F121. Then, the control unit 30 performs an arithmetic operation as follows for the count value Cnt(n) that is a value of the degree of stable presence in Step F123.

Cnt(*n*)=Cnt(*n*)+OFST.

In other words, the count value Cnt(n) is counted up by the value of A.

On the other hand, if the flag Flg(n)=0 is satisfied in Step F108, the control unit 30 proceeds to Step F124 to compare the count value Cnt(n) at the time point to the duration holding variable CC(n).

If CC(n)>Cnt(n) is satisfied, the count value Cnt(n) is cleared in Step F126.

If CC(n)>Cnt(n) is not satisfied, the count value Cnt(n) at the time point is substituted with the duration holding variable CC(n) in Step F125, and then the count value Cnt(n) is cleared in Step F126.

As in Processing Example 1 to Processing Example 5 described above, the count value Cnt(n) is set as a value of the degree of stable presence. In other words, the count value is added according to detection of the state of a candidate image frame E(n) being "close" to the determination reference point SP.

On the other hand, the candidate image frame E(n) is determined not to be in the state of being "close" to the determination reference point SP (the flag Flg(n)=0), the count value Cnt(n) is cleared in Step F126.

This means that, once a candidate image frame is apart from the determination reference point SP, the value of the degree of stable presence returns to zero, as in the case described in Processing Example 2.

Thus, as long as a subject of each candidate image frame E(n) is continuously close to the determination reference point SP, the value of the degree of stable presence (count value Cnt(n)) increases, but if the subject is not in the continuous state, the count value Cnt(n)=0 is set. Thus, the count value Cnt(n) indicates "duration" of the state of being close to the determination reference point SP.

In this case, the duration holding variable CC(n) holds maximum "duration" within a fixed main subject determination period.

For this reason, when the duration is broken, the duration holding variable CC is updated to a maximum value in Steps F124 and F125. In other words, the count value Cnt(n) that is the "duration" at the current point at which continuation is broken is greater than the "duration" held with the duration holding variable CC, the count value Cnt(n) substitutes the duration holding variable CC(n) and is updated to the maximum value.

In Step F140, the control unit 30 checks whether or not a count value of the timer TM has reached a predetermined time TMov. When the value has not reached the predetermined time, the process returns to Step F101 and then continues.

When the count value of the timer TM has reached the predetermined time TMov, the control unit 30 compares the count value Cnt(n) of that time point to the duration holding variable CC(n) in Step F127.

If CC(n)>Cnt(n) is not satisfied, the count value Cnt(n) of that time point substitutes the duration holding variable CC(n) in Step F128. Steps F127 and F128 are processes for updating the duration holding variable CC(n) when the state of being close to the determination reference point SP continues at the time point at which the fixed main subject determination period ends and the continuance reaches maximum "duration."

Then, the control unit 30 proceeds to Step F141 to perform main subject determination.

In other words, the value of the duration holding variable CC(n) of each candidate image frame E(n) at the time point is checked, and a candidate image frame E(n) having a maximum value is set as a main subject. In addition, the variable TSF=1 is set accordingly. Then, the process ends.

As described above, Processing Example 6 continues computation of the degree of stable presence (process of the count value Cnt(n)) for a fixed time. Then, at the time after the fixed time elapses, a candidate image frame E(n) having the maximum duration indicated by the duration holding variable CC(n) is set as a main subject.

Note that, at the time point of Step F141, there is a case in which duration holding variables CC(n) of a plurality of candidate image frames E(n) have maximum values of the same value. In this case, one candidate image frame may be selected under (Condition 1), (Condition 2), (Condition 3), and the like described in Processing Example 3 above.

In addition, comparing the maximum value of the duration holding variable CC(n to the lower limit value Lth in Step 141, and if CC(n)<Lth is satisfied, setting "no main subject found" may also be considered. Accordingly, it is possible to avoid deciding a main subject in a situation in which no main subject is originally present.

According to Processing Example 6 described above, by holding the imaging apparatus 10 (tracking a subject) so that the subject that a user wants to mainly capture is as close to the determination reference point SP as possible such as at the center of an image, the subject is automatically determined as a main subject.

In addition, the main subject determination process is a process of selecting a subject having a highest degree of stable presence (duration holding variable CC(n)) in a fixed time. For this reason, even in a situation in which counting up of count values Cnt(n) does not sufficiently proceed, it is advantageous in that main subject determination is made in the fixed time as in Processing Example 5.

Furthermore, in Processing Example 6, the degree of stable presence is evaluated based on a duration. Depending on whether a person is skilled in photography or on a subject, a possibility of a subject more desired by a user being determined as a main subject can be raised as in Processing Example 2.

[4-7: Processing Example 7 (Type I; Determination Reference Area; First-arrival Determination; Cumulative or Continuous Presence)]

Processing Example 7 is also a specific example of Processing Type I.

In Processing Example 7, as a positional state of a candidate image frame, a positional relationship with a set determination reference area is obtained.

In addition, as a degree of stable presence for each candidate image frame, cumulative time information (or duration information) that a positional state (the relationship with the determination reference area) satisfies the condition of being in a predetermined state is computed.

In addition, in main subject determination, a candidate image of which a degree of stable presence reaches a predetermined value most quickly after the main subject determination is started is selected as in Processing Example 1 to Processing Example 4.

First, a positional relationship with a determination reference area will be described in FIG. 15.

FIG. 15 shows an example of a determination reference area SA.

FIG. 15A is an example in which a square area at the center of an image is set as the determination reference area SA. Herein, a state in which candidate image frame information of each of candidate image frame E1, E2, and E3 is taken at a time point of a certain frame is shown.

The positional relationship of each candidate image frame E(n) with the determination reference area SA includes, for example:

whether or not the center of gravity of each frame is included in the determination reference area SA;

whether or not a whole frame is included in the determination reference area SA;

whether or not at least a part of a frame is included in the determination reference area SA;

whether or not the distance from a frame to an outer edge of the determination reference area is in the range of a predetermined value; and the like.

Note that setting the determination reference area SA at the center of an image is an example.

As shown in FIG. 15B, for example, the determination reference area SA may be set in a position on a slightly upper left side from the center. This is because, when composition of a still image is considered, for example, there are many cases in which it is better to dispose a subject considered to be a main subject in a position that is not the center.

Alternatively, as shown in FIG. 15C, an entire image (entire frame) may be set as the determination reference area SA. The positional relationship of each candidate image frame E(n) and the determination reference area SA in this case is "whether or not a candidate image is present within an image."

In addition, the shape of the determination reference area SA is not limited to a square of FIG. 15A, and may be a rectangle as in FIG. 15B and FIG. 15C. In addition, a shape of a triangle, a polygon having five or more sides, a circle, an ellipse, or an oval, an indefinite shape or the like is possible.

Furthermore, various sizes are also considered.

In addition, the determination reference area SA may be fixedly set in, for example, the area of FIG. 15A or FIG. 15B, or may be arbitrarily designated by a user through a touch operation on a display screen, or the like.

In addition, several candidate areas of the determination reference area SA may be presented to a user on the screen of the display unit 34 to allow the user to select one.

Furthermore, the control unit 30 is considered to determine an optimum area in consideration of composition and the like according to the content of an image, a result of image analysis, and the like and for automatic setting.

In other words, the following conditions are considered with regard to the determination reference point SP:

being set in a pre-decided area of a fixed shape around the center position of an image, a position deviated from the center, or the like;

being set such that a user arbitrarily designates all or some of the center position, the shape, and the size;

being set such that several candidate areas are presented to a user so that the user can select one;

being flexibly set in an automatic manner by determining an optimum area according to the content of an image by the control unit 30; and the like.

The positional relationship of a candidate image frame E(n) and the determination reference area SA is obtained at the time point of each frame and used in counting a degree of stable presence (count value Cnt(n)).

For example, as the positional relationship of each candidate image frame E(n) and the determination reference area SA, "whether or not the center of gravity is included in the determination reference area SA" is determined.

Figure 16:
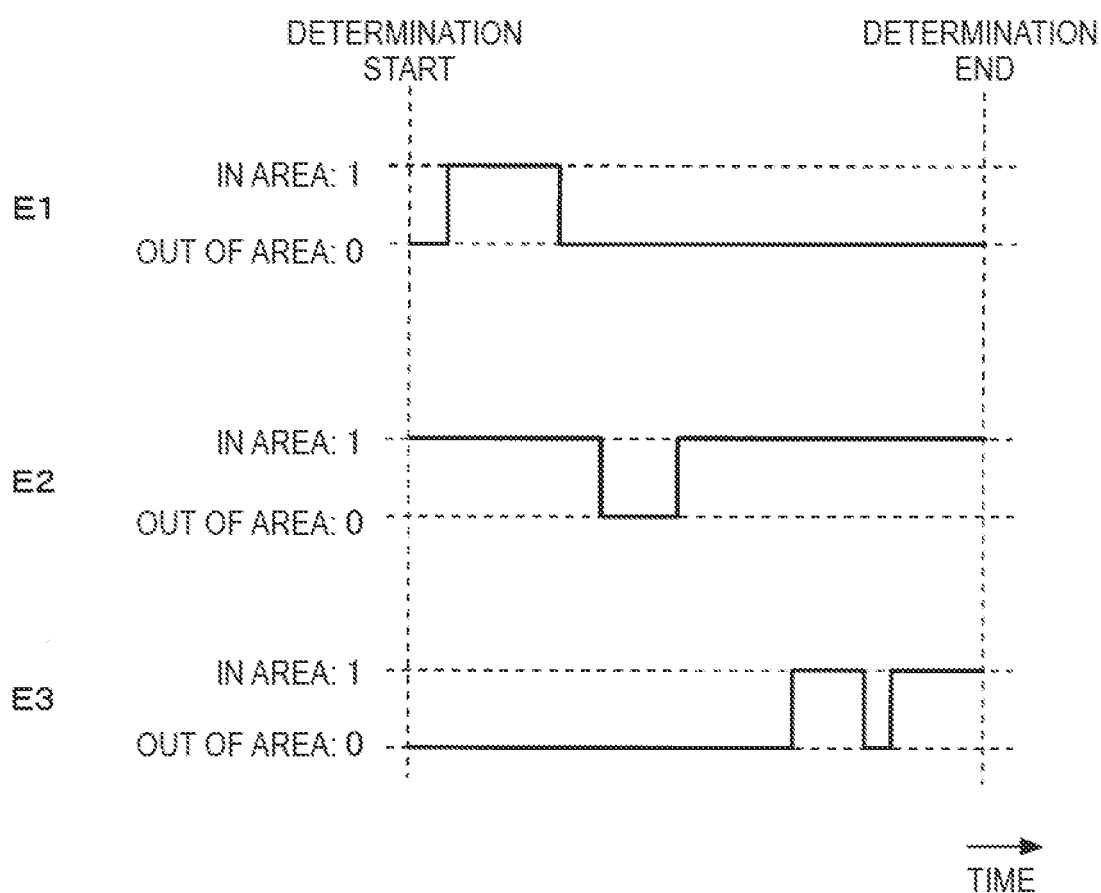
FIG. 16 is a graph of determination of stable presence based on a positional state according to the embodiment.

FIG. 16 shows the positional relationship of the candidate image frames E1, E2, and E3 in each frame, in other words, a variable state of determination results of whether the center of gravity is in or out of the determination reference area SA.

In Processing Example 7, a degree of stable presence is a cumulative time for which the center of gravity is included in the determination reference area SA. For this reason, the number of times the center of gravity is included in the determination reference area SA is counted as a count value Cnt(n).

Figure 17:
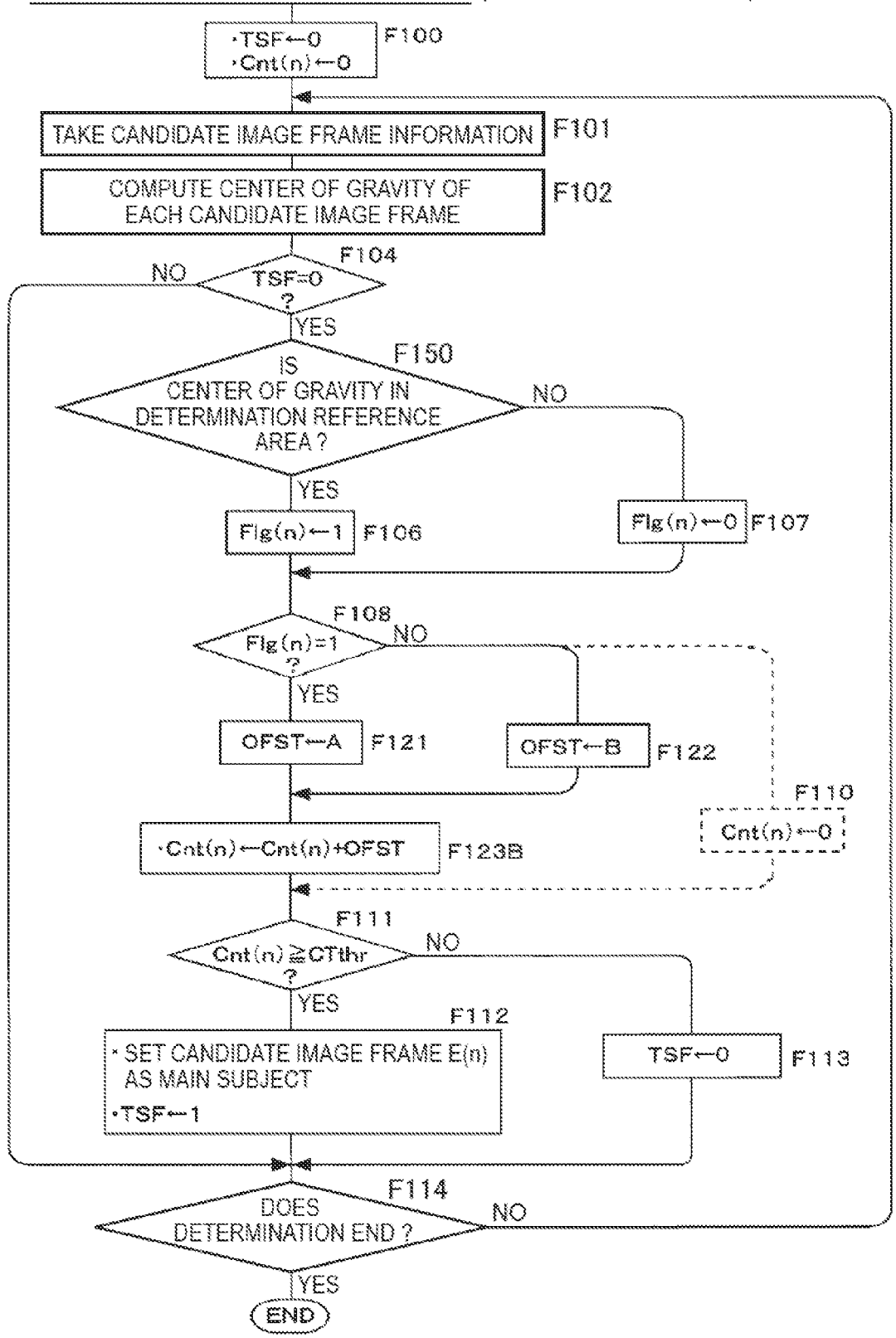
FIG. 17 is a flowchart of Processing Example 7 according to the embodiment.

FIG. 17 describes a main subject determination process performed by the control unit 30 as Processing Example 7. Note that FIG. 17 is an example obtained by modifying Processing Example 3 of FIG. 11 described above to a process using the determination reference area SA.

Steps F100 to F102, and F104 are the same as those of FIG. 11.

In the case of FIG. 17, a computation process of a distance Diff(n) corresponding to Step F103 of FIG. 11 is unnecessary.

In Step F150, the control unit 30 checks whether or not the center of gravity G of each candidate image frame E(n) is in the determination reference area SA.

Here, the origin O of x-y coordinates of a screen plane is set to the vertex on the upper left side of the image as shown in FIG. 15A.

Then, the x and y coordinate values of the center of gravity G of each candidate image frame E(n) are set to (E(n)_cx, E(n)_cy).

In addition, a shape of the determination reference area SA is set to, for example, a square, the x and y coordinate values of the upper-left vertex of the determination reference area SA are set to (SAx, SAy), a width thereof is set to SAw, and a height thereof is set to SAh.

Then, with regard to the center of gravity G of each candidate image frame E(n), the control unit 30 determines whether or not the following conditions are satisfied in Step F150.

$$SAx \leq E(n)\_cx \leq (SAx+SAw)$$

$$SAy \leq E(n)\_cy \leq (SAy+SAh)$$

If the conditions are satisfied, the center of gravity G of the candidate image frame E(n) is determined to be included in the determination reference area SA.

The control unit 30 makes the above determination for each candidate image frame E(n), and if the center of gravity G is included in the determination reference area SA, the flag Flg(n)=1 (included in the area) is set in Step F106. In addition, if the center of gravity G is not included in the determination reference area SA, the flag Flg(n)=0 (out of the area) is set in Step F107.

Steps F108, F121, F122, F123B, F111, F112, F113, and F114 are basically the same as those of FIG. 11. Note that a difference from Step F123 of FIG. 11 is that an average distance is not computed in Step F123B (Step F110 indicated by dashed lines will be described later).

According to Processing Example 7 described above, the degree of stable presence of each candidate image frame E(n) is computed based on the positional relationship with the determination reference area SA. The degree of stable presence is a cumulative time for which a positional state (relationship with the determination reference area) satisfies the condition of being in a predetermined state.

In addition, a candidate image of which the degree of stable presence (cumulative time) reaches a predetermined value most quickly after main subject determination is started is determined as a main subject.

Accordingly, the same effect as Processing Example 1 and Processing Example 3 is obtained. On top of that, by using the determination reference area SA rather than a determination reference point SP, a position for determining a main subject expands, which may be favorable to main subject determination depending on a capturing environment, a subject, capturing skills of a user, or the like.

Note that, when the flag Flg(n)=0 is set in Step F108, processes of Step F122 and F123B may not be executed and the count value Cnt(n) may be cleared in Step F110 as indicated by the dashed lines.

When the process of clearing of Step F110 is employed, the count value Cnt(n) expresses duration, rather than a cumulative time that satisfies the condition (the condition that the center of gravity be included in the determination reference area SA in the case of FIG. 17) as described in Processing Example 2.

In other words, when Step F110 is employed, the "duration" serves as an index of the degree of stable presence, and a main subject is determined based on that in the process of FIG. 17.

In this case, the same effect as Processing Example 2 is obtained.

Note that, in FIG. 17, the condition of whether or not the center of gravity of a candidate image frame E(n) is included in the determination reference area SA is determined in Step F150, but as described above, the condition of whether or not all (or some) candidate image frames E(n) are included in the determination reference area SA or the condition of whether or not the distance between the center of gravity of a candidate image frame E(n) and an outer edge of the determination reference area is in the range of a predetermined value may be determined in Step F150.

[4-8: Processing Example 8 (Type I; Determination Reference Area; Fixed-time Determination; Cumulative or Continuous Presence)]

Processing Example 8 is also a specific example of Processing Type I. This can be said to be an example that uses a determination reference area SA obtained by modifying Processing Example 5.

In Processing Example 8, as a positional state of a candidate image frame, a positional relationship with a set determination reference area SA is obtained.

In addition, as a degree of stable presence for each candidate image frame, cumulative time information (or duration information) indicating that a positional state (the relationship with the determination reference area SA) satisfies the condition of being in a predetermined state is computed.

In addition, a candidate image having a highest value of a degree of stable presence in a fixed main subject determination period is determined as a main subject.

Figure 18:
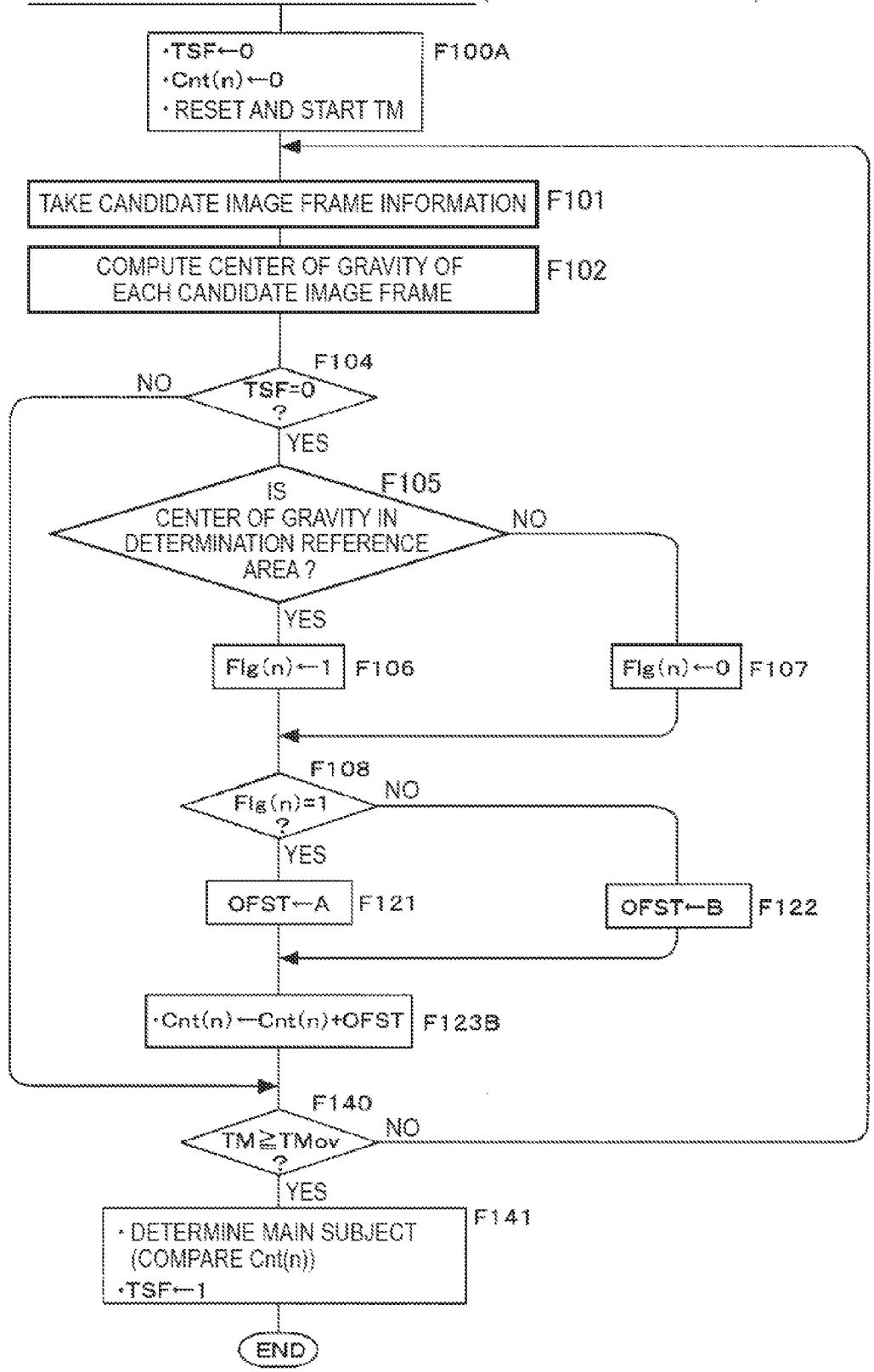
FIG. 18 is a flowchart of Processing Example 8 according to the embodiment.

FIG. 18 describes a main subject determination process performed by the control unit 30 as Processing Example 8. Note that FIG. 18 is an example obtained by modifying Processing Example 5 of FIG. 13 described above to a process using the determination reference area SA.

Steps F100A, F101, F102, and F104 are the same as those of FIG. 11.

In the case of FIG. 18, a computation process of a distance Diff(n) corresponding to Step F103 of FIG. 13 is unnecessary.

In Step F150, the control unit 30 checks whether or not the center of gravity G of each candidate image frame E(n) is included in the determination reference area SA. This is the same process as that previously described in FIG. 17.

Then, the control unit 30 sets the flag Flg(n)=1 (included in the area) in Step F106 if the center of gravity G of each candidate image frame E(n) is included in the determination reference area SA. In addition, if the center of gravity G is not included in the determination reference area SA, the flag Flg(n)=0 (out of the area) is set in Step F107.

Steps F108, F121, F122, F123B, F140, and F141 are the same as those of FIG. 13. Note that a difference from Step F123A of FIG. 13 is that an average value is not computed in Step F123B.

According to Processing Example 8, the degree of stable presence of each candidate image frame E(n) is computed based on the positional relationship with the determination reference area SA. The degree of stable presence is a cumulative time for which a positional state (the relationship with the determination reference area) satisfies a condition of being in a predetermined state.

In addition, a candidate image having a maximum degree of stable presence (cumulative time) in a fixed time after main subject determination is started is determined as a main subject.

Accordingly, the same effect as Processing Example 5 is obtained. On top of that, by using the determination reference area SA rather than a determination reference point SP, a position for determining a main subject expands, which may be favorable to main subject determination depending on a capturing environment, a subject, capturing skills of a user, or the like.

Note that, as a modified example of Processing Example 8, an example in which the degree of stable presence based on duration rather than a cumulative time is obtained is also considered.

A flowchart of this case is omitted, but a process in which Step F103 of FIG. 14 is deleted and the process of Step F150 described above is executed instead of Step F105 is possible.

With the process, the same effect as Processing Example 6 is obtained.

In addition, in both cases in which a cumulative time is used, and a duration is used, comparing a maximum value of a count value Cnt(n) to the lower limit value Lth in Step F141, and if Cnt(n)<Lth is satisfied, setting "no main subject found" may also be considered. Accordingly, it is possible to avoid deciding a main subject in a situation in which no main subject is originally present.

In addition, in FIG. 18, the condition of whether or not the center of gravity of a candidate image frame E(n) is included in the determination reference area SA is determined in Step F150, but the condition of whether or not all (or some) candidate image frames E(n) are included in the determination reference area SA or the condition of whether or not the distance between the center of gravity of a candidate image frame E(n) and an outer edge of the determination reference area is in the range of a predetermined value may be determined in Step F150.

[4-9: Processing Example 9 (Type II; Determination Reference Point; Average Presence)]

Processing Example 9 will be described. Processing Example 9 is a specific example of Processing Type II.

In addition, in Processing Example 9, as a positional state of a candidate image frame, the distance to a set determination reference point SP is obtained.

In addition, as a degree of stable presence of each candidate image frame, an average value (average distance) of positional states (distance to a determination reference point) is computed. The average distance serves as an index indicating that a positional state is close to the determination reference point with a high frequency in terms of time. For example, "a small value of the average distance" has the same meaning as "a long cumulative time" mentioned in each processing example described above.

In addition, a candidate image frame which has a minimum average distance and satisfies the condition that the average value be in the range of a predetermined threshold value is determined as a main subject.

Note that, since the example is of Processing Type II, the main subject determination process is executed in a fixed time in which buffering of candidate image frame information is completed or longer as long as the process is not stopped due to a user operation or the like.

Figure 19:
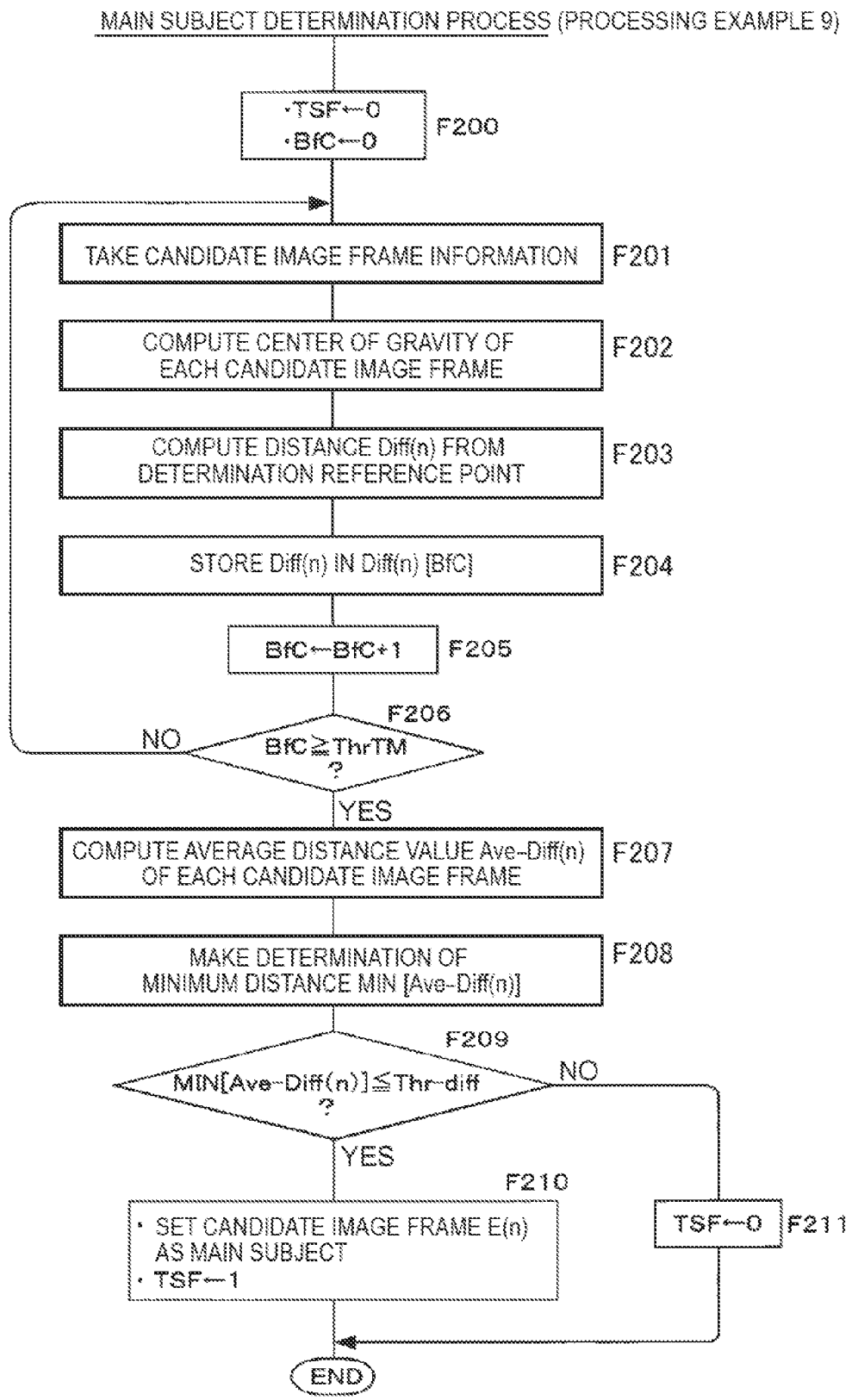
FIG. 19 is a flowchart of Processing Example 9 according to the embodiment.

FIG. 19 describes a main subject determination process performed by the control unit 30 as Processing Example 9.

When the main subject determination process is started, the control unit 30 first sets a variable TSF=0 that is a flag indicating whether or not setting of a main subject is completed and a count value BfC=0 in Step F200.

In addition, the count value BfC is a value obtained by counting the number of buffering times (the number of frames) of a distance Diff(n) of each computed candidate image frame E(n) by acquiring candidate image frame information from the candidate detection unit 26 by the control unit 30.

In Step F201, the control unit 30 takes candidate image frame information of a certain frame from the candidate detection unit 26. For each candidate image frame E(n), for example, an x value and a y value of two-dimensional (x-y) coordinate values of image data are acquired as position information, and information of a width w and a height h of a candidate image frame is acquired as size information. Note that the candidate image frame information may also include a subject distance (z value), the number of pixels, and the like.

In Step F202, the control unit 30 computes the coordinates of the center of gravity G of each candidate image frame E(n). This is the same process as that described in Step F102 of FIG. 9.

In Step F203, the control unit 30 computes the distance Diff(n) from the center of gravity G of each candidate image frame E(n) to the determination reference point SP. This is the same process as that described in Step F103 of FIG. 9.

In Step F204, the control unit 30 stores (performs buffering for) the distance Diff(n) computed in Step F203 in, for example, an area Diff(n) [BfC] of an internal memory area.

In Step F205, the control unit 30 causes the count value BfC to increase.

In Step F206, the control unit 30 determines whether or not the count value BfC has reached a count threshold value THrTM that corresponds to a fixed time, and if the count value has not reached the count threshold value, the process returns to Step F201.

The area Diff(n) [BfC] in Step F204 described above means an area in which information of a candidate image frame E(n) of a frame FR(BfC) taken in a (BfC)$^{th}$ order from the start of the main subject determination process is stored.

For example, when the candidate image frames E1, E2, and E3 are present in a frame FR(0) that is at the time point at which candidate image frame information of the frame FR(0) is first taken in Step F201, the distances Diff1, Diff2, and Diff3 computed in Step F203 for each of the candidate image frames are stored in areas Diff(1) [0], Diff(2) [0], and Diff(3) [0].

In addition, when the candidate image frames E1, E2, and E3 are present in a frame FR(1) taken next in Step F201, the distances Diff1, Diff2, and Diff3 computed in Step F203 for each of the candidate image frames are stored in areas Diff(1) [1], Diff(2) [1], and Diff(3) [1].

In other words, by repeating the processes of Steps F201 to F205 for a fixed time (THrTM), distances Diff(n) of candidate image frames E(n) of the frame FR(0) to a frame(m) are buffered.

The buffering ends after the fixed time elapses, and then the control unit 30 causes the process to proceed to Step F207 from Step F206.

In Step F207, the control unit 30 computes average distances Ave-Diff(n) of the candidate image frames E(n).

Ave-Diff(*n*)=(Cumulative addition value of buffered distances Diff(*n*))/(The number of additions of the distances Diff(*n*))

Then, in Step F208, the control unit 30 determines a minimum distance MIN [Ave-Diff(n)] among the average distances Ave-Diff(n) of the candidate image frames E(n). A candidate image frame E(n) having a lowest average distance Ave-Diff(n) is obtained.

When the minimum distance MIN [Ave-Diff(n)] is determined, the control unit 30 determines whether or not the minimum distance MIN [Ave-Diff(n)] is equal to or lower than the distance threshold value Trs-diff.

If the minimum distance MIN [Ave-Diff(n)] is equal to or less than the distance threshold value Trs-diff, the control unit 30 proceeds to the process of Step F210 to determine a candidate image frame E(n) having the minimum distance MIN [Ave-Diff(n)] as a main subject, thereby setting a main subject. Then, a variable TSF=1 is set.

If the minimum distance MIN [Ave-Diff(n)] is not equal to or less than the distance threshold value Trs-diff, the control unit 30 performs a process to set the variable TSF=0 in Step F211. In this case, the result of "no main subject found" is obtained.

Note that, when at least a candidate image frame E(n) is present and a process of deciding a main subject is definitely to be realized, Step F209 is removed, and a candidate image frame E(n) having the minimum distance MIN [Ave-Diff(n)] may be determined as a main subject as it is.

According to Processing Example 9 described above, by holding the imaging apparatus 10 (tracking a subject) so that the subject that a user wants to mainly capture is in the state of being as close to the determination reference point SP as possible such as at the center of an image, the subject is automatically determined as a main subject.

In addition, since the fixed time is spent for acquiring the candidate image frame information, the same effect as Processing Example 5 is obtained.

Note that, of course in Processing Example 9, there are also cases in which a plurality of candidate image frames have the minimum distance MIN [Ave-Diff(n)]. When one candidate image frame E(n) is set as a main subject, the candidate image frame E(n) that will serve as a main subject may be selected with a technique using (Condition 1) to (Condition 3) as described in Processing Example 3.

In addition, in FIG. 5 with regard to Processing Type II, it is described that Step F21 may be performed after completion of accumulation is determined in Step F22.

When a process corresponding thereto is performed, the processes of Steps F202 and F203 of FIG. 19 may be executed when the process proceeds to Step F207 from Step F206.

In other words, it is an example in which the candidate image frame information itself is buffered in Step F204, and the distance Diff(n) of each candidate image frame E(n) of each frame is computed using the buffered candidate image frame information after completion of the buffering.

[4-10: Processing Example 10 (Type II; Determination Reference Point; Cumulative Presence)]

Processing Example 10 is also an example of Processing Type II, and uses a determination reference point. As a degree of stable presence of each candidate image frame, cumulative time information that a positional state (distance to the determination reference point) satisfies the condition of being in the range of a predetermined threshold value is computed.

Then, a candidate image having a highest value of the degree of stable presence in a period in which buffering is performed is determined as a main subject.

Figure 20:
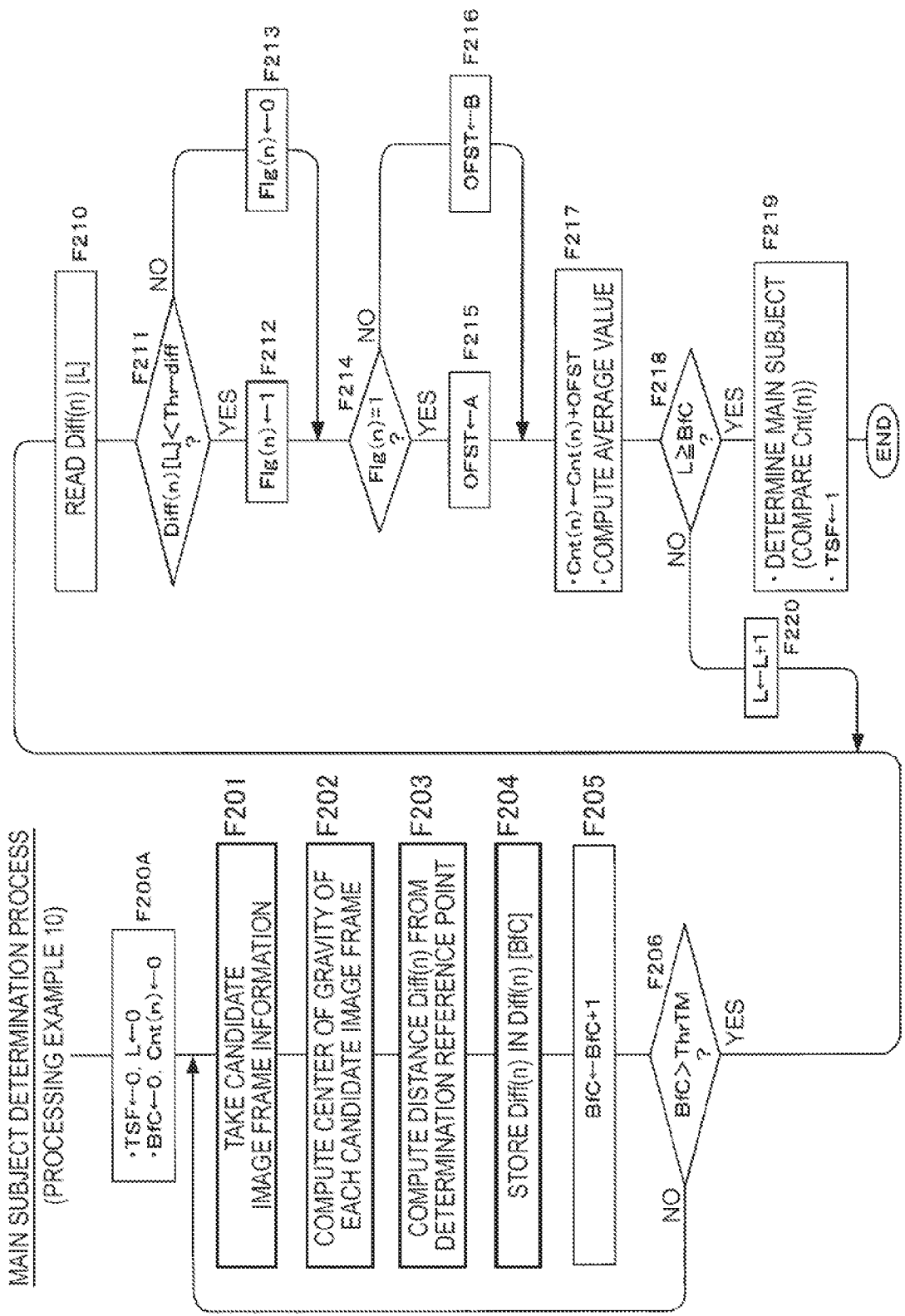
FIG. 20 is a flowchart of Processing Example 10 according to the embodiment.

FIG. 20 shows a main subject determination process performed by the control unit 30 as Processing Example 10.

When the main subject determination process is started, the control unit 30 first sets a variable TSF=0 and a count value BfC=0 in Step F200A. In addition, initialization is performed to set a variable L=0 for loop control and initialization is further performed to set a count value Cnt(n)=0 that corresponds to a degree of stable presence.

Steps F201 to F206 are the same as those of FIG. 19, and taking of candidate image frame information and buffering of a distance Diff(n) of each of candidate image frames E(n) are performed in a fixed time.

When a count value BfC as a timer reaches a count threshold value THrTM in Step F206, the buffering ends, and the control unit 30 causes the process to proceed to Step F210 from Step F206.

In Step F210, the control unit 30 reads the distances Diff(n) buffered in an area Diff(n) [L].

Since the variable L=0 at first, the distance Diff(n) of each candidate image frame E(n) buffered in an area Diff(n) [0] at the time point at which the candidate image frame information of the frame FR(0) is first taken in Step F201 is read.

In Steps F211, F212, and F213, the control unit 30 determines a predetermined condition relating to the distance Diff(n) of each candidate image frame E(n), that is, whether or not the candidate image frame is close to the determination reference point SP using a distance threshold value Trs-diff.

Then, if Diff(n)<Trs-diff is satisfied, the flag Flg(n)=1 (close) is set in Step F212, and if Diff(n)<Trs-diff is not satisfied, the Flg(n)=0 (not close) is set in Step F213. This is the same process as Steps F105, F106, and F107 of Processing Example 1.

In Steps F214, F215, F216, and F217, the process of a count value Cnt(n) is performed as a process of computing a degree of stable presence.

The control unit 30 checks whether or not the flag Flg(n)=1 is satisfied for each candidate image frame E(n) in Step F214, and if the flag Flg(n)=1 is satisfied, a count variable OFST is substituted with the variable set value A (wherein A>0) in Step F215. Then, the control unit 30 performs an arithmetic operation as follows for the count value Cnt(n) that is a value of the degree of stable presence in Step F217.

$$Cnt(n)=Cnt(n)+OFST.$$

In other words, the count value Cnt(n) is counted up by the value of A.

In addition, if the flag Flg(n)=0 is satisfied, the control unit 30 substitutes the count variable OFST with the variable set value B (wherein B≤0) in Step F216. Then, the control unit 30 performs an arithmetic operation as follows for the count value Cnt(n) that is a value of the degree of stable presence in Step F217.

$$Cnt(n)=Cnt(n)+OFST.$$

In other words, the count value Cnt(n) is counted down by the value of B (or kept).

In addition, in Step F217, computation of an average value is also performed.

The above is the same as Steps F108, F121, and F123 of FIG. 11 (or F123A of FIG. 13).

In Step F218, the control unit 30 checks whether or not the variable L has reached the count value BfC of buffering. If the variable has not reached the count value, the variable L increases in Step F220 and the process returns to Step F210.

Then, next in Step F210, the distance of Diff(n) of each candidate image frame E(n) buffered in an area Diff(n) [1] at the time point at which candidate image frame information of the frame FR(1) is taken in Step F201 is read.

Then, the processes of Steps F211 to F217 are performed.

Steps F210 to F217 described above are repeated until the variable L=BfC is satisfied in Step F218. Accordingly, the process with regard to the buffered distances Diff(n) is executed.

When the process ends, the control unit 30 proceeds to Step F219 to perform main subject determination.

In other words, the count values Cnt(n) of the candidate image frames E(n) at the time point are checked, and a candidate image frame E(n) having a maximum count value is set as a main subject. In addition, the variable TSF=1 is set accordingly. Then, the process ends.

Note that, at the time point of Step F219, if the count values Cnt(n) of the plurality of candidate image frames E(n) have the maximum value in the same number, one candidate image frame may be selected under (Condition 1), (Condition 2), (Condition 3), or the like described in Processing Example 3 above. When determination of (Condition 1) is performed, an average value obtained in Step F127 can be used.

In addition, comparing the maximum value of the count values Cnt(n) to the lower limit value Lth in Step F219, and if Cnt(n)<Lth is satisfied, setting "no main subject found" may also be considered. Accordingly, it is possible to avoid deciding a main subject in a situation in which no main subject is originally present.

Processing Example 10 described above also obtains the same effect as Processing Example 9.

[4-11: Processing Example 11 (Type II; Determination Reference Point; Continuous Presence)]

Processing Example 11 is also an example of Processing Type II, and uses a determination reference point. As a degree of stable presence of each candidate image frame, duration information indicating that a positional state (distance with the determination reference point) satisfies the condition of being in the range of a predetermined threshold value is computed.

Then, a candidate image having a highest value of the degree of stable presence in a period in which buffering is performed is determined as a main subject.

FIG. 21 shows a main subject determination process performed by the control unit 30 as Processing Example 11.

When the main subject determination process is started, the control unit 30 first sets a variable TSF=0 and a count value BfC=0 in Step F200B. In addition, initialization is performed to set a variable L=0 for loop control and initialization is further performed to set a count value Cnt(n)=0 that corresponds to a degree of stable presence. Furthermore, a duration holding variable CC(n) is initialized (=0).

Steps F201 to F206 are the same as those of FIG. 19, and taking of candidate image frame information and buffering of a distance Diff(n) of each of candidate image frames E(n) are performed in a fixed time.

When a count value BfC as a timer reaches a count threshold value THrTM in Step F206, the buffering ends, and the control unit 30 causes the process to proceed to Step F210 from Step F206.

Steps F210 to F215, F217, F218, and F220 are the same as those of FIG. 20.

On the other hand, if the flag Flg(n)=0 is set in Step F214, the control unit 30 proceeds to Step F224 to compare a count value Cnt(n) at the time point to the duration holding variable CC(n).

If CC(n)>Cnt(n) is satisfied, the count value Cnt(n) is cleared in Step F226.

If CC(n)>Cnt(n) is not satisfied, the count value Cnt(n) at the time point substitutes the duration holding variable CC(n) in Step F225, and the count value Cnt(n) is cleared in Step F226.

Steps F224, F225, and F226 are processes having the same meanings as Steps F124, F125, and F126 of FIG. 14, which are performed to set a count value Cnt(n) to be a value meaning duration.

In Step F218, the control unit 30 checks whether or not a variable L has reached the count value BfC of buffering, and if the variable has reached the count value, the process proceeds to Step F227. Steps F227 and F228 are the same processes as Steps F127 and F128 of FIG. 14.

In other words, the control unit 30 compares the count value Cnt(n) at the time point to the duration holding variable CC(n) in Step F227. If CC(n)>Cnt(n) is satisfied, the count value Cnt(n) at the time point substitutes the duration holding variable CC(n) in Step F228.

This process is a process of updating the duration holding variable CC(n) when a certain candidate image frame E(n) continues to be close to the determination reference point SP at the time point at which an execution period of buffering ends and the candidate image frame has a maximum value of "duration."

Then, the control unit 30 proceeds to Step F219 to perform main subject determination.

In other words, the count value Cnt(n) of each candidate image frame E(n) at the time point is checked, and a candidate image frame E(n) having a maximum value is set as a main subject. In addition, the variable TSF=1 is set accordingly. Then, the process ends.

Note that, at the time point of Step F219, if the count values Cnt(n) of the plurality of candidate image frames E(n) have the maximum value in the same number, one candidate image frame may be selected under (Condition 1), (Condition 2), (Condition 3), or the like described in Processing Example 3 above. When determination of (Condition 1) is performed, an average value obtained in Step F127 can be used.

In addition, comparing the maximum value of the count values Cnt(n) is to the lower limit value Lth in Step F219, and if Cnt(n)<Lth, setting "no main subject found" may also be considered. Accordingly, it is possible to avoid deciding a main subject in a situation in which no main subject is originally present.

Processing Example 10 described above also obtains the same effect as Processing Example 6.

[4-12: Processing Example 12 (Type II; Determination Reference Area; Average Presence)]

Processing Example 12 is an example of Processing Type II, which is obtained by modifying Processing Example 9 to a process using a determination reference area SA.

In Processing Example 12, as a positional state of a candidate image frame, a positional relationship with the set determination reference area SA is obtained.

In addition, as a degree of stable presence of each candidate image frame, an average time (cumulative time) that satisfies the condition that the positional state (relationship with the determination reference area SA) be in a predetermined state is computed.

Then, a candidate image having a maximum value of the degree of stable presence in a period in which buffering is performed is determined as a main subject.

Figure 22:
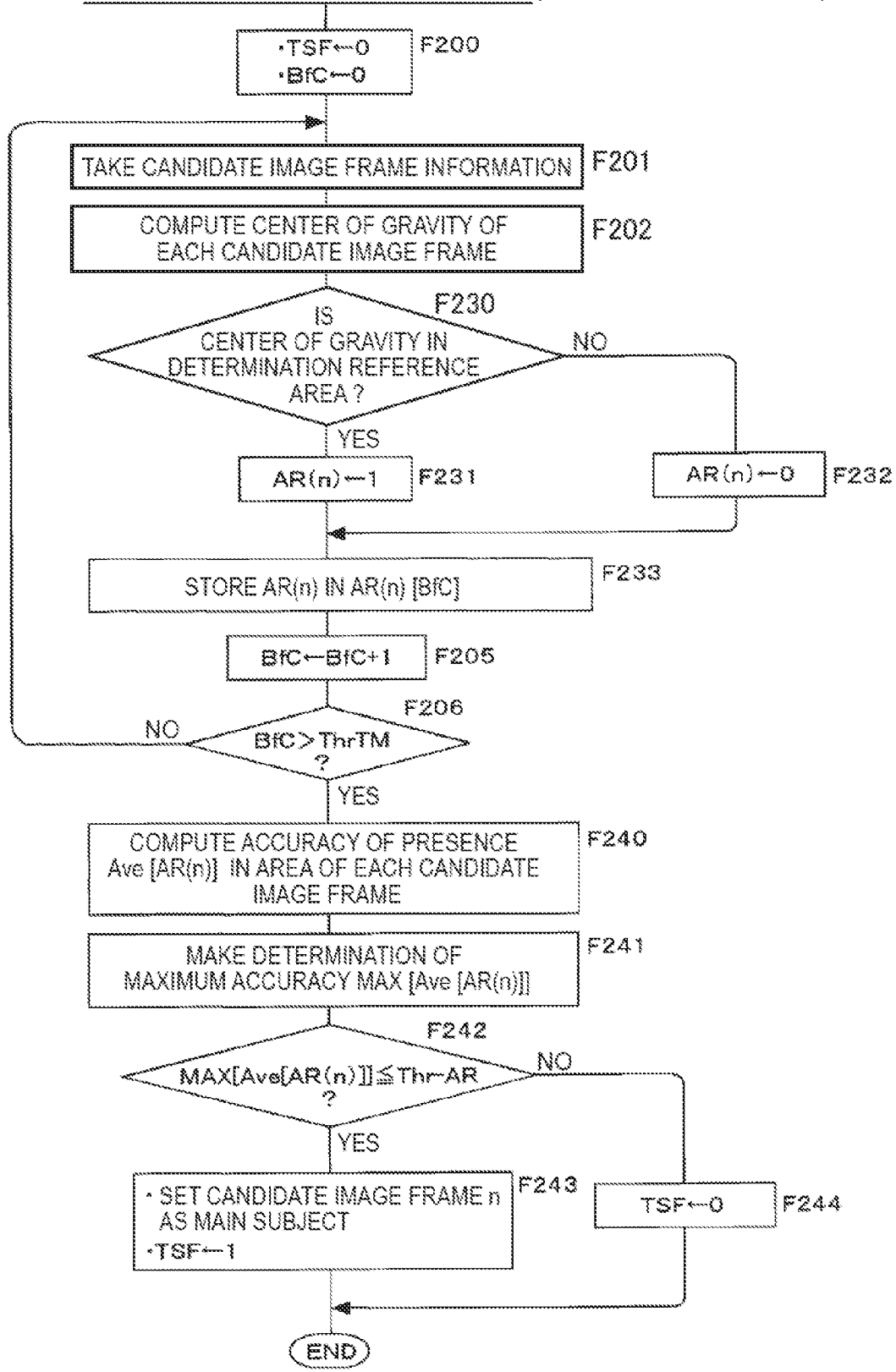
FIG. 22 is a flowchart of Processing Example 12 according to the embodiment.

FIG. 22 shows Processing Example 12.

Steps F200 to F202 are the same as those of FIG. 19.

In the buffering period, whether or not the center of gravity G of each candidate image frame E(n) is included in the determination reference area SA is checked in Step F230. This is the same process as Step F150 of FIG. 17.

If the center of gravity G of each candidate image frame E(n) is in the determination reference area SA, the control unit 30 sets a condition satisfaction flag AR(n)=1 in Step F231.

If the center of gravity G of each candidate image frame E(n) is not in the determination reference area SA, the control unit 30 sets the condition satisfaction flag AR(n)=0 in Step F232.

In Step F233, the control unit 30 stores (performs buffering for) the condition satisfaction flag AR(n) in, for example, an area AR(n) [BfC] in an internal memory area.

In Step F205, the control unit 30 causes a count value BfC to increase.

In Step F206, the control unit 30 determines whether or not the count value BfC has reached a count threshold value THrTM that corresponds to a fixed time, and if the count value has not reached the count threshold value, the process returns to Step F201.

The area AR(n) [BfC] in Step F233 described above refers to an area in which information of a candidate image frame E(n) of a frame FR(BfC) taken in a $(BfC)^{th}$ order from the start of the main subject determination process is stored.

For example, when the candidate image frames E1, E2, and E3 are present in the frame FR(0) that is the time point at which candidate image frame information of the frame FR(0) is first taken in Step F201, condition satisfaction flags AR1, AR2, and AR3 set in Steps F230 to F232 for each of the candidate image frames are stored in areas AR(1) [0], AR(2) [0], and AR(3) [0].

In addition, when the candidate image frames E1, E2, and E3 are present in the frame ER(1) taken next in Step F201, the condition satisfaction flags AR1, AR2, and AR3 set in Steps F230 to F232 for each of the candidate image frames are stored in areas AR(1) [1], AR(2) [1], and AR(3) [1].

In other words, by repeating the processes of Steps F201 to F206 for a fixed time (THrTM), condition satisfaction flags AR(n) (information of whether or not a frame is included in the determination reference area SA) of candidate image frames E(n) of the frame FR(0) to a frame(m) are accumulated.

The buffering ends after the fixed time elapses, and the control unit 30 causes the process to proceed to Step F240 from Step F206.

In Step F240, the control unit 30 computes a presence accuracy of each candidate image frame E(n) in the determination reference area SA.

This presence accuracy is set to an average value Ave [AR(n)] of condition satisfaction flags AR(n).

The average value (presence accuracy) Ave [AR(n)] may be computed as follows.

Ave[$AR(n)$]=(Cumulative addition value of condition satisfaction flags $AR(n)$ buffered for candidate image frames $E(n)$)/(The number of additions of $AR(n)$)

Then, in Step F241, the control unit 30 sets a maximum value among presence accuracies Ave [AR(n)] of the candidate image frames E(n) as a maximum accuracy MAX [Ave[AR(n)]]. In other words, a presence accuracy of a candidate image frame E(n) that has been present in the determination reference area SA for a longest time is selected.

When the maximum accuracy MAX [Ave[AR(n)]] is determined, the control unit 30 determines whether or not the maximum accuracy MAX [Ave[AR(n)]] is equal to or greater than an accuracy threshold value Trs-AR in Step F242.

If the maximum accuracy MAX [Ave[AR(n)]] is equal to or greater than the accuracy threshold value Trs-AR, the control unit 30 causes the process to proceed to Step F243 to determine a candidate image frame E(n) having the maximum accuracy MAX [Ave[AR(n)]] as a main subject, and then performs main subject setting. Then, the variable TSF=1 is set.

If the maximum accuracy MAX [Ave[AR(n)]] is not equal to or greater than the accuracy threshold value Trs-AR, the control unit 30 sets the variable TSF=0 in Step F244. In this case, the result of "no main subject found" is obtained.

Note that, when at least a candidate image frame E(n) is present and a process of deciding a main subject is definitely to be realized, Step F242 is removed, and a candidate image frame E(n) having the maximum accuracy MAX [Ave[AR(n)]] may be determined as a main subject as it is.

According to Processing Example 12 described above, by holding the imaging apparatus 10 so that the subject that a user wants to mainly capture is in the state of being as close to the determination reference point SP as possible (tracking a subject) such as at the center of an image, the subject is automatically determined as a main subject.

In addition, since candidate image frame information is acquired for a fixed time, the same effect as Processing Example 8 is obtained.

Note that, although a presence accuracy indicating a degree of stable presence is set to an average value of a cumulative time in which a candidate image frame is present in the determination reference area SA, the cumulative time itself may be used.

In addition, a candidate image frame having a longest duration for which the frame is present in the determination reference area SA rather than having a longest cumulative time may be set as a main subject.

In such a case, the number of successive frames of which buffered condition satisfaction flags AR(n) are "1" is counted, and the counted value may be used as a presence accuracy.

In addition, of course in Processing Example 12, there are also cases in which a plurality of candidate image frames correspond to the maximum accuracy MAX [Ave[AR(n)]]. When one candidate image frame E(n) is set as a main subject, the candidate image frame E(n) that will serve as a main subject may be selected with a technique using (Condition 1) to (Condition 3) as described in Processing Example 3.

In addition, in FIG. 5 with regard to Processing Type II, it is described that Step F21 may be performed after completion of accumulation is determined in Step F22.

When a process corresponding thereto is performed, the processes of Steps F202 and F232 of FIG. 22 may be executed when the process proceeds to Step F240 from Step F206.

In other words, it is an example in which the candidate image frame information itself is buffered in Step F204, and setting of a condition satisfaction flag AR(n) of each candidate image frame E(n) of each frame is computed using the buffered candidate image frame information after completion of the buffering.

<5. Application to a Program and a Computer Apparatus>

Hereinabove, the embodiments of the image processing apparatus 1 and imaging apparatus 10 have been described, and the main subject determination processes described above may be executed by hardware or software.

A program according to an embodiment is a program that causes an arithmetic processing device, for example, a CPU (Central Processing Unit), a DSP (Digital Signal Processor), or the like to execute the main subject determination processes described above.

In other words, the program acquires candidate image information indicating candidate images detected as candidates for main subjects in a plurality of frames of image data, and causes an arithmetic processing device to execute a positional state determination process for determining a positional state of the candidate images indicated by the candidate image information within a field of view.

In addition, the program causes the arithmetic processing device to execute a stable presence degree computation process for obtaining degrees of stable presence of the candidate images within the image data spanning the plurality of frames from the positional states of the candidate images in the frames determined in the positional state determination process.

In addition, the program causes the arithmetic processing device to execute a main subject determination process for determining a main subject among the candidate images using the degrees of stable presence obtained in the stable presence degree computation process.

Figure 2:
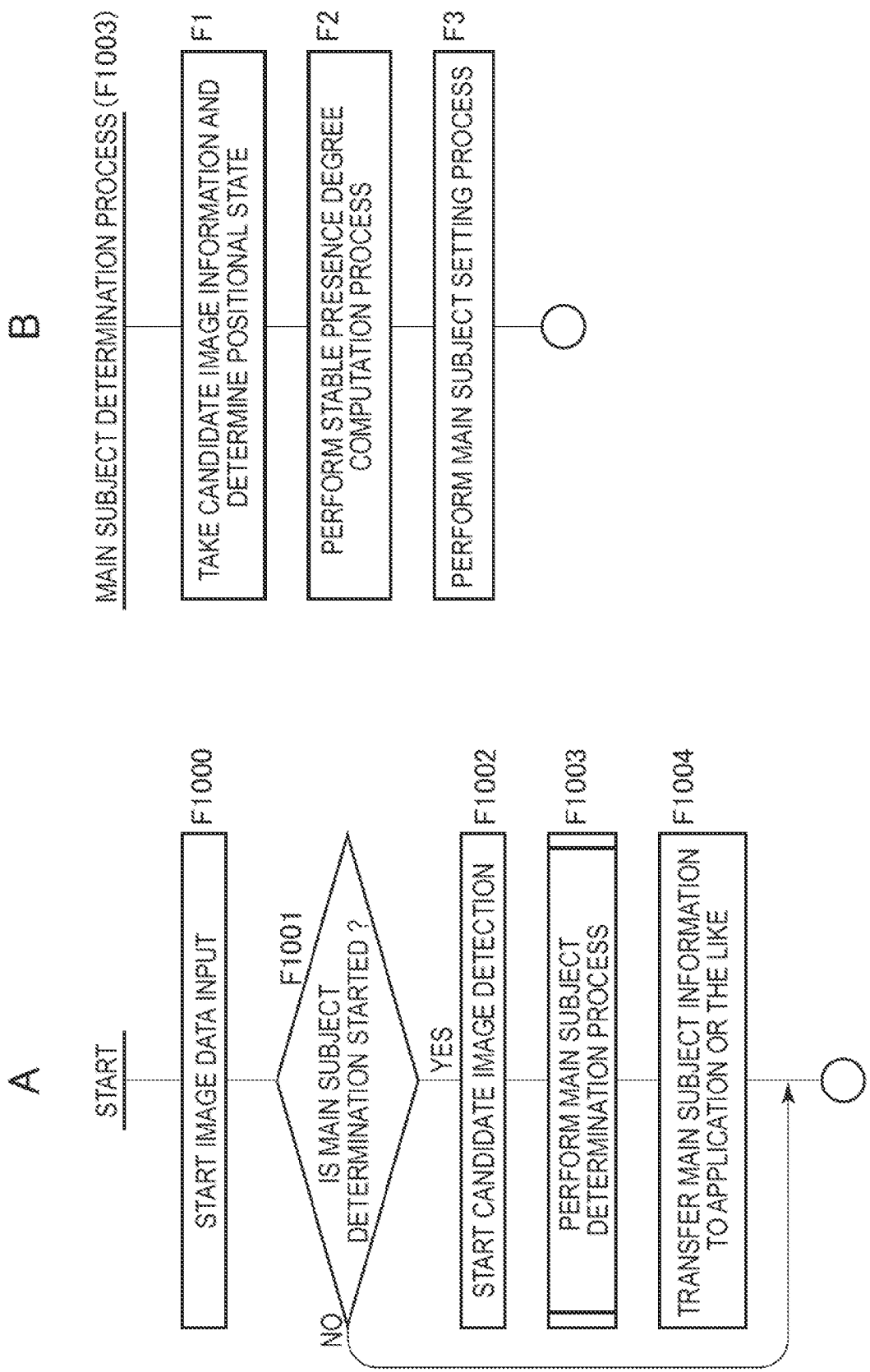
FIG. 2 is a flowchart of a main subject determination process of the image processing apparatus according to the embodiment.

To be specific, the program according to the embodiment may be a program that causes the arithmetic processing device to execute the processes described in FIGS. 2, 4, and 5, and further Processing Example 1 to Processing Example 12.

With the program, a device that executes the main subject determination process described above can be realized using the arithmetic processing device.

Such a program can be recorded in advance on an HDD as a recording medium embedded in an appliance such as a computer apparatus, a ROM in a microcomputer having a CPU, and the like.

Alternatively, the program can be temporarily or permanently stored (recorded) in a removable recording medium such as a flexible disk, a CD-ROM (Compact Disc Read Only Memory), a MO (Magnet optical) disc, a DVD (Digital Versatile Disc), a Blu-ray Disc, a magnetic disk, a semiconductor memory, or a memory card. Such a removable recording medium can be provided as so-called package software.

Furthermore, such a program can be downloaded from a download site through a network such as a LAN (Local Area Network) or the Internet, in addition to the installation from the removable recording medium to a personal computer and the like.

Furthermore, such a program is suitable for the image processing apparatus of the embodiment to be extensively provided. For example, the program is downloaded to a personal computer, a portable information processing apparatus, a cellular phone, a game machine, a video player, a PDA (Personal Digital Assistant) and the like, so that the portable information processing apparatus and the like are available as the image processing apparatus according to an embodiment of the present disclosure that performs the main subject determination process.

Figure 23:
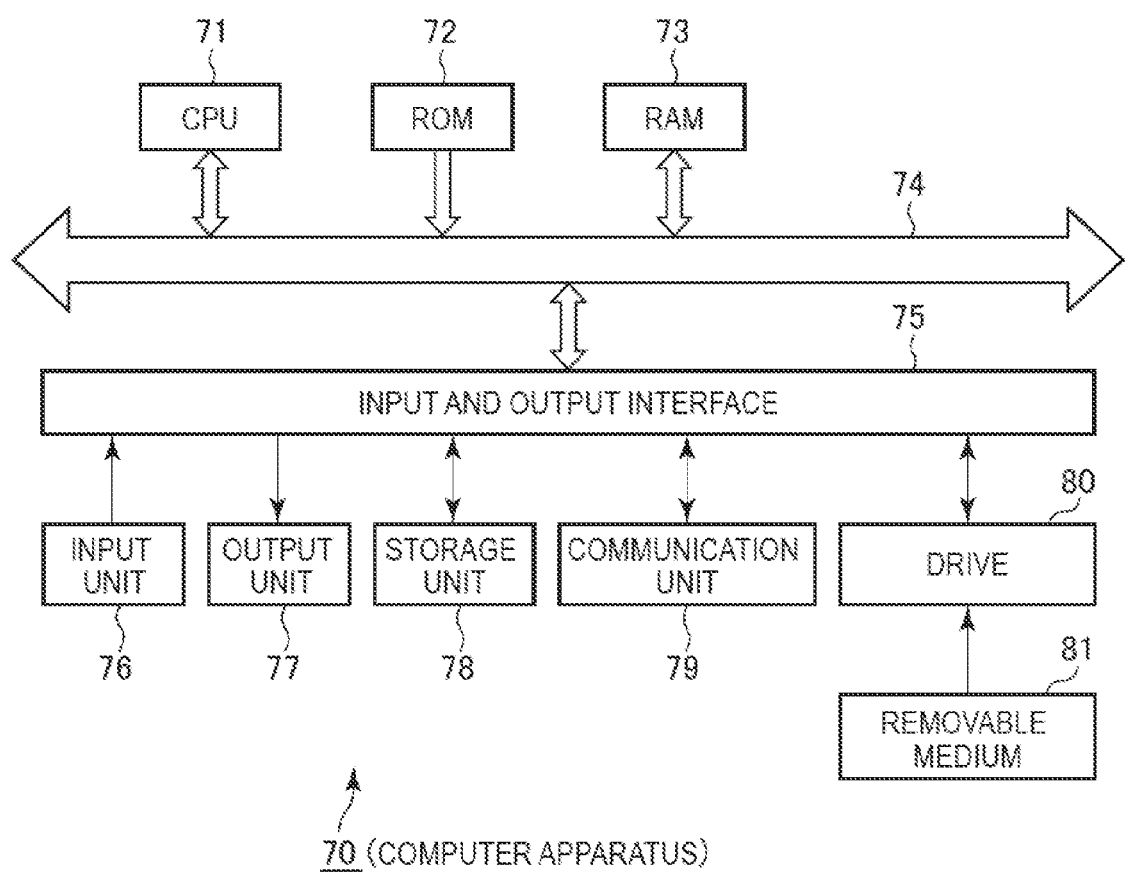
FIG. 23 is a block diagram of the case in which the embodiment is applied to a computer apparatus.

For example, in a computer apparatus as illustrated in FIG. 23, the same process as the main subject determination process can be performed in the image processing apparatus 1, and the imaging apparatus 10.

In FIG. 23, a CPU 71 of a computer apparatus 70 performs various processes according to a program stored in a ROM 72 or a program loaded from a storage unit 78 to a RAM 73. Furthermore, the RAM 73 appropriately stores data and the like which are necessary when the CPU 71 performs the various processes.

The CPU 71, the ROM 72, and the RAM 73 are connected to one another through a bus 74. Furthermore, an input and output interface 75 is also connected to the bus 74.

The input/output interface 75 is connected to an input unit 76 including a keyboard, a mouse and the like, an output unit 77 including a display, such as a CRT (Cathode Ray Tube), an LCD, or an organic EL panel, and a speaker, the storage unit 78 including a hard disk, and a communication unit 79 including a modem and the like. The communication unit 79 performs a communication process through a network including the Internet.

Furthermore, a drive 80 is connected to the input and output interface 75 according to necessity, a removable medium 81 such as a magnetic disk, an optical disc, a magneto optical disc, or a semiconductor memory is appropriately mounted on the input and output interface, and a computer program read from this is installed in the storage unit 78 according to necessity.

When the aforementioned main subject determination process is performed by software, a program constituting the software is installed from a network or a recording medium.

The recording medium, for example, as illustrated in FIG. 23, is configured by the removable medium 81 including a magnetic disk (including a flexible disk), an optical disc (including a Blu-ray disc (registered trademark), a CD-ROM (Compact Disc-Read Only Memory), and a DVD (Digital Versatile Disc)), a magneto optical disc (including a MD (Mini Disc)), a semiconductor memory and the like which are distributed to deliver a program to a user, separately from an apparatus body with the program recorded therein. Alternatively, the recording medium is also configured by the ROM 72, a hard disk included in the storage unit 78, and the like, which are delivered to a user in the state of being incorporated in advance into the apparatus body with the program recorded therein.

In the computer apparatus 70, when dynamic image data is input through a reception operation by the communication unit 79, or a reproduction operation in the drive 80 (removable medium 81) or the recording unit 78, the CPU 71 executes the functions of the candidate image detection units (3 and 26) and the main subject determination units (2 and 31) described above based on the program. In other words, by executing the process of FIGS. 2, 4, and 5 or Processing Example 1 to Processing Example 12, a main subject can be determined in the input image data.

<6. Modification Example>

Based on the embodiments described above, various modified examples are considered.

Particularly, more various detailed examples of the main subject determination process are assumed.

For example, the center of gravity G is used for a distance Diff(n) between a candidate image frame E(n) and a determination reference point SP and a positional relationship thereof with a determination reference area SA, but the center of gravity G may not be used. For example, a vertex position of a candidate image frame E(n) may be used.

In addition, a shape of a candidate image frame is not limited to a square or a rectangle, and a circle, an ellipse, a polygon, an indefinite shape and the like are considered. According to the shape of a candidate image frame, a center position or an end point position may be used in computation of a distance Diff.

In addition, a positional state of a candidate image within a field of view is mainly described as a positional relationship thereof with the determination reference point SP or determination reference area SA in the field of view as a two-dimensional space in the embodiments, but may be described as a positional relationship thereof with the determination reference point SP or determination reference area SA in a three-dimensional space coordinate space (x-y-z coordinate space) formed by adding a subject distance to a two-dimensional screen plane.

Furthermore, a positional relationship (for example, a distance) of an x coordinate value of a candidate image with the determination reference point SP or determination reference area SA in consideration of a field of view as a one-dimensional space may be regarded as a positional state of the candidate image in the field of view. Of course, such a positional relationship of only a y coordinate value or a z coordinate value with the determination reference point SP or determination reference area SA may be considered in the same manner.

Furthermore, as an index indicating a degree of stable presence, various factors are considered in addition to a cumulative time and duration that satisfy a condition, a value of average presence, and average accuracy of presence. For example, an average value of a duration that satisfies a condition is possible.

Furthermore, a degree of change in a size (the number of pixels) of a candidate image frame of each frame and the like may be set as an index of a degree of stable presence.

In addition, a result of a main subject determination process may be added to still image data and dynamic image data captured and recorded after the process as metadata. In other words, information indicating a calm subject is added to a still image file, or the like.

In addition, an operation of designating a main subject through an operation by a photographer may be possible while a through image is displayed and at the same time as a main subject determination process is performed.

When the operation of designating a main subject is performed, it is preferable to set a variable TSF=1 accordingly and the main subject determination process performed by the control unit 30 to be stopped halfway.

In addition, in the embodiments, the process of determining a main subject on the assumption of still image capturing is mainly described, but during a standby mode for dynamic image capturing or execution of dynamic image capturing and recording, the processes of the embodiments described above can be applied as a process of performing main subject determination from a plurality of captured frames.

Additionally, the present technology may also be configured as below.

(1)

An image processing apparatus including:

a candidate detection unit configured to detect each of candidate images serving as candidates for a main subject for a plurality of frames of image data; and a main subject determination unit configured to obtain a degree of stable presence of the candidate images detected by the candidate detection unit within the image data spanning the plurality of frames and to determine a main subject among the candidate images using the degree of stable presence.

(2)

The image processing apparatus according to (1), wherein the main subject determination unit performs a positional state determination process of determining a positional state of each of the candidate images within a field of view, a stable presence degree computation process of obtaining a degree of stable presence of each of the candidate images within image data spanning the plurality of frames from the positional state of each of the candidate images of each frame determined in the positional state determination process, and a main subject determination process of determining a main subject among the candidate images using the degree of stable presence obtained in the stable presence degree computation process.

(3)

The image processing apparatus according to (2), wherein the main subject determination unit determines a distance between each of the candidate images and a determination reference point set within the field of view as the positional state.

(4)

The image processing apparatus according to (3), wherein the main subject determination unit sets the determination reference point according to an operation input.

(5)

The image processing apparatus according to (2), wherein the main subject determination unit determines a positional relationship of each of the candidate images with a determination reference area set within the field of view as the positional state.

(6)

The image processing apparatus according to (5), wherein the main subject determination unit sets the determination reference area according to an operation input.

(7)

The image processing apparatus according to any one of (2) to (6), wherein the main subject determination unit computes cumulative time information indicating that the positional state satisfies a predetermined condition as the degree of stable presence.

(8)

The image processing apparatus according to any one of (2) to (6), wherein the main subject determination unit computes duration information indicating that the positional state continuously satisfies a predetermined condition as the degree of stable presence.

(9)

The image processing apparatus according to any one of (1) to (8), wherein the main subject determination unit determines a candidate image of which the degree of stable presence has reached a predetermined value most quickly after a start of main subject determination as a main subject.

(10)

The image processing apparatus according to any one of (1) to (8), wherein the main subject determination unit determines a candidate image having a highest value of the degree of stable presence in a main subject determination period as a main subject.

(11)

The image processing apparatus according to any one of (1) to (10), wherein the main subject determination unit uses position information of the candidate images within a field of view or size information of the candidate images in a computation process of the degree of stable presence or a determination process of a main subject.

(12)

The image processing apparatus according to any one of (1) to (11), wherein, when a plurality of candidate images are determined as main subjects based on the degree of stable presence, the main subject determination unit selects one candidate image and sets the selected candidate image to be a main subject using position information of the candidate images within a field of view or size information of the candidate images within a field of view.

(13)

The image processing apparatus according to any one of (1) to (12), wherein the candidate detection unit detects an image of a face or a body of a human or an animal as a candidate image serving as a candidate for a main subject.

REFERENCE SIGNS LIST

10 base station
12 core network
20 UE
150, 151, 152, 160, 161, 162 mapping storage unit
154, 264 mapping management unit
158 signature determination unit
160, 161, 162 transmission data determination unit
180 communication resource determination unit
250 transmission data generation unit
268 signature selection unit
270 preamble generation unit
280 communication resource selection unit

The invention claimed is:

1. An image processing apparatus comprising:
circuitry configured to:
detect each of candidate images for a plurality of frames of image data;
obtain a degree of stable presence of the candidate images based on each of the candidate images,
in which the degree of stable presence of each of the candidate images is determined by performing a stable presence degree computation process for each given candidate image in each given frame of the plurality of frames independently of other of the candidate images in the given frame and independently of frames other than the given frame, and
in which the stable presence degree computation process changes a set weighting value of a computation of stable presence degree performed during the stable presence degree computation process, in accordance with time of the given frame from a starting point of the plurality of frames; and
determine a main subject among the candidate images using the degree of stable presence.

2. The image processing apparatus according to claim 1, wherein the circuitry is configured to perform:
a positional state determination process of determining a positional state of each of the candidate images within a field of view, the stable presence degree computation process of obtaining the degree of stable presence of each of the candidate images within image data spanning the plurality of frames from the positional state of each of the candidate images of each frame determined in the positional state determination process, and a main subject determination process of determining a main subject among the candidate images using the degree of stable presence obtained in the stable presence degree computation process.

3. The image processing apparatus according to claim 2, wherein the circuitry is configured to determine a distance between each of the candidate images and a determination reference point set within the field of view as the positional state.

4. The image processing apparatus according to claim 3, wherein the circuitry is configured to set the determination reference point according to an operation input.

5. The image processing apparatus according to claim 2, wherein the circuitry is configured to compute cumulative time information indicating that the positional state satisfies a predetermined condition as the degree of stable presence.

6. The image processing apparatus according to claim 2, wherein the circuitry is configured to compute duration information indicating that the positional state continuously satisfies a predetermined condition as the degree of stable presence.

7. The image processing apparatus according to claim 1, wherein the circuitry is configured to determine a candidate image of which the degree of stable presence has reached a predetermined value most quickly after a start of main subject determination as a main subject.

8. The image processing apparatus according to claim 1, wherein the circuitry is configured to determine a candidate image having a highest value of the degree of stable presence in a main subject determination period as a main subject.

9. The image processing apparatus according to claim 1, wherein the circuitry is configured to use position information of the candidate images within a field of view or size information of the candidate images in the stable presence degree computation process or a determination process of a main subject.

10. The image processing apparatus according to claim 1, wherein, when a plurality of candidate images are determined as main subjects based on the degree of stable presence, the circuitry is configured to select one candidate image and sets the selected candidate image to be a main subject using position information of the candidate images within a field of view or size information of the candidate images within a field of view.

11. The image processing apparatus according to claim 1, wherein the circuitry is configured to detect an image of a face or a body of a human or an animal as a candidate image serving as a candidate for a main subject.

12. An image processing method comprising:
detecting each of candidate images for a plurality of frames of image data;
obtaining a degree of stable presence of the detected candidate images based on each of the candidate images,
in which the degree of stable presence of each of the candidate images is determined by performing a stable presence degree computation process for each given candidate image in each given frame of the plurality of frames independently of other of the candidate images in the given frame and independently of frames other than the given frame,
in which the stable presence degree computation process changes a set weighting value of a computation of stable presence degree performed during the stable presence degree computation process, in accordance with time of the given frame from a starting point of the plurality of frames; and
determining a main subject among the candidate images using the degree of stable presence.

13. A non-transitory storage medium configured to store a program executable by a computer, the program comprising:
determining a positional state of each of candidate images for a plurality of frames of image data within a field of view;
obtaining a degree of stable presence of each of the candidate images based on the positional state of each of the candidate images of each frame,
in which the degree of stable presence for each of the candidate images is determined by performing a stable presence degree computation process for each given candidate image in each given frame of the plurality of frames independently of other of the candidate images in the given frame and independently of frames other than the given frame, and
in which the stable presence degree computation process changes a set weighting value of a computation of stable presence degree performed during the stable presence degree computation process, in accordance with time of the given frame from a starting point of the plurality of frames; and
determining a main subject among the candidate images using the degree of stable presence.

14. The image processing apparatus of claim 1, wherein the degree of stable presence is an indication of a cumulative or continuous time with which a given candidate image itself is determined to be in a state of satisfying a predetermined condition with regard to a predetermined reference.

15. The image processing apparatus of claim 1, wherein the set weighting value is changed to increase or decrease a weight of a result of the computation of stable presence degree performed for each said given candidate image of the given frame as the time for the given frame from the starting point increases.

16. The image processing apparatus of claim 1, wherein the set weighting value is an offset by which a value indicative of a result of the computation of stable presence degree performed for each said given candidate image of the given frame is adjusted.

* * * * *